(12) United States Patent
Qi et al.

(10) Patent No.: US 12,222,823 B2
(45) Date of Patent: Feb. 11, 2025

(54) USER DATA BACKUP TO DATA PARTITION OF STORAGE MEDIUM

(71) Applicant: Huawei Technologies Co., Ltd., Shenzhen (CN)

(72) Inventors: Dechun Qi, Shenzhen (CN); Leizhen Zang, Beijing (CN); Liang Zhang, Shanghai (CN); Xun Zhang, Shenzhen (CN); Zhijun Lu, Shenzhen (CN); Jun Xue, Shenzhen (CN); Haitao Zhu, Shanghai (CN); Xiaozhen Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 730 days.

(21) Appl. No.: 17/261,239

(22) PCT Filed: Nov. 14, 2018

(86) PCT No.: PCT/CN2018/115315
§ 371 (c)(1),
(2) Date: Jan. 19, 2021

(87) PCT Pub. No.: WO2020/015259
PCT Pub. Date: Jan. 23, 2020

(65) Prior Publication Data
US 2021/0271572 A1    Sep. 2, 2021

(30) Foreign Application Priority Data
Jul. 20, 2018  (WO) ................ PCT/CN2018/096525

(51) Int. Cl.
*G06F 11/00*     (2006.01)
*G06F 3/06*      (2006.01)
(Continued)

(52) U.S. Cl.
CPC ........ *G06F 11/1469* (2013.01); *G06F 3/0619* (2013.01); *G06F 3/0632* (2013.01);
(Continued)

(58) Field of Classification Search
None
See application file for complete search history.

(56) References Cited

U.S. PATENT DOCUMENTS

| | | | |
|---|---|---|---|
| 6,928,579 B2 * | 8/2005 | Aija | G06F 11/1417 714/4.2 |
| 7,389,442 B1 | 6/2008 | Lee | |

(Continued)

FOREIGN PATENT DOCUMENTS

| CN | 1445667 A | 10/2003 |
|---|---|---|
| CN | 1534490 A | 10/2004 |

(Continued)

OTHER PUBLICATIONS

Google Scholar/Patents search—text refined (Year: 2023).*
Google Scholar/Patents search—text refined (Year: 2024).*

*Primary Examiner* — Christopher S McCarthy
(74) *Attorney, Agent, or Firm* — Conley Rose, P.C.

(57) ABSTRACT

Embodiments of this application relate to the field of storage technologies, and disclose a data backup method and a terminal, to back up user data in a terminal when the terminal cannot be used. A specific solution is as follows: A terminal includes a first data partition, and the first data partition supports to start an operating system when the terminal is powered on. The terminal starts the operating system by using a second data partition after detecting a power-on failure of the terminal or detecting a preset operation of a user. The second data partition is a blank data partition. After the operating system is successfully started, the terminal transmits user data in the first data partition to (Continued)

a first storage medium. The first storage medium is located outside the terminal and is connected to the terminal.

20 Claims, 48 Drawing Sheets

(51) Int. Cl.
    *G06F 9/4401*     (2018.01)
    *G06F 11/14*     (2006.01)
    *G06F 21/31*     (2013.01)
    *G06F 21/60*     (2013.01)

(52) U.S. Cl.
    CPC .......... *G06F 3/0644* (2013.01); *G06F 3/0679* (2013.01); *G06F 9/4406* (2013.01); *G06F 11/1417* (2013.01); *G06F 11/1451* (2013.01); *G06F 21/31* (2013.01); *G06F 21/602* (2013.01); *G06F 2206/1008* (2013.01)

(56) References Cited

U.S. PATENT DOCUMENTS

| | | | |
|---|---|---|---|
| 2003/0005037 A1* | 1/2003 | Aija .......................... | G06F 8/61 714/E11.133 |
| 2004/0078680 A1 | 4/2004 | Hu et al. | |
| 2008/0115071 A1* | 5/2008 | Fair ...................... | G06F 11/1456 715/764 |
| 2012/0284451 A1* | 11/2012 | Yang ..................... | G06F 3/0632 711/E12.008 |
| 2017/0286092 A1* | 10/2017 | Zhu ......................... | G06F 8/654 |
| 2020/0192761 A1* | 6/2020 | Ponce ................. | G06F 11/1464 |
| 2021/0149578 A1* | 5/2021 | Xu ....................... | H04L 41/0806 |
| 2024/0012652 A1* | 1/2024 | Wang ........................ | G06F 8/65 |

FOREIGN PATENT DOCUMENTS

| | | |
|---|---|---|
| CN | 101854428 A | 10/2010 |
| CN | 102722426 A | 10/2012 |
| CN | 103645972 A | 3/2014 |
| CN | 103870347 A | 6/2014 |
| CN | 104182242 A | 12/2014 |
| CN | 104407890 A | 3/2015 |
| CN | 105224423 A | 1/2016 |
| CN | 105843710 A | 8/2016 |
| CN | 106250172 A | 12/2016 |
| CN | 106528347 A | 3/2017 |
| CN | 106921735 A | 7/2017 |
| CN | 106951799 A | 7/2017 |
| CN | 107066346 A | 8/2017 |
| CN | 107656706 A | 2/2018 |
| CN | 107766089 A | 3/2018 |
| CN | 107908340 A | 4/2018 |

* cited by examiner

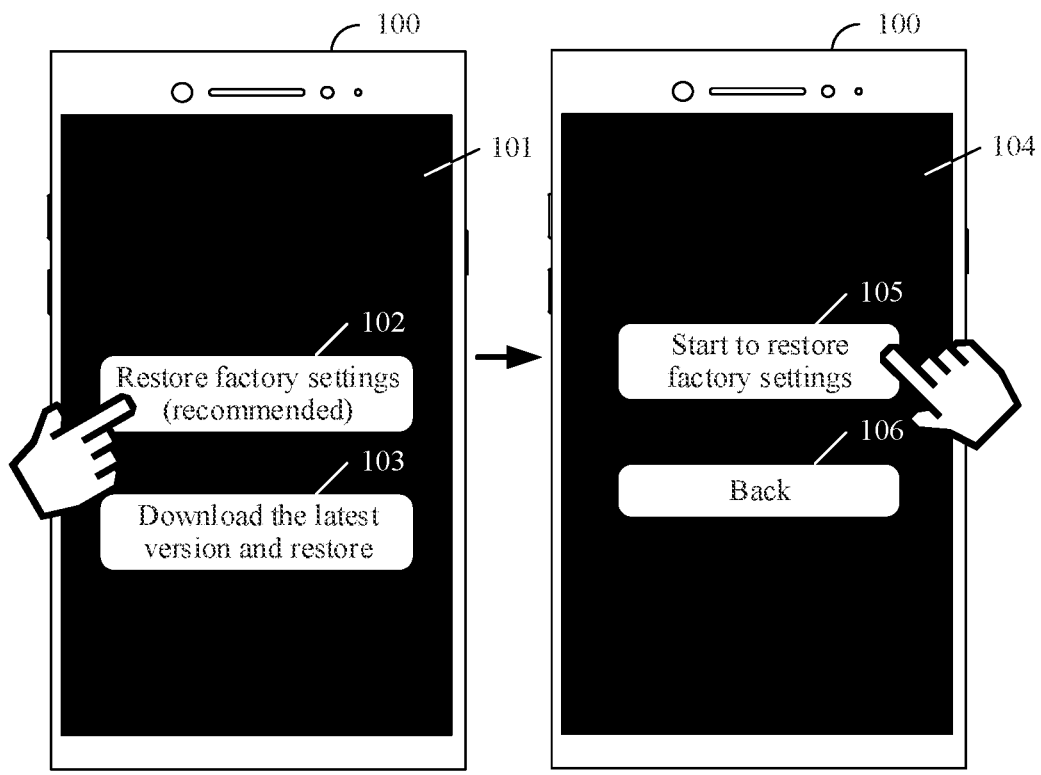
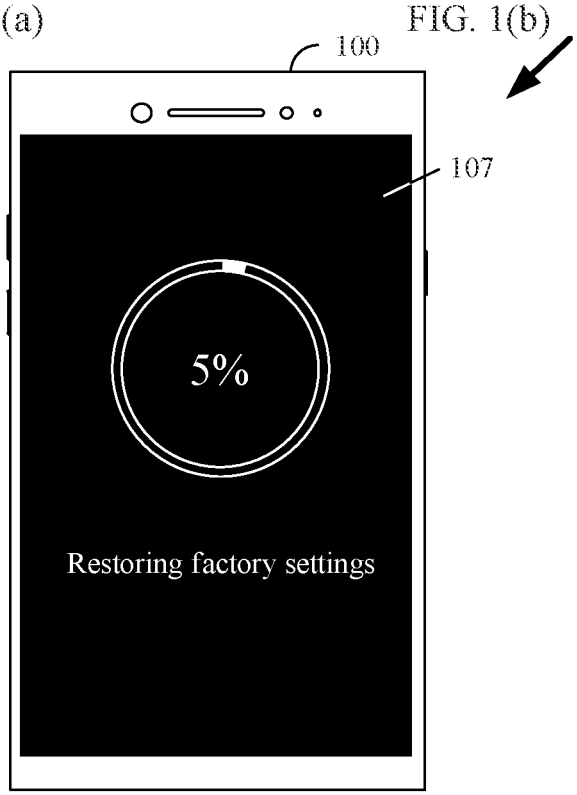
FIG. 1(a)  FIG. 1(b)  FIG. 1(c)

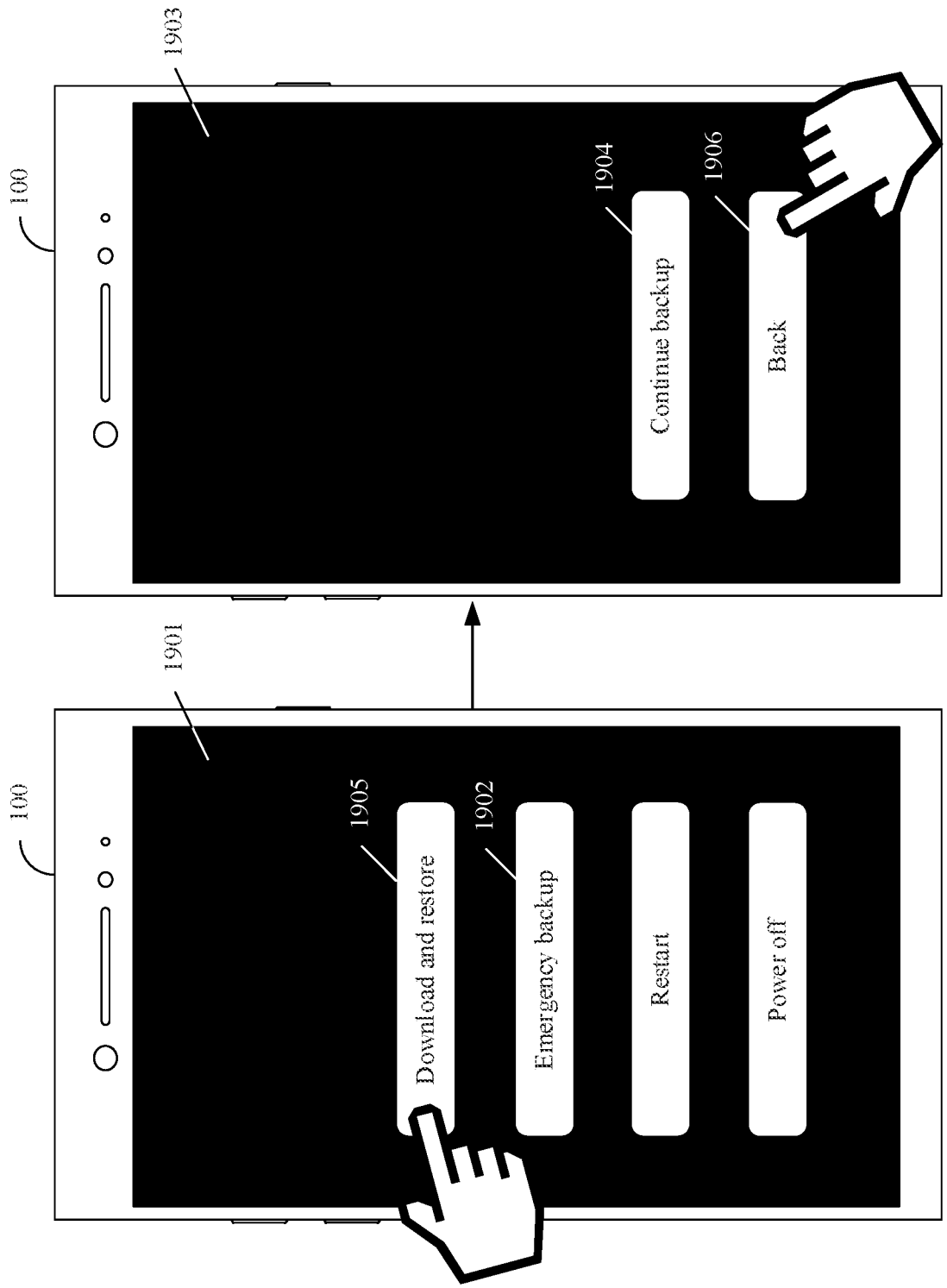

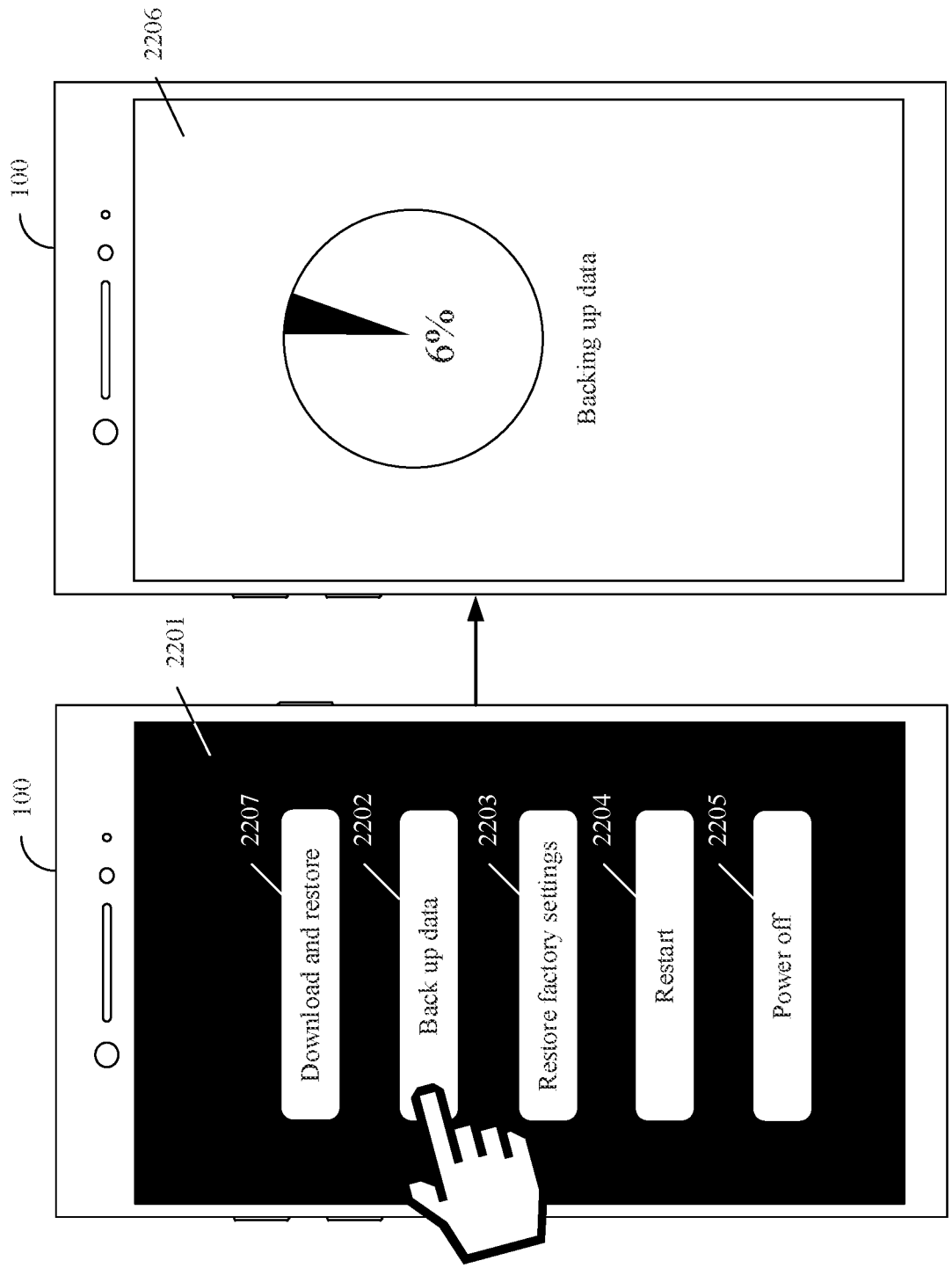

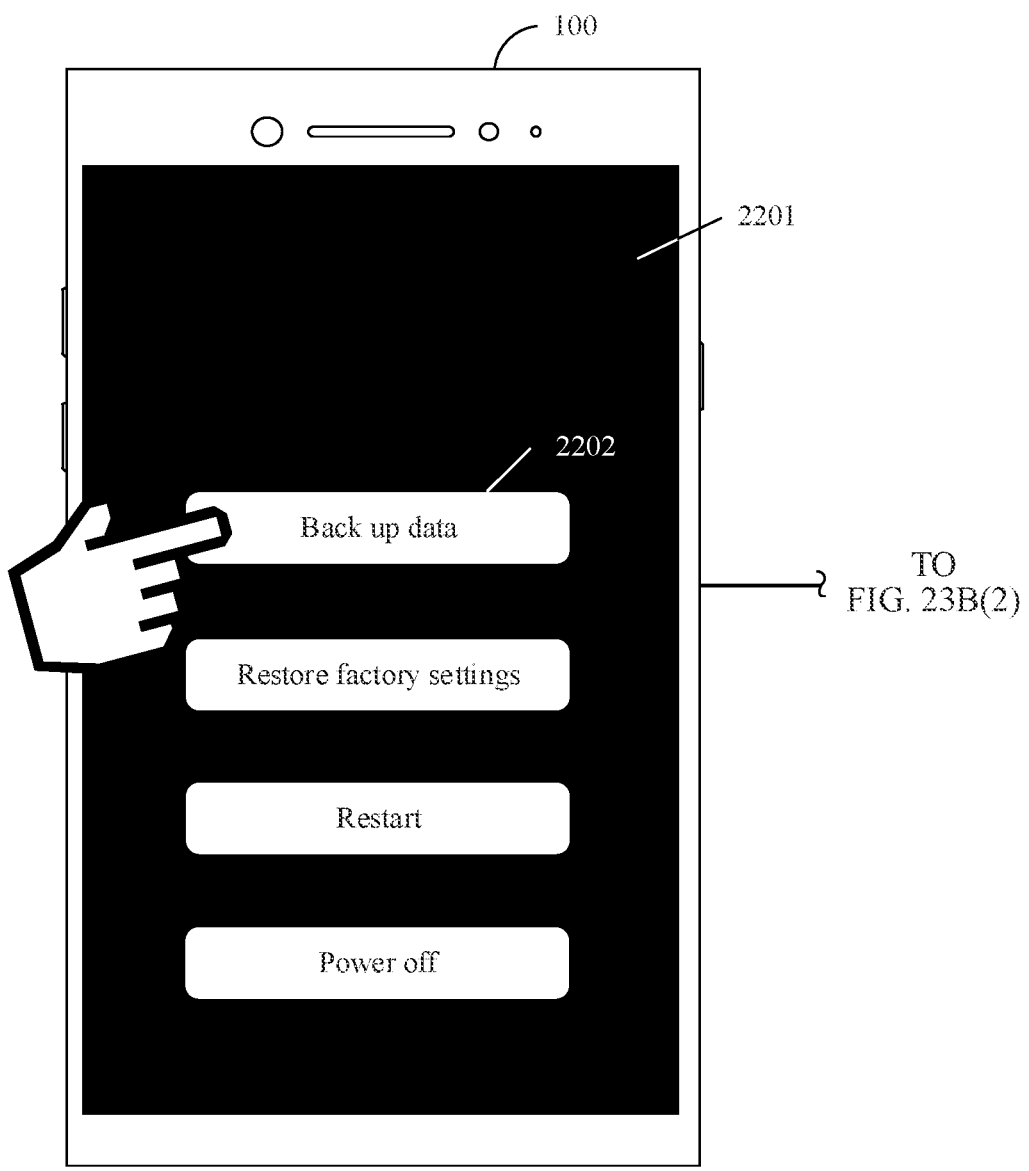
FIG. 23B(1)

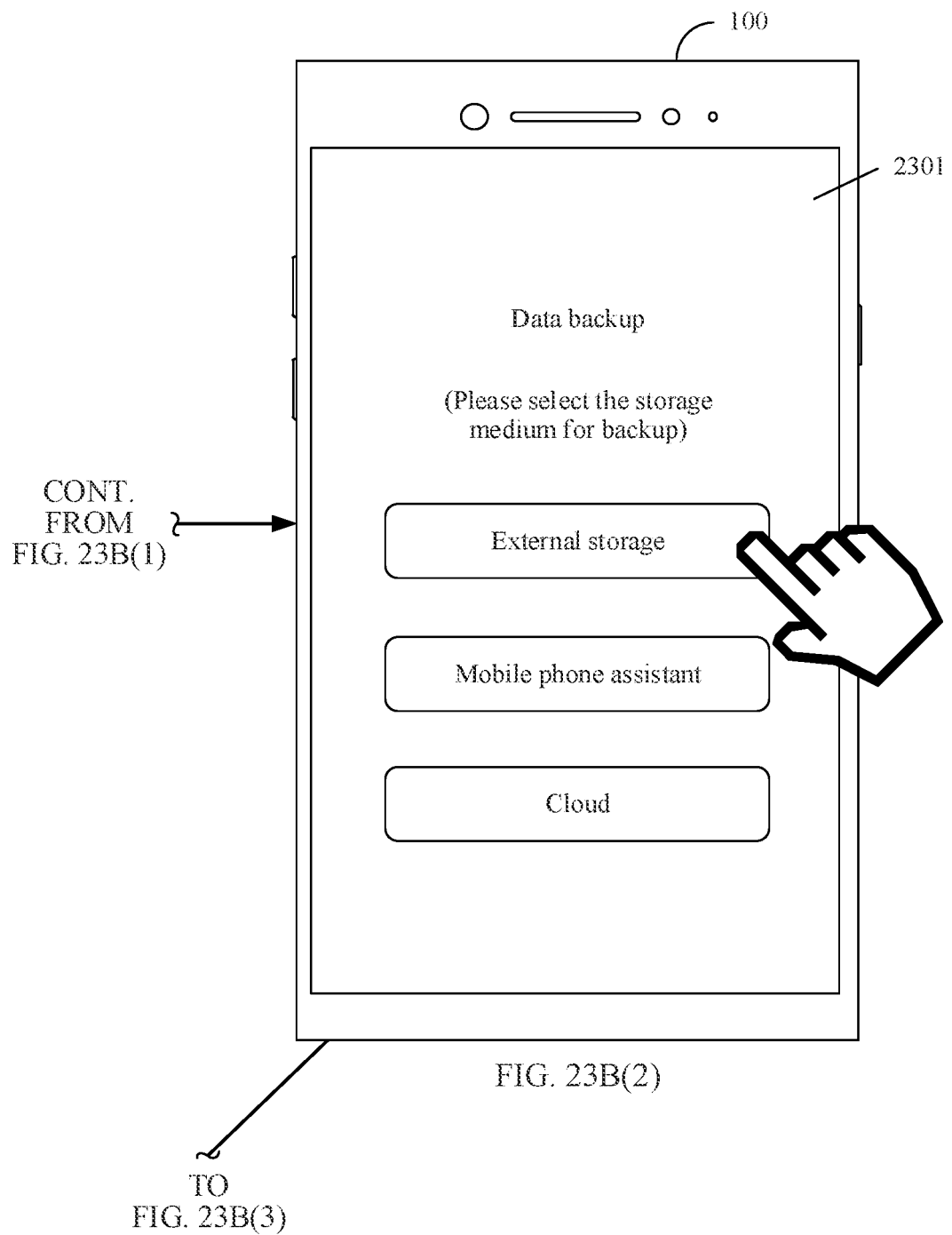
FIG. 23B(2)

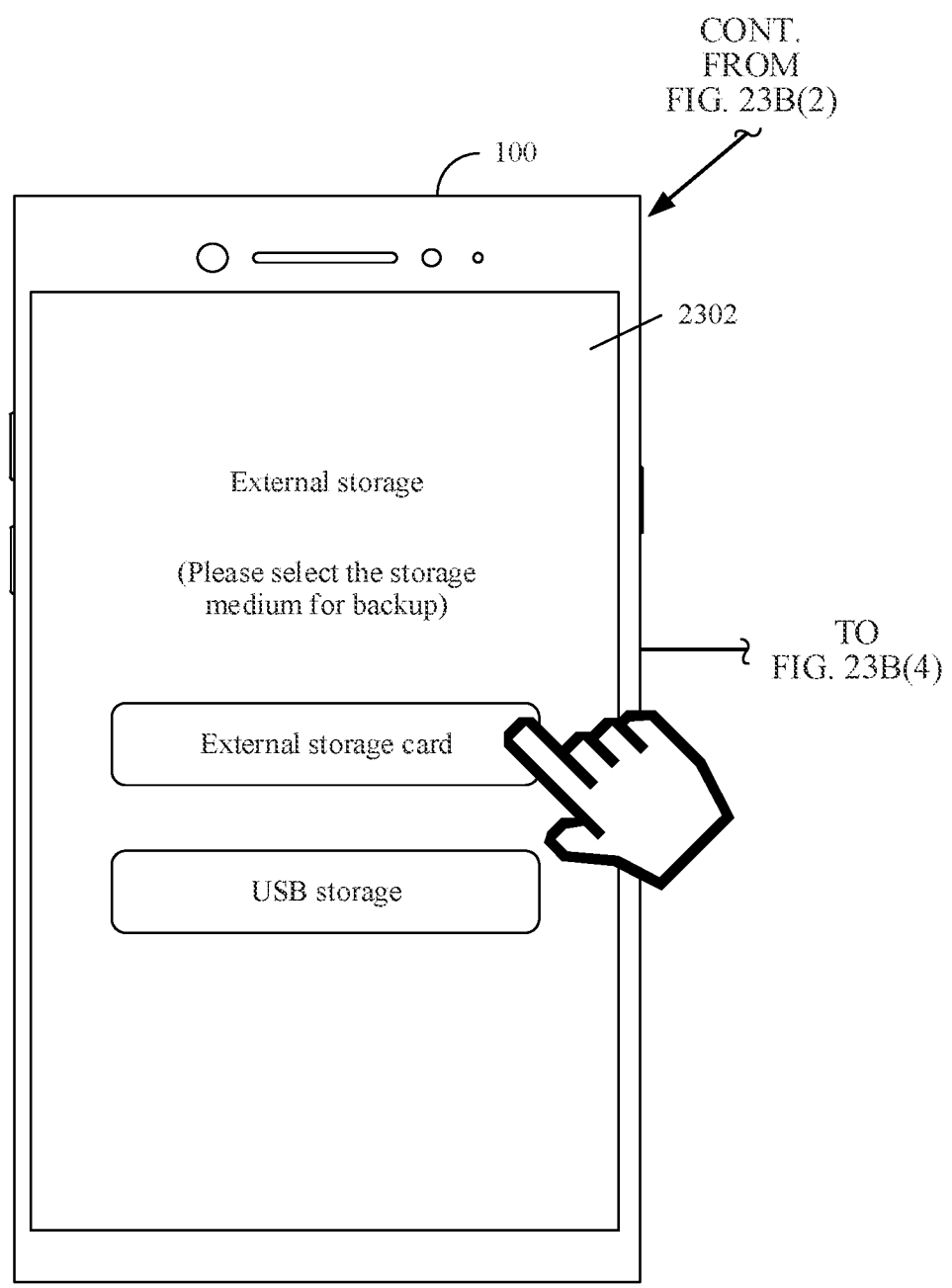
FIG. 23B(3)

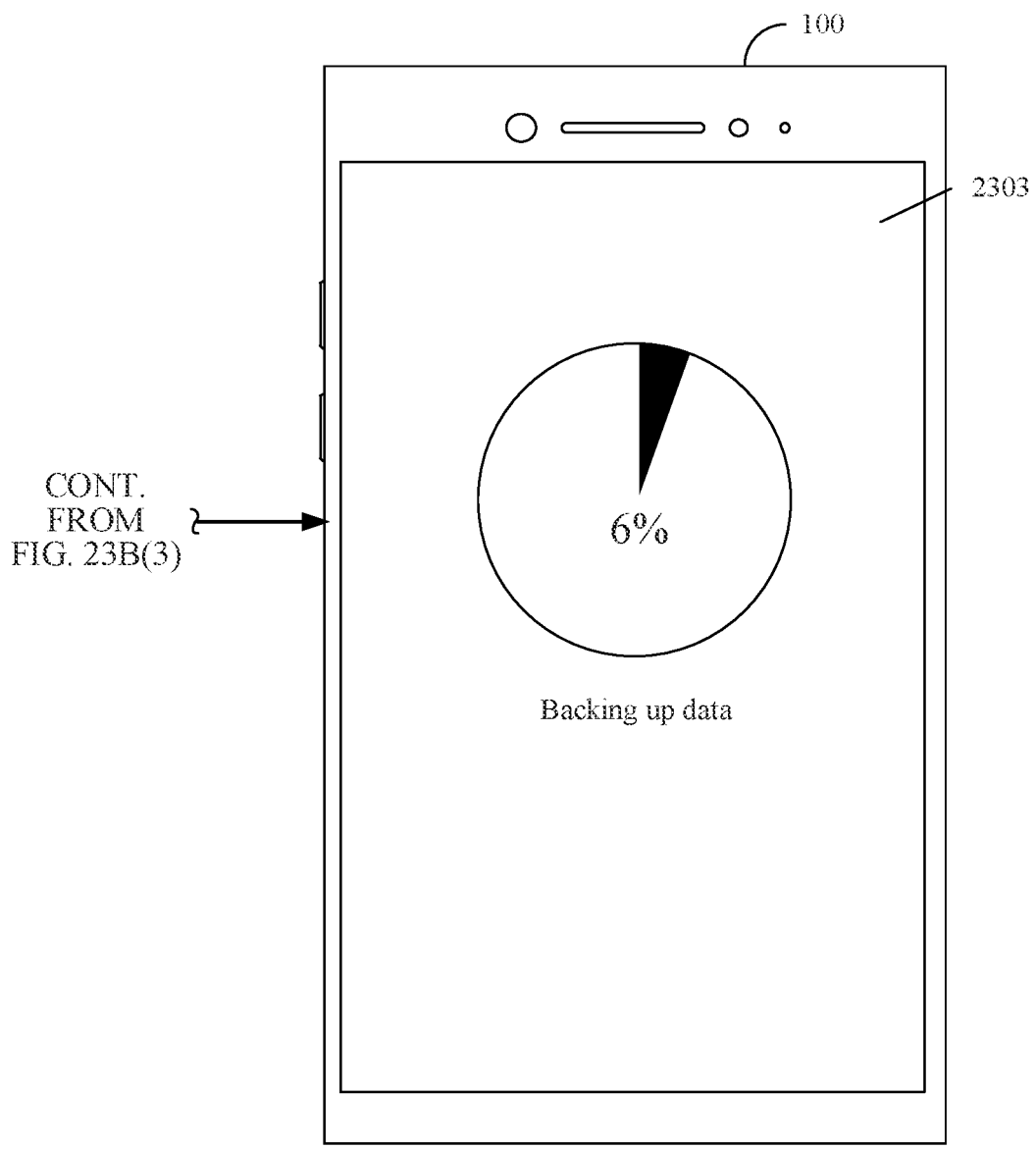
FIG. 23B(4)

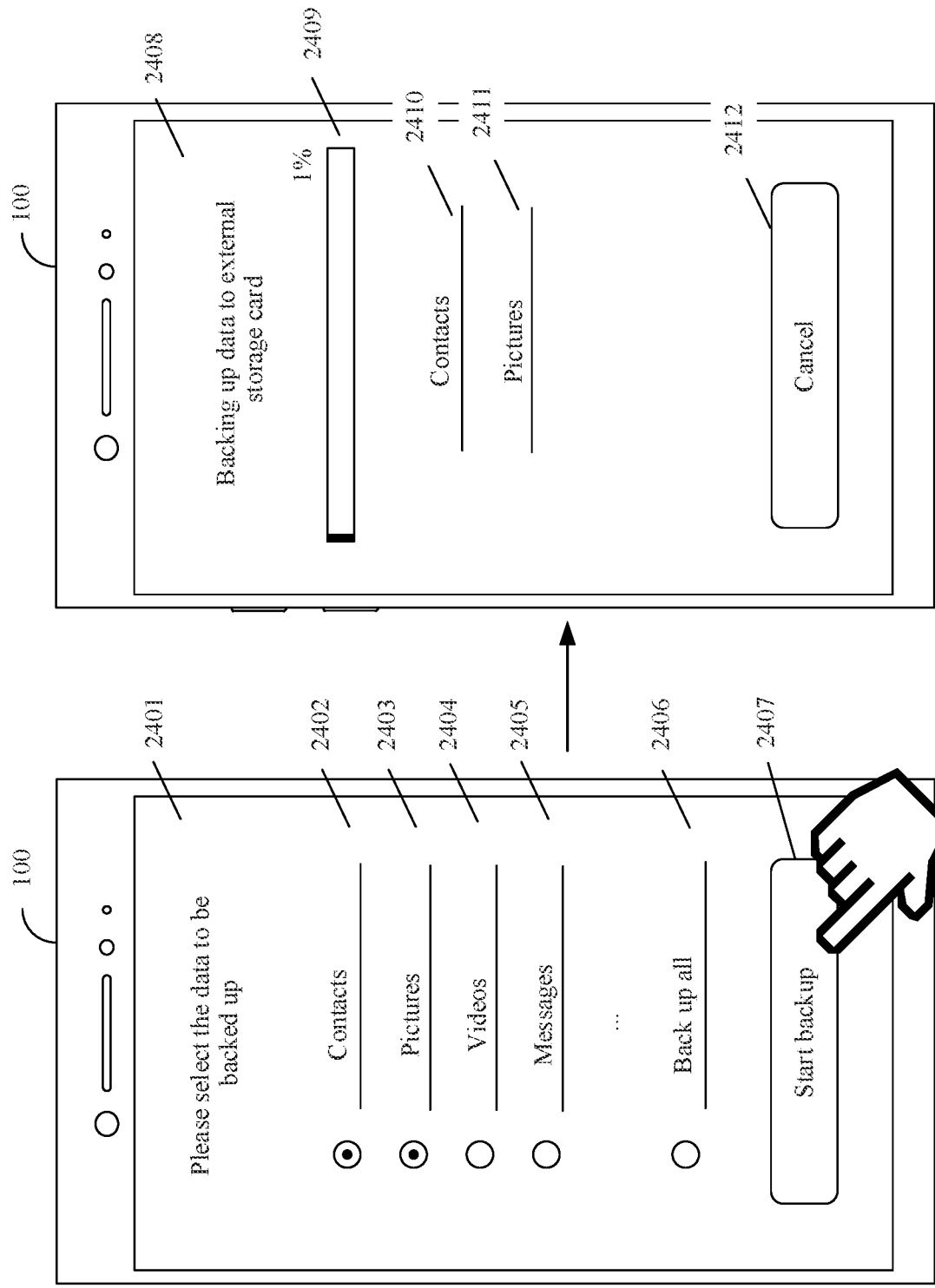

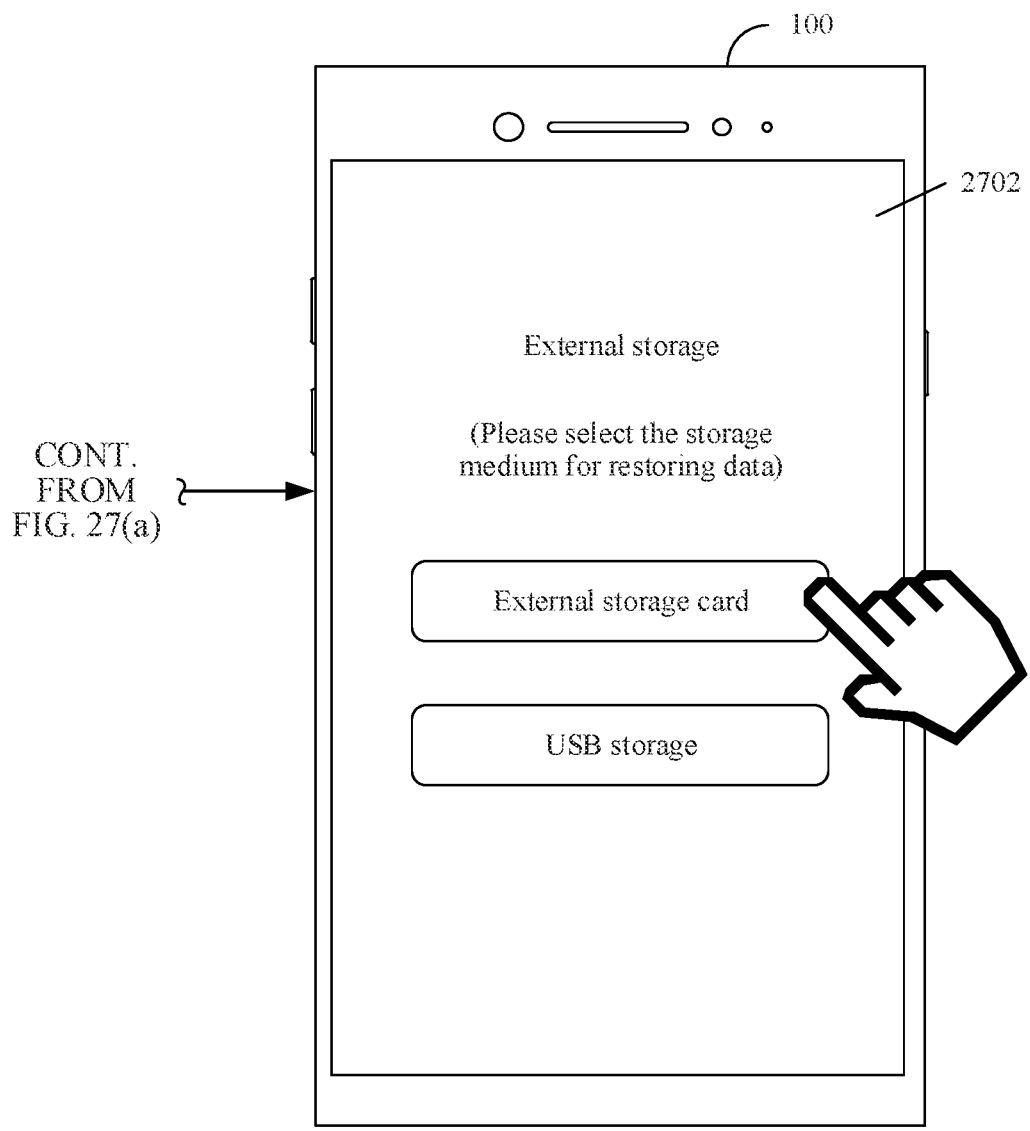

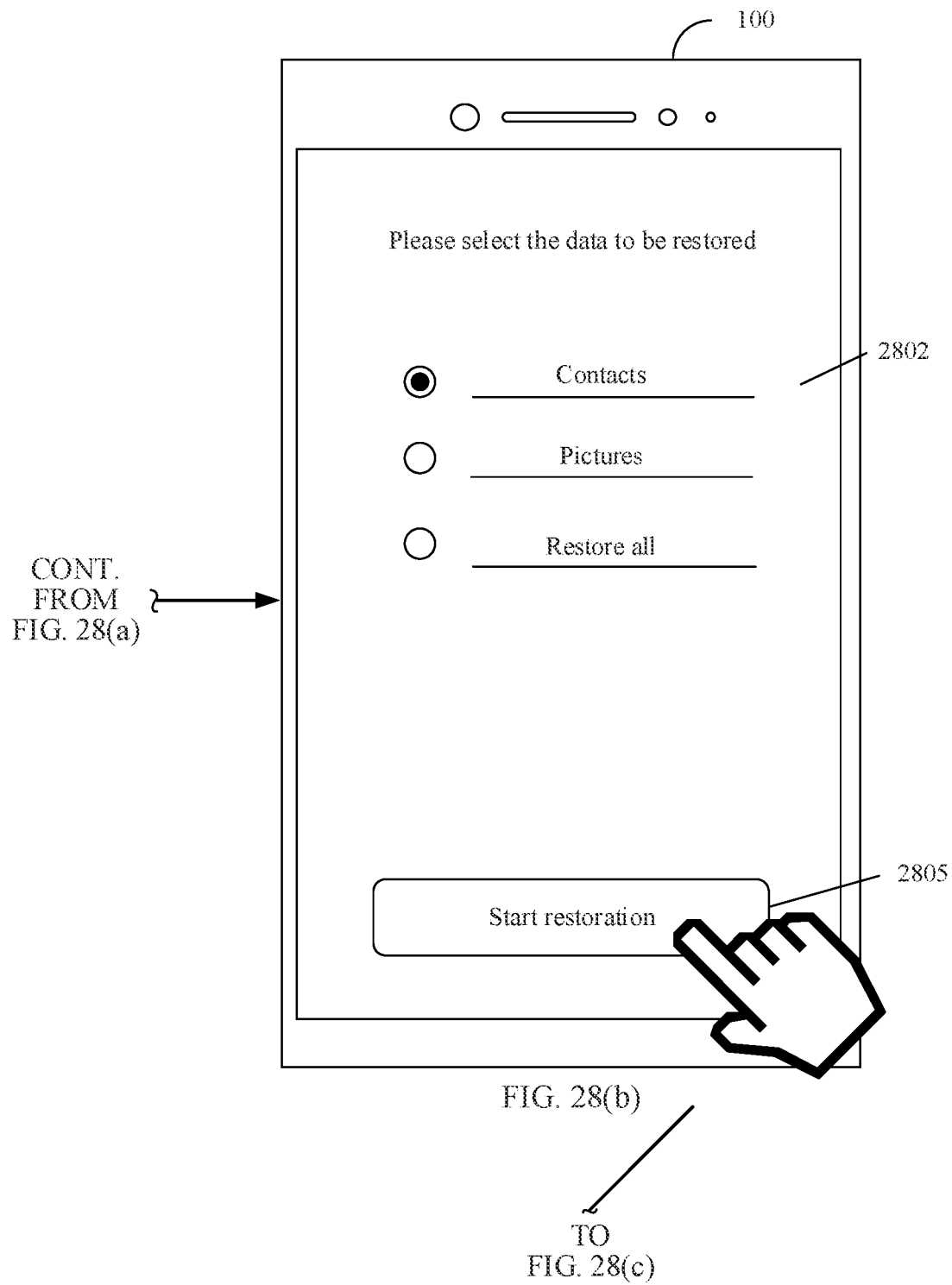

USER DATA BACKUP TO DATA PARTITION OF STORAGE MEDIUM

CROSS-REFERENCE TO RELATED APPLICATIONS

This application is a National Stage of International Patent Application No. PCT/CN2018/115315 filed on Nov. 14, 2018, which claims priority to International Patent Application No. PCT/CN2018/096525 filed on Jul. 20, 2018, both of which are incorporated herein by reference in their entities.

TECHNICAL FIELD

Embodiments of this application relate to the field of storage technologies, and in particular, to a data backup method and a terminal.

BACKGROUND

In a process of starting an operating system such as an Android (Android) system, a read/write operation needs to be performed on a data partition in a terminal. Specifically, during startup of the operating system, a read/write operation needs to be performed on files related to system startup, for example, a system configuration file and a status file that are stored in the data partition.

However, if the data partition encounters a problem such as "the data partition is in a read-only state", "a file that is stored in the data partition and that is related to system startup is damaged", or "system software cannot be compatible with data in the data partition", startup of the operating system is abnormal, and the terminal fails to be powered on. Once the terminal fails to be powered on, user data stored in the terminal cannot be used. In this case, life and work of a user are severely troubled.

In some scenarios, even if the terminal is successfully powered on, after the terminal is powered on, the operating system may repeatedly crash or may be repeatedly restarted due to a problem such as "system software cannot be compatible with data in the data partition" or "third-party software has a defect". In this case, the terminal cannot display a home screen, and therefore cannot be used by the user. To resolve the foregoing problem, the terminal only needs to restore factory settings. However, the user data stored in the terminal is permanently lost after the terminal restores the factory settings. In this case, the life and the work of the user are also severely troubled.

SUMMARY

Embodiments of this application provide a data backup method and a terminal, to back up user data in a terminal when the terminal cannot be used.

According to a first aspect, an embodiment of this application provides a data backup method. The data backup method may be applied to a terminal. The terminal includes a first data partition that supports to start an operating system when the terminal is powered on. The data backup method may include: displaying, by the terminal, a first screen including a factory settings restoration option and a data backup option, where the factory settings restoration option is used to trigger the terminal to restore factory settings; receiving, by the terminal, a first operation performed by a user on the data backup option; starting, by the terminal, the operating system by using a second data partition after receiving the first operation; and after the operating system is successfully started, transmitting, by the terminal, user data in the first data partition to a first storage medium that is located outside the terminal and that is connected to the terminal.

In this embodiment of this application, the terminal may provide the data backup option on the first screen to be used by the terminal to restore the factory settings, to provide a data backup entrance before the user triggers the terminal to restore the factory settings. In this way, before triggering the terminal to restore the factory settings, the user may trigger, by using the data backup option, the terminal to back up the user data.

In addition, only after the operating system of the terminal is started, data (for example, the user data in the first data partition) in the terminal can be accessed, and the terminal can back up the user data in the first data partition. However, the first data partition that is in the terminal and that supports to start the operating system is faulty. Therefore, the terminal cannot start the operating system by using the first data partition. Based on this, after receiving the first operation performed by the user on the data backup option, the terminal may create a virtual data partition (namely, the second data partition), and start the operating system of the terminal by using the second data partition. After the operating system is started, the terminal may transmit the user data to the first storage medium, to back up the user data.

In conclusion, according to the method provided in this embodiment of this application, even if the terminal cannot be used because the first data partition is faulty, before the terminal restores the factory settings (in other words, before the user data is lost), the user can choose whether to back up the user data. In addition, the operating system may be started by using a new data partition (for example, the second data partition), to read the user data in the first data partition, so as to back up the user data. In this way, after the user data is backed up, even if the terminal restores the factory settings, the user can restore the backed-up user data to the terminal that has restored the factory settings, so that the user data is not lost.

According to a second aspect, an embodiment of this application provides a data backup method. The data backup method may be applied to a terminal. The terminal includes a first data partition that supports to start an operating system when the terminal is powered on. The data backup method may include: displaying, by the terminal, a first screen including a factory settings restoration option and a data backup option, where the factory settings restoration option is used to trigger the terminal to restore factory settings; receiving, by the terminal, a first operation performed by a user on the factory settings restoration option; in response to the first operation performed by the user on the factory settings restoration option, displaying, by the terminal, a fifth screen used to indicate the user to determine whether to restore the factory settings, where the fifth screen includes the data backup option; receiving, by the terminal, a first operation performed by the user on the data backup option on the fifth screen; starting, by the terminal, the operating system by using a second data partition after receiving the first operation performed by the user on the data backup option on the fifth screen; and after the operating system is successfully started, transmitting, by the terminal, user data in the first data partition to a first storage medium that is located outside the terminal and that is connected to the terminal.

In this embodiment of this application, even if the user selects the factory settings restoration option on the first screen, the terminal may provide the data backup option on the fifth screen used to indicate the user to determine whether to restore the factory settings, to provide a data backup entrance before the user triggers the terminal to restore the factory settings. In this way, before triggering the terminal to restore the factory settings, the user may trigger, by using the data backup option, the terminal to back up the user data.

In addition, after receiving the first operation performed by the user on the data backup option, the terminal may create a virtual data partition (namely, the second data partition), and start the operating system of the terminal by using the second data partition. After the operating system is started, the terminal may transmit the user data to the first storage medium, to back up the user data.

In conclusion, according to the method provided in this embodiment of this application, even if the terminal cannot be used because the first data partition is faulty, before the terminal restores the factory settings (in other words, before the user data is lost), the user can choose whether to back up the user data. In addition, the operating system may be started by using a new data partition (for example, the second data partition), to read the user data in the first data partition, so as to back up the user data. In this way, after the user data is backed up, even if the terminal restores the factory settings, the user can restore the backed-up user data to the terminal that has restored the factory settings, so that the user data is not lost.

After creating the second data partition, the terminal may first format the second data partition. The terminal may mount the second data partition onto an original mount point (for example, a mount point 1, that is, a directory 1, such as /data) of the first data partition, and mount the first data partition onto a new mount point (for example, a mount point 2, that is, a directory 2, such as /data_old). A directory that needs to be accessed when the terminal starts the operating system is usually unchanged. Therefore, after the newly created second data partition is mounted onto the original mount point of the first data partition, the terminal may use the newly created second data partition when starting the system. For example, the directory that needs to be accessed when the terminal starts the operating system is the directory 1 (such as /data), namely, the previous mount point of the first data partition. In this case, the second data partition is mounted onto the directory 1 (such as /data). Therefore, the terminal may access the directory 1 (such as /data), and start the operating system by using the second data partition currently mounted onto the directory 1.

With reference to the first aspect or the second aspect, in a possible design manner, the terminal may create the second data partition after receiving the first operation. Alternatively, the second data partition may be pre-created. After receiving the first operation, the terminal may directly start the operating system by using the pre-created second data partition.

The terminal may pre-format the pre-created second data partition. After receiving the first operation, the terminal may directly mount the pre-created second data partition onto the original mount point (for example, the mount point 1, that is, the directory 1, such as /data) of the first data partition, and mount the first data partition onto the new mount point (for example, the mount point 2, that is, the directory 2, such as /data_old).

With reference to the first aspect or the second aspect, in another possible design manner, the second data partition is a blank data partition. The blank second data partition does not store any historical data used for running the operating system. To be specific, the second data partition has no problem that may cause a failure to start the operating system. In other words, the terminal can start the operating system by using the blank second data partition.

With reference to the first aspect or the second aspect, in another possible design manner, after the operating system is started, the user may select the first storage medium from the foregoing plurality of storage media, to back up the user data. Specifically, the transmitting, by the terminal, user data in the first data partition to a first storage medium after the operating system is started may include; after the operating system is successfully started, displaying, by the terminal, a second screen including at least two backup options, where each backup option corresponds to one storage medium; receiving, by the terminal, a second operation performed by the user on a first backup option in the at least two backup options, where the first backup option corresponds to the first storage medium; and transmitting, by the terminal, the user data in the first data partition to the first storage medium after receiving the second operation.

In this embodiment of this application, the user may select the first storage medium from the plurality of storage media that are located outside the terminal and that are connected to the terminal. In this way, the terminal may back up the user data to a storage medium that is convenient for the user to use, so that performance of interaction between the terminal and the user can be improved, and user experience can be improved.

It may be understood that, that the terminal is powered on and started by using the second data partition is equivalent to that the terminal is powered on for the first time after delivery. When the terminal is powered on for the first time after delivery, the terminal does not need to perform user identity authentication. However, when the terminal is powered on and started by using the second data, the user data is stored in the first data partition of the terminal. If the terminal does not perform user identity authentication when the terminal is powered on and started by using the second data, a security risk exists.

With reference to the first aspect or the second aspect, in another possible design manner, to improve data security in the terminal, after the operating system is successfully started, the terminal may not directly display the second screen, but first perform user identity authentication. After the user identity authentication succeeds, the terminal displays the second screen. Specifically, the displaying, by the terminal, a second screen after the operating system is successfully started may include: after the operating system is successfully started, displaying, by the terminal, a third screen used to perform user identity authentication; receiving, by the terminal, first identity information entered by the user on the third screen, and performing user identity authentication on the first identity information based on decryption data stored in the first data partition; and displaying, by the terminal, the second screen in response to a fact that the user identity authentication succeeds.

In this embodiment of this application, only after the user identity authentication succeeds, the terminal displays the second screen, and the user can select the first backup option on the second screen to back up the user data. In this way, a malicious user can be prevented from stealing user data in a terminal of another person by using the method in this embodiment of this application, so that security of the data in the terminal can be improved.

With reference to the first aspect or the second aspect, in another possible design manner, when transmitting the user data to the first storage medium, the terminal may further display transmission progress of the user data to the user in real time. Specifically, the method in this embodiment of this application may further include: after receiving the second operation, displaying, by the terminal, a fourth screen including first indication information. The first indication information is used to indicate progress of transmitting the user data by the terminal to the first storage medium. For example, the first indication information may be a text used to indicate the transmission progress of the user data. Alternatively, the first indication information may include a text and a progress bar that are used to indicate the transmission progress of the user data.

In this embodiment of this application, when transmitting the user data to the first storage medium, the terminal displays the transmission progress of the user data to the user in real time. In this way, the transmission progress of the user data can be delivered to the user in real time, so that performance of interaction between the terminal and the user can be improved, and user experience can be improved.

With reference to the first aspect or the second aspect, in another possible design manner, to improve data security in the terminal, after the operating system is successfully started, the terminal may directly display the second screen. However, after receiving the second operation performed by the user on the first backup option on the second screen, the terminal may not first transmit the user data to the first storage medium, but first perform user identity authentication. After the user identity authentication succeeds, the terminal transmits the user data to the first storage medium. Specifically, the transmitting, by the terminal, the user data in the first data partition to the first storage medium after receiving the second operation may include: after receiving the second operation, displaying, by the terminal, a third screen used to perform user identity authentication; receiving, by the terminal, first identity information entered by the user on the third screen, and performing user identity authentication on the first identity information based on decryption data stored in the first data partition; and transmitting, by the terminal, the user data to the first storage medium in response to a fact that the user identity authentication succeeds. Correspondingly, the terminal may display the fourth screen when the user identity authentication succeeds.

In this embodiment of this application, after receiving the second operation performed by the user on the first backup option, the terminal needs to perform user identity authentication. The terminal can transmit the user data to the first storage medium only after the user identity authentication succeeds. In this way, a malicious user can be prevented from stealing user data in a terminal of another person by using the method in this embodiment of this application, so that security of the data in the terminal can be improved.

With reference to the first aspect or the second aspect, in another possible design manner, the second data partition is a virtual data partition. In response to the first operation performed by the user on the data backup option, the terminal may select a storage medium from available storage media of the terminal as the second data partition, and then start the operating system by using the second data partition. The available storage media of the terminal may include an internal memory of the terminal and an external storage card connected to an external memory interface of the terminal.

With reference to the first aspect or the second aspect, in another possible design manner, after the terminal transmits the user data to the first storage medium, when the user data transmission is completed, the terminal may further display a sixth screen. The sixth screen is used to indicate that the user data is successfully backed up. Specifically, the sixth screen may include second indication information. The second indication information is used to indicate that the user data is successfully backed up.

Optionally, the sixth screen may further include a factory settings restoration option. The factory settings restoration option is used to trigger the terminal to restore factory settings. When the user data transmission is completed, the terminal may display the sixth screen including the factory settings restoration option. In this way, the terminal may receive a tap operation performed by the user on the factory settings restoration option on the sixth screen, to restore the factory settings. After backup of the user data in the terminal is completed, the user can restore the backed-up user data to the terminal that has restored the factory settings, so that the user data is not lost.

With reference to the first aspect or the second aspect, in another possible design manner, the terminal may automatically restore the factory settings after the user data transmission is completed. Specifically, the method in this embodiment of this application may further include: restoring, by the terminal, the factory settings in response to completion of the user data transmission.

With reference to the first aspect or the second aspect, in another possible design manner, after the terminal successfully backs up the user data (in other words, after the terminal completes transmitting the user data to the first storage medium), the user may not expect the terminal to automatically restore the factory settings. In this case, after the terminal successfully backs up the user data, the terminal may indicate, on the sixth screen, the user to determine whether to continue to restore the factory settings. If the user chooses to continue to restore the factory settings, the terminal starts to restore the factory settings and displays a screen of restoring the factory settings by the terminal.

With reference to the first aspect or the second aspect, in another possible design manner, the displaying, by the terminal, a first screen may include: displaying, by the terminal, the first screen when detecting a power-on failure of the terminal. A fault of the first data partition causes the power-on failure of the terminal. An entire process of starting the operating system of the terminal may be divided into a plurality of stage points. The plurality of stage points may be referred to as boot-stage (Boot-Stage) points. In a normal startup process of the operating system, after entering a boot-stage point, the terminal enters a next boot-stage point within a specific time period. In the startup process of the operating system, after the terminal enters a boot-stage point, if the terminal does not enter a next boot-stage point within a specific time period, the terminal may determine that the terminal fails to be powered on.

With reference to the first aspect or the second aspect, in another possible design manner, the displaying, by the terminal, a first screen may include: displaying, by the terminal, the first screen in response to a third operation performed the user on a preset shortcut key. For example, the preset shortcut key is used to trigger the terminal to restore the factory settings. The third operation may be a single-tap operation, a double-tap operation, a touch and hold operation, or the like. The preset shortcut key may be any one or a combination of a plurality of buttons such as a "volume +" button, a "volume −" button, and a screen locking button.

With reference to the first aspect or the second aspect, in another possible design manner, the displaying, by the terminal, a first screen may include, displaying, by the terminal, the first screen in response to a preset gesture entered by the user. The preset gesture is used to trigger the terminal to restore the factory settings. For example, the preset gesture may be an S-shaped gesture.

According to a third aspect, an embodiment of this application provides a terminal. The terminal includes a storage unit, a display unit, an input unit, a starting unit, and a transmission unit. The storage unit includes a first data partition, and the first data partition supports to start an operating system when the terminal is powered on. The display unit is configured to display a first screen, where the first screen displayed by the display unit includes a factory settings restoration option and a data backup option, and the factory settings restoration option is used to trigger the terminal to restore factory settings. The input unit is configured to receive a first operation performed by a user on the data backup option displayed by the display unit. The starting unit is configured to start the operating system by using a second data partition after the input unit receives the first operation, where the second data partition is included in the storage unit. The transmission unit is configured to transmit user data in the first data partition to a first storage medium after the starting unit successfully starts the operating system, where the first storage medium is located outside the terminal and is connected to the terminal.

According to a fourth aspect, an embodiment of this application provides a terminal. The terminal includes a storage unit, a display unit, an input unit, a starting unit, and a transmission unit. The storage unit includes a first data partition, and the first data partition supports to start an operating system when the terminal is powered on. The display unit is configured to display a first screen including a factory settings restoration option and a data backup option, where the factory settings restoration option is used to trigger the terminal to restore factory settings. The input unit is configured to receive a first operation performed by a user on the factory settings restoration option displayed by the display unit. The display unit is further configured to display, in response to the first operation performed by the user on the factory settings restoration option, a fifth screen used to indicate the user to determine whether to restore the factory settings, where the fifth screen includes the data backup option. The input unit is further configured to receive a first operation performed by the user on the data backup option on the fifth screen. The starting unit is configured to start the operating system by using a second data partition after the input unit receives the first operation. The transmission unit is configured to: after the operating system is successfully started, transmit user data in the first data partition to a first storage medium that is located outside the terminal and that is connected to the terminal.

With reference to the third aspect or the fourth aspect, in a possible design manner, the terminal further includes a creation unit. The creation unit is configured to create the second data partition after the input unit receives the first operation. The starting unit is configured to start the operating system by using the second data partition created by the creation unit.

Alternatively, the second data partition may be pre-created. After the input unit receives the first operation, the starting unit may directly start the operating system by using the pre-created second data partition.

With reference to the third aspect or the fourth aspect, in a possible design manner, the display unit is further configured to display a second screen after the starting unit successfully starts the operating system and before the transmission unit transmits the user data in the first data partition to the first storage medium, where the second screen includes at least two backup options, and each backup option corresponds to one storage medium. The input unit is further configured to receive a second operation performed by the user on a first backup option in the at least two backup options, where the first backup option corresponds to the first storage medium. The transmission unit is specifically configured to transmit the user data in the first data partition to the first storage medium after the input unit receives the second operation.

With reference to the third aspect or the fourth aspect, in a possible design manner, the display unit is further configured to display a third screen before displaying the second screen, where the third screen is used to perform user identity authentication. The input unit is further configured to receive first identity information entered by the user on the third screen. The terminal further includes an authentication unit. The authentication unit is configured to perform, based on decryption data stored in the first data partition, user identity authentication on the first identity information received by the input unit. The display unit is specifically configured to display the second screen in response to a fact that the user identity authentication performed by the authentication unit succeeds.

With reference to the third aspect or the fourth aspect, in a possible design manner, the display unit is further configured to display a fourth screen after the input unit receives the second operation. The fourth screen displayed by the display unit includes first indication information, and the first indication information is used to indicate progress of transmitting the user data by the terminal to the first storage medium.

With reference to the third aspect or the fourth aspect, in a possible design manner, the display unit is further configured to: before the transmission unit transmits the user data in the first data partition to the first storage medium, display a third screen after the second operation is received, where the third screen is used to perform user identity authentication. The input unit is further configured to receive first identity information entered by the user on the third screen. The terminal further includes an authentication unit. The authentication unit is configured to perform, based on decryption data stored in the first data partition, user identity authentication on the first identity information entered by using the input unit. The transmission unit is specifically configured to transmit, by the terminal, the user data to the first storage medium in response to a fact that the user identity authentication succeeds.

With reference to the third aspect or the fourth aspect, in a possible design manner, the second data partition is a virtual data partition.

With reference to the third aspect or the fourth aspect, in a possible design manner, the display unit is further configured to display a fourth screen in response to a fact that the user identity authentication performed by the authentication unit succeeds. The fourth screen displayed by the display unit includes first indication information, and the first indication information is used to indicate progress of transmitting the user data by the terminal to the first storage medium.

With reference to the third aspect or the fourth aspect, in a possible design manner, the display unit is further configured to: after the transmission unit transmits the user data in the first data partition to the first storage medium, display a sixth screen in response to completion of the user data transmission. The sixth screen displayed by the display unit includes second indication information, and the second indication information is used to indicate that the user data is successfully backed up.

With reference to the third aspect or the fourth aspect, in a possible design manner, the sixth screen further includes a factory settings restoration option, and the factory settings restoration option is used to trigger the terminal to restore factory settings.

With reference to the third aspect or the fourth aspect, in a possible design manner, the terminal further includes a restoration unit. The restoration unit is configured to: after the transmission unit transmits the user data in the first data partition to the first storage medium, restore, by the terminal, the factory settings in response to completion of the user data transmission.

With reference to the third aspect or the fourth aspect, in a possible design manner, the terminal further includes a detection unit. The detection unit is configured to detect a power-on failure of the terminal. The display unit is configured to display the first screen when the detection unit detects the power-on failure of the terminal, where a fault of the first data partition causes the power-on failure of the terminal.

With reference to the third aspect or the fourth aspect, in a possible design manner, the display unit is configured to display the first screen in response to a third operation performed by the user on a preset shortcut key, where the preset shortcut key is used to trigger the terminal to restore the factory settings.

With reference to the third aspect or the fourth aspect, in a possible design manner, the display unit is configured to display the first screen in response to a preset gesture entered by the user, where the preset gesture is used to trigger the terminal to restore the factory settings.

According to a fifth aspect, an embodiment of this application provides a terminal. The terminal includes one or more processors, a memory, a touchscreen, and a communications interface. The memory includes a first data partition, and the first data partition is used to support to start an operating system when the terminal is powered on. The memory, the touchscreen, and the communications interface are coupled to the one or more processors. The memory is configured to store computer program code. The computer program code includes a computer instruction. When the one or more processors execute the computer instruction, the terminal performs the following operations. The touchscreen is configured to display a first screen, where the first screen includes a factory settings restoration option and a data backup option, and the factory settings restoration option is used to trigger the terminal to restore factory settings. The processor is configured to start the operating system by using a second data partition after receiving a first operation performed by a user on the data backup option displayed on the touchscreen. The second data partition is included in the memory. The processor is further configured to transmit user data in the first data partition to a first storage medium through the communications interface after the operating system is successfully started, where the first storage medium is located outside the terminal and is connected to the terminal.

According to a sixth aspect, an embodiment of this application provides a terminal. The terminal includes one or more processors, a memory, a touchscreen, and a communications interface. The memory includes a first data partition, and the first data partition is used to support to start an operating system when the terminal is powered on. The memory, the touchscreen, and the communications interface are coupled to the one or more processors. The memory is configured to store computer program code. The computer program code includes a computer instruction. When the one or more processors execute the computer instruction, the terminal performs the following operations. The touchscreen is configured to display a first screen, where the first screen includes a factory settings restoration option and a data backup option, and the factory settings restoration option is used to trigger the terminal to restore factory settings. The processor is configured to control, in response to a first operation performed by a user on the factory settings restoration option displayed on the touchscreen, the touchscreen to display a fifth screen used to indicate the user to determine whether to restore the factory settings, where the fifth screen includes the data backup option. The processor is configured to start the operating system by using a second data partition after receiving a first operation performed by the user on the data backup option on the fifth screen displayed on the touchscreen. The second data partition is included in the memory. The processor is further configured to transmit user data in the first data partition to a first storage medium through the communications interface after the operating system is successfully started, where the first storage medium is located outside the terminal and is connected to the terminal.

With reference to the fifth aspect or the sixth aspect, in a possible design manner, the processor is further configured to: after the operating system is successfully started, control the touchscreen to display a second screen, where the second screen includes at least two backup options, and each backup option corresponds to one storage medium. The processor is further configured to transmit the user data in the first data partition to the first storage medium through the communications interface after receiving a second operation performed by the user on a first backup option in the at least two backup options displayed on the touchscreen, where the first backup option corresponds to the first storage medium.

With reference to the fifth aspect or the sixth aspect, in a possible design manner, that the processor is configured to start the operating system by using a second data partition after receiving a first operation performed by the user on the data backup option on the fifth screen displayed on the touchscreen includes: the processor is configured to: after receiving the first operation performed by the user on the data backup option on the fifth screen displayed on the touchscreen, create the second data partition, and start the operating system by using the second data partition.

Alternatively, the second data partition may be pre-created. After receiving the first operation, the processor may directly start the operating system by using the pre-created second data partition.

With reference to the fifth aspect or the sixth aspect, in a possible design manner, the processor is further configured to: after the operating system is successfully started, control the touchscreen to display a third screen, where the third screen is used to perform user identity authentication. The processor is further configured to: receive first identity information entered by the user on the third screen displayed on the touchscreen, perform user identity authentication on the first identity information based on decryption data stored in the first data partition, and control the touchscreen to display the second screen in response to a fact that the user identity authentication succeeds.

With reference to the fifth aspect or the sixth aspect, in a possible design manner, the processor is further configured to: after receiving the second operation, control the touchscreen to display a fourth screen. The fourth screen includes first indication information, and the first indication information is used to indicate progress of transmitting the user data by the terminal to the first storage medium.

With reference to the fifth aspect or the sixth aspect, in a possible design manner, the processor is further configured to: after receiving the second operation, control the touchscreen to display a third screen, where the third screen is used to perform user identity authentication. The processor is further configured to: receive first identity information entered by the user on the third screen displayed on the touchscreen, perform user identity authentication on the first identity information based on decryption data stored in the first data partition, and transmit the user data to the first storage medium through the communications interface in response to a fact that the user identity authentication succeeds.

With reference to the fifth aspect or the sixth aspect, in a possible design manner, the processor is further configured to control, in response to a fact that the user identity authentication succeeds, the touchscreen to display a fourth screen. The fourth screen includes first indication information, and the first indication information is used to indicate progress of transmitting the user data by the terminal to the first storage medium.

With reference to the fifth aspect or the sixth aspect, in a possible design manner, the second data partition is a virtual data partition.

With reference to the fifth aspect or the sixth aspect, in a possible design manner, the processor is further configured to control, in response to completion of the user data transmission, the touchscreen to display a sixth screen. The sixth screen includes second indication information, and the second indication information is used to indicate that the user data is successfully backed up.

With reference to the fifth aspect or the sixth aspect, in a possible design manner, the sixth screen displayed on the touchscreen further includes a factory settings restoration option, and the factory settings restoration option is used to trigger the terminal to restore factory settings.

With reference to the fifth aspect or the sixth aspect, in a possible design manner, the processor is further configured to restore the factory settings in response to completion of the user data transmission.

With reference to the fifth aspect or the sixth aspect, in a possible design manner, the processor is further configured to: detect a power-on failure of the terminal, and control the touchscreen to display the first screen, where a fault of the first data partition causes the power-on failure of the terminal. Alternatively, the processor is further configured to control, in response to a third operation performed by the user on a preset shortcut key, the touchscreen to display the first screen, where the preset shortcut key is used to trigger the terminal to restore the factory settings. Alternatively, the processor is further configured to control, in response to a preset gesture entered by the user on the touchscreen, the touchscreen to display the first screen, where the preset gesture is used to trigger the terminal to restore the factory settings.

According to a seventh aspect, an embodiment of this application provides a data backup method. The method may be applied to a terminal, and the terminal includes a first data partition that supports to start an operating system when the terminal is powered on. The data backup method may include: starting, by the terminal, the operating system by using a blank second data partition when detecting a power-on failure of the terminal or detecting a preset operation of a user; and transmitting, by the terminal, user data in the first data partition to a first storage medium after the operating system is successfully started. The first storage medium is located outside the terminal and is connected to the terminal.

The blank second data partition does not store any historical data used for running the operating system. To be specific, the second data partition has no problem that may cause a failure to start the operating system. In other words, the terminal can start the operating system by using the blank second data partition.

In this embodiment of this application, even if the terminal cannot be used because the first data partition is faulty, before restoring factory settings (in other words, before the user data is lost), the terminal may start the operating system by using a blank data partition (for example, the second data partition), to read the user data in the first data partition, so as to back up the user data. In this way, after the user data is backed up, even if the terminal restores the factory settings, the user can restore the backed-up user data to the terminal that has restored the factory settings, so that the user data is not lost.

With reference to the seventh aspect, in a possible design manner, before the starting the operating system by using a blank second data partition, the method in this embodiment of this application may further include: automatically creating, by the terminal, the second data partition when detecting the power-on failure of the terminal or detecting the preset operation. In other words, if the terminal detects the power-on failure of the terminal or detects the preset operation, the terminal may automatically create the second data partition without requiring the user to perform any operation.

With reference to the seventh aspect, in another possible design manner, before the starting the operating system by using a blank second data partition, the method in this embodiment of this application may further include: displaying, by the terminal when detecting the power-on failure of the terminal or detecting the preset operation, a first screen including a data backup option; receiving, by the terminal, a first operation performed by the user on the data backup option: and creating, by the terminal, the second data partition in response to the first operation.

The terminal may display the first screen when detecting the power-on failure of the terminal or detecting the preset operation, and provide the data backup option on the first screen, so as to provide a data backup entrance before the user triggers the terminal to restore the factory settings. In this way, before triggering the terminal to restore the factory settings, the user may trigger, by using the data backup option, the terminal to back up the user data.

It should be noted that, in some application scenarios, if the terminal cannot be powered on (for example, the terminal always displays a blank screen and cannot respond to any operation of the user), the terminal cannot display the first screen. In this case, w% ben detecting the power-on failure of the terminal or detecting the preset operation, the terminal may automatically create the second data partition.

After creating the second data partition, the terminal may first format the second data partition. The terminal may mount the second data partition onto an original mount point (for example, a mount point 1, that is, a directory 1, such as /data) of the first data partition, and mount the first data partition onto a new mount point (for example, a mount point 2, that is, a directory 2, such as /data_old). A directory that needs to be accessed when the terminal starts the operating system is usually unchanged. Therefore, after the newly created second data partition is mounted onto the original mount point of the first data partition, the terminal may use the newly created second data partition when starting the system. For example, the directory that needs to be accessed when the terminal starts the operating system is the directory 1 (such as /data), namely, the previous mount point of the first data partition. In this case, the second data partition is mounted onto the directory 1 (such as /data). Therefore, the terminal may access the directory 1 (such as /data), and start the operating system by using the second data partition currently mounted onto the directory 1.

With reference to the seventh aspect, in another possible design manner, the second data partition may be pre-created. The terminal may start the operating system by using the pre-created second data partition when detecting the power-on failure of the terminal or detecting the preset operation. The terminal may pre-format the pre-created second data partition. When detecting the power-on failure of the terminal or detecting the preset operation, the terminal may mount the pre-created second data partition onto the original mount point (for example, the mount point 1, that is, the directory 1, such as /data) of the first data partition, and mount the first data partition onto the new mount point (for example, the mount point 2, that is, the directory 2, such as /data_old). In this way, the terminal may access the directory 1 (such as /data), and start the operating system by using the second data partition currently mounted onto the directory 1.

Optionally, the first screen may further include a factory settings restoration option. The factory settings restoration option is used to trigger the terminal to restore factory settings. The terminal may receive a first operation performed by the user on the factory settings restoration option. In response to the first operation performed by the user on the factory settings restoration option, the terminal may display a fifth screen used to indicate the user to determine whether to restore the factory settings, where the fifth screen includes the data backup option. The terminal receives a first operation performed by the user on the data backup option on the fifth screen. In response to the first operation performed by the user on the data backup option on the fifth screen, the terminal creates the second data partition, and starts the operating system by using the second data partition. After the operating system is successfully started, the terminal transmits the user data in the first data partition to the first storage medium.

In this embodiment of this application, even if the user selects the factory settings restoration option on the first screen, the terminal may provide the data backup option on the fifth screen used to indicate the user to determine whether to restore the factory settings, to provide a data backup entrance before the user triggers the terminal to restore the factory settings. In this way, before triggering the terminal to restore the factory settings, the user may trigger, by using the data backup option, the terminal to back up the user data.

With reference to the seventh aspect, in another possible design manner, the second data partition is a virtual data partition.

It may be understood that, that the terminal is powered on and started by using the second data partition is equivalent to that the terminal is powered on for the first time after delivery. Usually, when the terminal is powered on for the first time after delivery, the terminal does not need to perform user identity authentication. However, after starting the operating system by using the second data, the terminal may back up previous user data. If the terminal does not perform user identity authentication when the terminal is powered on and started by using the second data partition, a security risk exists.

Based on this, with reference to the seventh aspect, in another possible design manner, to improve data security in the terminal, the terminal may perform user identity authentication after the operating system is successfully started. The terminal transmits the user data in the first data partition to the first storage medium after the user identity authentication succeeds.

The terminal transmits the user data in the first data partition to the first storage medium only after the user identity authentication succeeds. In this way, data security in the terminal can be improved.

With reference to the seventh aspect, in another possible design manner, a method for performing user identity authentication by the terminal may include: displaying, by the terminal, a third screen used to perform user identity authentication; and receiving, by the terminal, first identity information entered by the user on the third screen, and performing user identity authentication on the first identity information based on decryption data stored in the first data partition.

With reference to the seventh aspect, in another possible design manner, after the user identity authentication succeeds, the terminal may display a seventh screen including a data backup option. The terminal may receive a first operation performed by the user on the data backup option on the seventh screen. After receiving the first operation, the terminal transmits the user data in the first data partition to the first storage medium.

The terminal may display the seventh screen after the user identity authentication succeeds, and provide the data backup option on the seventh screen, so as to provide a data backup entrance before the user triggers the terminal to restore the factory settings. In this way, before triggering the terminal to restore the factory settings, the user may trigger, by using the data backup option, the terminal to back up the user data.

With reference to the seventh aspect, in another possible design manner, the terminal can be connected to a plurality of storage media. Therefore, after the user identity authentication succeeds, the user may select the first storage medium from the plurality of storage media to back up the user data. Specifically, after receiving the first operation performed by the user on the data backup option on the seventh screen, the terminal may display a second screen. The second screen includes at least one backup option, and each backup option corresponds to one storage medium. The terminal receives a second operation performed by the user on a first backup option in the at least one backup option, where the first backup option corresponds to the first storage medium. The terminal may transmit the user data in the first data partition to the first storage medium after receiving the second operation performed by the user on the first backup option.

In this embodiment of this application, the user may select the first storage medium from the plurality of storage media connected to the terminal. In this way, the terminal may back up the user data to a storage medium that is convenient for the user to use, so that performance of interaction between the terminal and the user can be improved, and user experience can be improved.

With reference to the seventh aspect, in another possible design manner, the first data partition may store a plurality of types of user data. In this embodiment of this application, the user may select user data that needs to be backed up. Specifically, in response to the second operation performed by the user on the first backup option, the terminal may display an eighth screen. The eighth screen includes at least one data option, each data option corresponds to one group of data that is to be backed up, and data corresponding to the at least one data option is the user data in the first data partition. The terminal receives a second operation performed by the user on a first data option in the at least one data option. The terminal may transmit data corresponding to the first data option to the first storage medium in response to the second operation performed by the user on the first data option.

With reference to the seventh aspect, in another possible design manner, when transmitting the user data to the first storage medium, the terminal may further display transmission progress of the user data to the user in real time. Specifically, the method in this embodiment of this application may further include: in a process in which the terminal transmits the user data in the first data partition to the first storage medium, displaying, by the terminal, a fourth screen including first indication information. The first indication information is used to indicate progress of transmitting the user data by the terminal to the first storage medium. For example, the first indication information may be a text used to indicate the transmission progress of the user data. Alternatively, the first indication information may include a text and a progress bar that are used to indicate the transmission progress of the user data.

With reference to the seventh aspect, in another possible design manner, the seventh screen further includes a factory settings restoration option. The terminal may receive a first operation performed by the user on the factory settings restoration option on the seventh screen. The terminal may display the fifth screen in response to the first operation performed by the user on the factory settings restoration option. The terminal may receive the first operation performed by the user on the data backup option on the fifth screen.

In this embodiment of this application, even if the user selects the factory settings restoration option on the seventh screen, the terminal may provide the data backup option on the fifth screen used to indicate the user to determine whether to restore the factory settings, to provide a data backup entrance before the user triggers the terminal to restore the factory settings. In this way, before triggering the terminal to restore the factory settings, the user may trigger, by using the data backup option, the terminal to back up the user data.

With reference to the seventh aspect, in another possible design manner, after the terminal transmits the user data to the first storage medium, when the user data transmission is completed, the terminal may further display a sixth screen. The sixth screen is used to indicate that the user data is successfully backed up. Specifically, the sixth screen may include second indication information. The second indication information is used to indicate that the user data is successfully backed up.

Optionally, the sixth screen may further include a factory settings restoration option. The factory settings restoration option is used to trigger the terminal to restore factory settings. When the user data transmission is completed, the terminal may display the sixth screen including the factory settings restoration option. In this way, the terminal may receive a tap operation performed by the user on the factory settings restoration option on the sixth screen, to restore the factory settings. After backup of the user data in the terminal is completed, the user can restore the backed-up user data to the terminal that has restored the factory settings, so that the user data is not lost.

With reference to the seventh aspect, in another possible design manner, the terminal may automatically restore the factory settings after the user data transmission is completed. Specifically, the method in this embodiment of this application may further include: restoring, by the terminal, the factory settings in response to completion of the user data transmission.

With reference to the seventh aspect, in another possible design manner, after the terminal successfully backs up the user data (in other words, after the terminal completes transmitting the user data to the first storage medium), the user may not expect the terminal to automatically restore the factory settings. In this case, after the terminal successfully backs up the user data, the terminal may indicate, on the sixth screen, the user to determine whether to continue to restore the factory settings. If the user chooses to continue to restore the factory settings, the terminal starts to restore the factory settings and displays a screen of restoring the factory settings by the terminal.

According to an eighth aspect, an embodiment of this application provides a terminal. The terminal includes a storage unit. The storage unit includes a first data partition, and the first data partition supports to start an operating system when the terminal is powered on. The terminal may further include a detection unit, a starting unit, and a transmission unit. The detection unit is configured to detect a power-on failure of the terminal or detect a preset operation of a user. The starting unit is configured to start the operating system by using a blank second data partition when the detection unit detects the power-on failure of the terminal or detects the preset operation. The transmission unit is configured to transmit, by the terminal, user data in the first data partition to a first storage medium after the operating system is successfully started, where the first storage medium is located outside the terminal and is connected to the terminal.

With reference to the eighth aspect, in a possible design manner, the terminal may further include a creation unit. The creation unit is configured to automatically create the second data partition when the detection unit detects the power-on failure of the terminal or detects the preset operation.

With reference to the eighth aspect, in another possible design manner, the terminal further includes a display unit, an input unit, and a creation unit. The display unit is configured to display a first screen when the detection unit detects the power-on failure of the terminal or detects the preset operation, where the first screen includes a data backup option. The input unit is configured to receive a first operation performed by a user on the data backup option displayed by the display unit. The creation unit is configured to create the second data partition in response to the first operation.

With reference to the eighth aspect, in another possible design manner, the second data partition may be pre-created. The starting unit is specifically configured to start the operating system by using the pre-created second data partition when the detection unit detects the power-on failure of the terminal or detects the preset operation.

With reference to the eighth aspect, in another possible design manner, the terminal further includes an authentication unit. The authentication unit is configured to: before the transmission unit transmits the user data to the first storage medium, perform user identity authentication after the operating system is successfully started. The transmission unit is specifically configured to transmit the user data in the first data partition to the first storage medium after the user identity authentication performed by the authentication unit succeeds.

With reference to the eighth aspect, in another possible design manner, the display unit is configured to display a third screen after the operating system is successfully started, where the third screen is used to perform user identity authentication. The input unit is configured to receive first identity information entered by the user on the third screen displayed by the display unit. The authentication unit is specifically configured to perform user identity authentication on the first identity information based on decryption data stored in the first data partition.

With reference to the eighth aspect, in another possible design manner, the display unit is configured to display a seventh screen after the user identity authentication succeeds, where the seventh screen includes a data backup option. The input unit is configured to receive a first operation performed by the user on the data backup option displayed by the display unit. The transmission unit is configured to transmit the user data in the first data partition to the first storage medium after the input unit receives the first operation.

With reference to the eighth aspect, in another possible design manner, the display unit is further configured to display a second screen after the input unit receives the first operation, where the second screen includes at least one backup option, and each backup option corresponds to one storage medium. The input unit is further configured to receive a second operation performed by the user on a first backup option in the at least one backup option displayed by the display unit, where the first backup option corresponds to the first storage medium. The transmission unit is configured to transmit the user data in the first data partition to the first storage medium after the input unit receives the second operation performed by the user on the first backup option.

With reference to the eighth aspect, in another possible design manner, the display unit is further configured to display an eighth screen in response to the second operation performed by the user on the first backup option, where the eighth screen includes at least one data option, each data option corresponds to one group of data that is to be backed up, and data corresponding to the at least one data option is the user data in the first data partition. The input unit is further configured to receive a second operation performed by the user on a first data option in the at least one data option. The transmission unit is further configured to transmit data corresponding to the first data option to the first storage medium in response to the second operation performed by the user on the first data option.

With reference to the eighth aspect, in another possible design manner, the display unit is configured to display a fourth screen in a process in which the transmission unit transmits the user data in the first data partition to the first storage medium.

The fourth screen includes first indication information, and the first indication information is used to indicate progress of transmitting the user data by the terminal to the first storage medium.

With reference to the eighth aspect, in another possible design manner, the second data partition is a virtual data partition.

With reference to the eighth aspect, in another possible design manner, the seventh screen displayed by the display unit further includes a factory settings restoration option. The input unit is further configured to receive a first operation performed by the user on the factory settings restoration option on the seventh screen. The display unit is further configured to display a fifth screen in response to the first operation performed by the user on the factory settings restoration option, where the fifth screen is used to indicate the user to determine whether to restore factory settings, and the fifth screen includes the data backup option. That the input unit is configured to receive a first operation performed by the user on the data backup option includes: the input unit is configured to receive the first operation performed by the user on the data backup option on the fifth screen.

With reference to the eighth aspect, in another possible design manner, the display unit is configured to: after the transmission unit transmits the user data in the first data partition to the first storage medium, display a sixth screen in response to completion of the user data transmission. The sixth screen includes second indication information, and the second indication information is used to indicate that the user data is successfully backed up.

With reference to the eighth aspect, in another possible design manner, the sixth screen displayed by the display unit further includes a factory settings restoration option, and the factory settings restoration option is used to trigger the terminal to restore factory settings.

With reference to the eighth aspect, in another possible design manner, the terminal further includes a restoration unit. The restoration unit is configured to: after the transmission unit transmits the user data in the first data partition to the first storage medium, restore the factory settings in response to completion of the user data transmission.

According to a ninth aspect, an embodiment of this application provides a terminal. The terminal includes one or more processors, a memory, a touchscreen, and a communications interface. The memory includes a first data partition, and the first data partition is used to support to start an operating system when the terminal is powered on. The memory, the touchscreen, and the communications interface are coupled to the one or more processors. The memory is configured to store computer program code. The computer program code includes a computer instruction. When the one or more processors execute the computer instruction, the terminal performs the following operations. The processor is configured to: start the operating system by using a blank second data partition when detecting a power-on failure of the terminal or detecting a preset operation of a user; and transmit user data in the first data partition to a first storage medium through the communications interface after the operating system is successfully started, where the first storage medium is located outside the terminal and is connected to the terminal.

With reference to the ninth aspect, in a possible design manner, the processor is configured to: before starting the operating system by using the blank second data partition, automatically create the second data partition when detecting the power-on failure of the terminal or detecting the preset operation.

With reference to the ninth aspect, in another possible design manner, the processor is configured to: before starting the operating system by using the blank second data partition, when detecting the power-on failure of the terminal or detecting the preset operation, control the touchscreen to display a first screen, where the first screen includes a data backup option. The processor is further configured to: receive a first operation performed by the user on the data backup option; and create the second data partition in response to the first operation.

With reference to the ninth aspect, in another possible design manner, the second data partition may be pre-created. The pre-created second data partition is in the memory, for example, in a high-speed random access memory (Random Access Memory, RAM) of the terminal. The processor is specifically configured to start the operating system by using the pre-created second data partition when detecting the power-on failure of the terminal or detecting the preset operation.

With reference to the ninth aspect, in a possible design manner, the processor is further configured to: before transmitting the user data in the first data partition to the first storage medium through the communications interface, perform user identity authentication after the operating system is successfully started. The processor is further configured to transmit the user data in the first data partition to the first storage medium through the communications interface after the user identity authentication succeeds.

With reference to the ninth aspect, in a possible design manner, the processor is further configured to: after the operating system is successfully started, control the touchscreen to display a third screen, where the third screen is used to perform user identity authentication. The processor is further configured to: receive first identity information entered by the user on the third screen, and perform user identity authentication on the first identity information based on decryption data stored in the first data partition.

With reference to the ninth aspect, in a possible design manner, the processor is further configured to: after the user identity authentication succeeds, control the touchscreen to display a seventh screen, where the seventh screen includes a data backup option. The processor is further configured to: receive a first operation performed by the user on the data backup option; and transmit the user data in the first data partition to the first storage medium through the communications interface after receiving the first operation.

With reference to the ninth aspect, in a possible design manner, the processor is further configured to: after receiving the first operation, control the touchscreen to display a second screen, where the second screen includes at least one backup option, and each backup option corresponds to one storage medium. The processor is further configured to: receive a second operation performed by the user on a first backup option in the at least one backup option, where the first backup option corresponds to the first storage medium; and transmit the user data in the first data partition to the first storage medium through the communications interface after receiving the second operation performed by the user on the first backup option.

With reference to the ninth aspect, in a possible design manner, the processor is further configured to control, in response to the second operation performed by the user on the first backup option, the touchscreen to display an eighth screen, where the eighth screen includes at least one data option, each data option corresponds to one group of data that is to be backed up, and data corresponding to the at least one data option is the user data in the first data partition. The processor is further configured to: receive a second operation performed by the user on a first data option in the at least one data option; and transmit data corresponding to the first data option to the first storage medium through the communications interface in response to the second operation performed by the user on the first data option.

With reference to the ninth aspect, in a possible design manner, the processor is further configured to control the touchscreen to display a fourth screen in a process in which the user data in the first data partition is transmitted to the first storage medium through the communications interface. The fourth screen includes first indication information, and the first indication information is used to indicate progress of transmitting the user data by the terminal to the first storage medium.

With reference to the ninth aspect, in a possible design manner, the second data partition is a virtual data partition.

With reference to the ninth aspect, in a possible design manner, the seventh screen further includes a factory settings restoration option. The processor is further configured to: after the touchscreen displays the seventh screen, receive a first operation performed by the user on the factory settings restoration option; control, in response to the first operation performed by the user on the factory settings restoration option, the touchscreen to display a fifth screen, where the fifth screen is used to indicate the user to determine whether to restore factory settings, and the fifth screen includes the data backup option; and receive a first operation performed by the user on the data backup option on the fifth screen.

With reference to the ninth aspect, in a possible design manner, the processor is further configured to control, in response to completion of the user data transmission, the touchscreen to display a sixth screen. The sixth screen includes second indication information, and the second indication information is used to indicate that the user data is successfully backed up.

With reference to the ninth aspect, in a possible design manner, the sixth screen further includes a factory settings restoration option, and the factory settings restoration option is used to trigger the terminal to restore factory settings.

With reference to the ninth aspect, in a possible design manner, the processor is further configured to restore the factory settings in response to completion of the user data transmission.

According to a tenth aspect, an embodiment of this application provides a computer storage medium, including a computer instruction. When the computer instruction is run on a terminal, the terminal is enabled to perform the data backup method according to the first aspect, the second aspect, the seventh aspect, and the possible design manners of the first aspect, the second aspect, and the seventh aspect.

According to an eleventh aspect, an embodiment of this application provides a computer program product. When the computer program product is run on a computer, the computer is enabled to perform the data backup method according to the first aspect, the second aspect, the seventh aspect, and the possible design manners of the first aspect, the second aspect, and the seventh aspect.

It may be understood that, the terminal according to the third aspect to the sixth aspect, the eighth aspect, the ninth aspect, and the possible design manners thereof, the computer storage medium according to the tenth aspect, and the computer program product according to the eleventh aspect are all configured to perform the corresponding methods provided above. Therefore, for beneficial effects that can be achieved by the terminal according to the third aspect to the sixth aspect, the eighth aspect, the ninth aspect, and the possible design manners thereof, the computer storage medium according to the tenth aspect, and the computer program product according to the eleventh aspect, refer to the beneficial effects in the corresponding methods provided above. Details are not described herein again.

BRIEF DESCRIPTION OF DRAWINGS

FIG. 1(a) to FIG. 1(c) are a schematic diagram of an example of a terminal screen according to an embodiment of this application:

FIG. 19A(1) and FIG. 19A(2) are a schematic diagram of an example of another terminal screen according to an embodiment of this application;

FIG. 22(*a*) and FIG. 22(*b*) are a schematic diagram of an example of another terminal screen according to an embodiment of this application:

FIG. 23B(1) to FIG. 23B(4) are a schematic diagram of an example of another terminal screen according to an embodiment of this application;

FIG. 24B(1) and FIG. 24B(2) are a schematic diagram of an example of another terminal screen according to an embodiment of this application;

DESCRIPTION OF EMBODIMENTS

Figure 2:
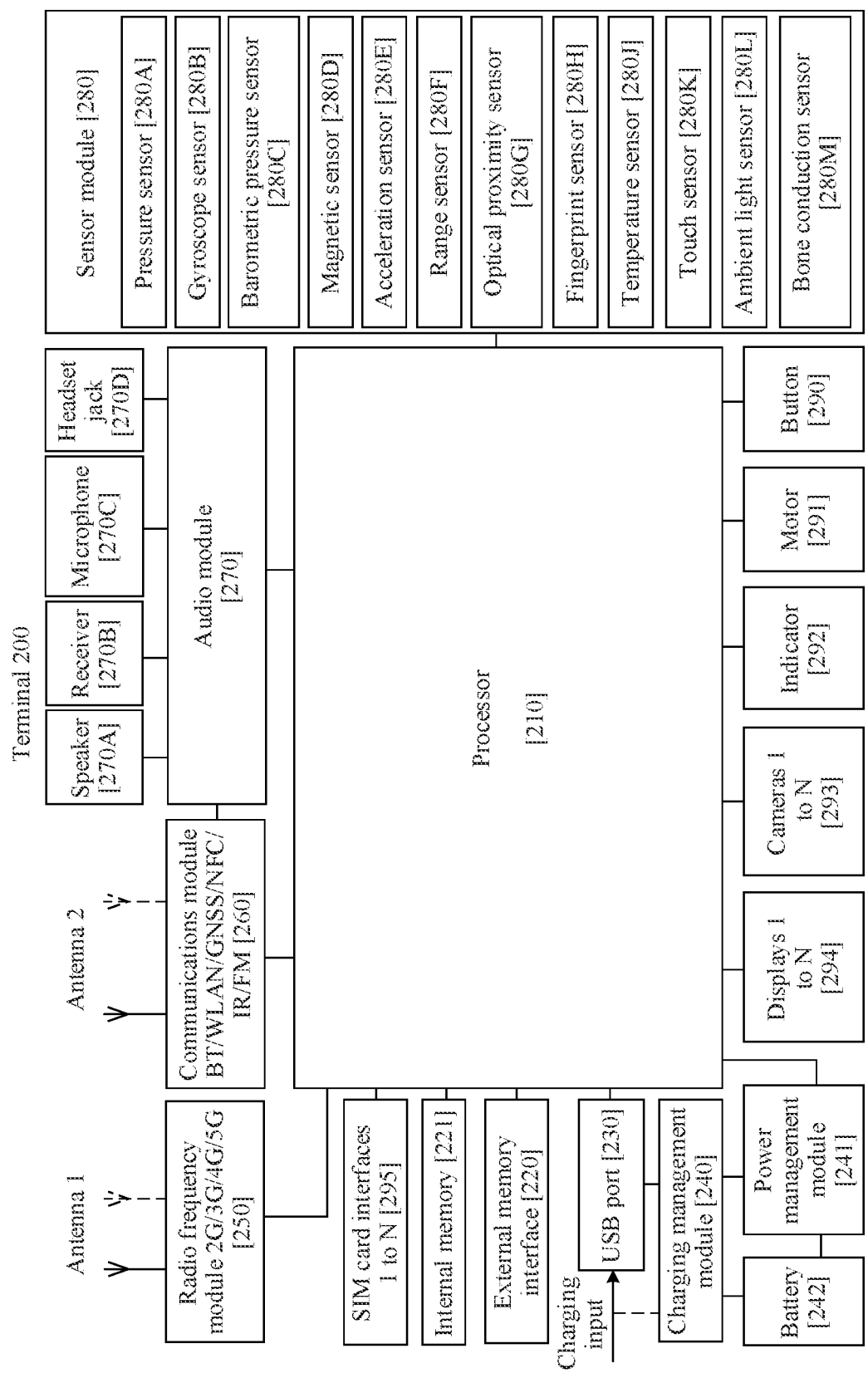
FIG. 2 is a schematic diagram of a hardware structure of a terminal according to an embodiment of this application.

Embodiments of this application provide a data backup method and a terminal, to back up user data in a terminal when the terminal cannot be used due to a fault. When the terminal cannot be used due to the fault, this solution can ensure that the user data stored in the terminal is not lost.

"The terminal cannot be used due to the fault" in the embodiments of this application may include at least the following four application scenarios. In other words, the method in the embodiments of this application may be used to back up user data in at least the following four application scenarios.

Application scenario (1): The terminal fails to be powered on.

If a data partition in the terminal is faulty, the terminal fails to be powered on. The data partition in the terminal stores a system configuration file, a status file, and the like that are required for starting an operating system. When the data partition is faulty, the operating system cannot be normally started. In this case, the terminal may always display a power-on animation screen, but the terminal cannot be powered on. Alternatively, the terminal displays a blank screen. Alternatively, the terminal is repeatedly restarted.

"The data partition is faulty" in the embodiments of this application may include at least one of the following faults: the data partition is in a read-only state; a file that is stored in the data partition and that is related to operating system startup is damaged; and system software cannot be compatible with data in the data partition.

Application scenario (2): The terminal can be powered on but cannot be used after being powered on.

In some cases, even if some files in a data partition are damaged, the terminal can still be successfully powered on. However, because the some files are damaged, even if the terminal is powered on, the terminal cannot be used by a user. For example, after a mobile phone is powered on, a lock screen is displayed. Because some files in a first data partition of the mobile phone are damaged, the mobile phone cannot receive a password entered by the user on the lock screen, fingerprint information entered by the user, or the like. Consequently, a home screen cannot be displayed. Alternatively, although the user can enter a password to enter the home screen, the terminal cannot respond to input of the user on an icon on the home screen. In other words, the user cannot operate the terminal.

Application scenario (3): The terminal can be powered on. However, the terminal is frequently restarted, displays a blank screen, or frequently prompts an abnormity in a use process. Consequently, the terminal cannot be used.

In some cases, even if some files in a data partition are damaged, the terminal can still be successfully powered on and display a home screen. However, even if the terminal is powered on and displays the home screen, because the some files are damaged, the terminal is frequently restarted, displays a blank screen, or frequently prompts an abnormity in a use process, and consequently, the terminal cannot be normally used.

Application scenario (4): A mobile phone cannot be powered on or used due to a third-party application. For example, the mobile phone encounters a problem in the application scenarios (1) to (3).

A large quantity of third-party applications are installed on the terminal. As use time of the terminal goes by, these third-party applications generate more data. When data generated by a third-party application is damaged, due to a lack of a fault tolerance method for the third-party application, the terminal may be repeatedly restarted after being powered on. In this case, even if the terminal can guide a user to uninstall the third-party application, because an excessively large quantity of third-party applications are installed on the terminal, the user cannot determine which applications need to be uninstalled.

Usually, when the terminal encounters a fault in the application scenario (1) to the application scenario (4), the terminal may guide the user to control the terminal to restore factory settings, or the user may manually control the terminal to restore factory settings, to resolve the foregoing problem.

For example, the terminal is a mobile phone 100 shown in FIG. 1(*a*) to FIG. 1(*c*). When the mobile phone 100 encounters any fault in the application scenario (1) to the application scenario (4), the mobile phone 100 may display a guide screen 101 shown in FIG. 1(*a*). Alternatively, when the mobile phone 100 encounters a fault in the application scenario (1) to the application scenario (4), the user may manually control the terminal to display a guide screen 101 shown in FIG. 1(*a*).

As shown in FIG. 1(*a*), the guide screen 101 includes a "restore factory settings" option 102 and a "download the latest version and restore" option 103. The "restore factory settings" option 102 is used to control the mobile phone 100 to restore factory settings. The "download the latest version and restore" option 103 is used to control the mobile phone 100 to restore factory settings, and control the mobile phone 100 to download and install a system of the latest version.

In response to a tap operation performed by the user on the "restore factory settings" option 102, the mobile phone 100 may display a guide screen 104 shown in FIG. 1(*b*). The guide screen 104 includes a "start to restore factory settings" option 105 and a "back" option 106. In response to a tap operation performed by the user on the "start to restore factory settings" option 105, the mobile phone 100 may restore factory settings and display a restoration screen 107 shown in FIG. 1(*c*). In response to a tap operation performed by the user on the "back" option 106, the mobile phone 100) may return to the guide screen 101 shown in FIG. 1(*a*).

However, user data stored in the terminal is permanently lost if the terminal restores the factory settings.

In some solutions, it is proposed to resolve, through forcible ROM flashing, the problem that the mobile phone cannot be powered on. However, ROM flashing can resolve only a program error in the mobile phone, but cannot resolve a data error. When the mobile phone cannot be powered on because data that is stored in a data partition and that is related to system startup is incorrect, forcible ROM flashing cannot resolve the problem that the mobile phone cannot be powered on. Finally, the mobile phone still needs to restore the factory settings. In this case, the user data stored in the mobile phone is still lost.

In some other solutions, it is proposed to construct a data backup system in the mobile phone. For example, some vendors use the Android recovery system for backup. Some vendors configure a dedicated data backup system that is independent of the recovery system in the mobile phone. However, a user data security protection mechanism separated from a main system of Android has a high potential risk in security. In addition, costs of constructing and maintaining the data backup system in the mobile phone are relatively high.

In some other solutions, it is proposed to disassemble a storage chip of the mobile phone from the faulty mobile phone through disassembly, and then use a professional tool to export the user data. However, all data in an existing operating system is encrypted. In addition, a decryption process is closely related to integrity of hardware of the mobile phone. Once the storage chip leaves the device, data stored in the storage chip is damaged or deleted.

Based on this, an embodiment of this application provides a data backup method. A basic principle of the data backup method is as follows: When a terminal cannot be used due to a fault, a virtual data partition (for example, a virtual data partition) may be created. The virtual data partition is a blank data partition. Then, an operating system is started by using the virtual data partition. The virtual data partition is different from a data partition (that is, an original data partition). Because the virtual data partition is a data partition just created by the terminal, that the terminal starts the operating system by using the virtual data partition is equivalent to that the terminal starts the operating system by using the data partition for the first time after delivery. In addition, the blank virtual data partition does not store any historical data used for running the operating system. In other words, the virtual data partition has no problem in the application scenario (1) to the application scenario (4), and therefore, does not cause a startup failure of the operating system. In other words, the terminal can start the operating system by using the virtual data partition.

In this embodiment of this application, after creating the virtual data partition, the terminal may mount the virtual data partition onto a mount point (for example, a mount point 1, that is, a directory 1, such as /data) of the original data partition, and mount the original data partition onto a new mount point (for example, a mount point 2, that is, a directory 2, such as /data_old). Even if the mount point of the original data partition changes, the directory 1 (such as /data) that the terminal needs to access when the terminal starts the operating system remains unchanged. In this case, the virtual data partition is mounted onto the directory 1 (such as /data). Therefore, the terminal may access the directory 1 (such as /data), and start the operating system by using the blank virtual data partition currently mounted onto the directory 1.

The mount point 2 is an accessible mount point. In this way, after starting the operating system, the terminal may access the mount point 2, and read user data in the original data partition (a first data partition) from the mount point 2.

After the terminal starts the operating system, even if "the data partition is in a read-only state", "a file that is stored in the data partition and that is related to system startup is damaged", or "system software cannot be compatible with data in the data partition", provided that the user data stored in the data partition is not damaged, the terminal can read the user data in the data partition, to complete backup of the user data.

In this way, when the terminal cannot be used due to the fault, the user data in the terminal can be backed up, to ensure that the user data stored in the terminal is not lost.

It should be noted that, for a specific function of a "restore factory settings" option subsequently mentioned in the embodiments of this application, refer to a function of the "restore factory settings" option 102. For a specific function of a "download the latest version and restore" option subsequently mentioned in the embodiments of this application, refer to a function of the "download the latest version and restore" option 103. For a specific function of a "start to restore factory settings" option subsequently mentioned in the embodiments of this application, refer to a function of the "start to restore factory settings" option 105.

For example, the terminal in the embodiments of this application may be a portable computer (such as a mobile phone), a notebook computer, a personal computer (Personal Computer, PC), a wearable electronic device (such as a smartwatch), a tablet computer, an augmented reality (augmented reality, AR) device/a virtual reality (virtual reality, VR) device, a vehicle-mounted device, or the like. A specific form of the terminal is not specially limited in the following embodiments.

FIG. 2 is a structural block diagram of a terminal 200 according to an embodiment of this application. The terminal 200 may include a processor 210, an external memory interface 220, an internal memory 221, a USB port 230, a charging management module 240, a power management module 241, a battery 242, an antenna 1, an antenna 2, a radio frequency module 250, a communications module 260, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like. The sensor module may include a pressure sensor 280A, a gyroscope sensor 280B, a barometric pressure sensor 280C, a magnetic sensor 280D, an acceleration sensor 280E, a range sensor 280F, an optical proximity sensor 280G, a fingerprint sensor 280H, a temperature sensor 280J, a touch sensor 280K, an ambient light sensor 280L, a bone conduction sensor, and the like.

The terminal 200 shown in FIG. 2 is merely an example of the terminal. A structure shown in FIG. 2 does not constitute a limitation on the terminal 200. The terminal 200 may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (Application Processor, AP), a modem processor, a graphics processing unit (Graphics Processing Unit, GPU), an image signal processor (Image Signal Processor, ISP), a controller, a memory, a video codec, a digital signal processor (Digital Signal Processor, DSP), a baseband processor, a neural-network processing unit (Neural-network Processing Unit, NPU), and/or the like. Different processing units may be independent devices, or may be integrated into a same processor.

The controller may be a decision maker that directs the components of the terminal 200 to carry out coordinate work according to an instruction. The controller is a nerve center and a command center of the terminal 200. The controller generates an operation control signal based on an instruction operation code and a time sequence signal, to complete control of instruction obtaining and instruction execution.

The memory may be further disposed in the processor 210, and is configured to store an instruction and data. In some embodiments, the memory in the processor is a cache. The memory may store an instruction or data that is just used or cyclically used by the processor. If the processor needs to use the instruction or the data again, the processor may directly invoke the instruction or the data from the memory, to avoid repeated access and reduce a waiting time of the processor. Therefore, system efficiency is improved.

In some embodiments, the processor 210 may include an interface. The interface may include an inter-integrated circuit (Inter-Integrated Circuit, I2C) interface, an inter-integrated circuit sound (Inter-Integrated Circuit Sound, I2S) interface, a pulse code modulation (Pulse Code Modulation, PCM) interface, a universal asynchronous receiver/transmitter (Universal Asynchronous Receiver/Transmitter, UART) interface, a mobile industry processor interface (Mobile Industry Processor Interface, MIPI), a general-purpose input/output (General-Purpose Input/output, GPIO) interface, a subscriber identity module (Subscriber Identity Module, SIM) interface, a universal serial bus (Universal Serial Bus, USB) interface, and/or the like.

The I2C interface is a two-way synchronization serial bus, and includes a serial data line (Serial Data Line, SDA) and a serial clock line (Derail Clock Line, SCL). In some embodiments, the processor may include a plurality of groups of I2C buses. The processor may be coupled to the touch sensor, a charger, a flash light, the camera, and the like through different I2C bus interfaces. For example, the processor may be coupled to the touch sensor through the I2C interface, so that the processor communicates with the touch sensor through the I2C bus interface, to implement a touch function of the terminal 200.

The I2S interface may be used for audio communication. In some embodiments, the processor may include a plurality of groups of I2S buses. The processor may be coupled to the audio module through the I2S bus, to implement communication between the processor and the audio module. In some embodiments, the audio module may transfer an audio signal to the communications module through the I2S interface, to implement a function of answering a call through a Bluetooth headset.

The PCM interface may also be configured to; perform audio communication, and sample, quantize, and code an analog signal. In some embodiments, the audio module may be coupled to the communications module through the PCM bus interface. In some embodiments, the audio module may transfer an audio signal to the communications module through the PCM interface, to implement a function of answering a call through a Bluetooth headset. Both the I2S interface and the PCM interface may be used for audio communication, and sampling rates of the two interfaces are different.

The UART interface is a universal serial data bus, and is used for asynchronous communication. The bus is a two-way communications bus, and converts to-be-transmitted data between serial communication and parallel communication. In some embodiments, the UART interface is usually configured to connect the processor to the communications module 260. For example, the processor communicates with a Bluetooth module through the UART interface, to implement a Bluetooth function. In some embodiments, the audio module may transfer an audio signal to the communications module through the UART interface, to implement a function of answering a call through a Bluetooth headset.

The MIPI interface may be configured to connect the processor to a peripheral device such as the display or the camera. The MIPI interface includes a camera serial interface (Camera Serial Interface, CSI), a display serial interface (Display Serial Interface, DSI), and the like. In some embodiments, the processor communicates with the camera through the CSI interface, to implement a photographing function of the terminal 200. The processor communicates with the display through the DSI interface, to implement a display function of the terminal 200.

The GPIO interface may be configured through software. The GPIO interface may be configured as a control signal, or may be configured as a data signal. In some embodiments, the GPIO interface may be configured to connect the processor to the camera, the display, the communications module, the audio module, the sensor, and the like. The GPIO interface may alternatively be configured as the I2C interface, the I2S interface, the UART interface, the MIPI interface, or the like.

The USB port 230 may be a mini USB port, a micro USB port, a USB Type-C port, or the like. The USB port may be configured to connect to the charger to charge the terminal 200, or may be configured to transmit data between the terminal 200 and a peripheral device. The USB port may alternatively be configured to connect to a headset, to play audio through the headset. The USB port may alternatively be configured to connect to another electronic device such as an AR device.

An interface connection relationship between the modules shown in this embodiment of this application is merely an example for description, and does not constitute a limitation on the structure of the terminal 200. The terminal 200 may use different interface connection manners or a combination of a plurality of interface connection manners in this embodiment of this application.

The charging management module 240 is configured to receive charging input from the charger. The charger may be a wireless charger or a wired charger. In some embodiments of wired charging, the charging management module may receive charging input from the wired charger through the USB port. In some embodiments of wireless charging, the charging management module may receive wireless charging input via a wireless charging coil of the terminal 200. When charging the battery, the charging management module may further charge a terminal device through the power management module 241.

The power management module 241 is configured to connect the battery 242, the charging management module 240, and the processor 210. The power management module receives input of the battery and/or the charging management module, and supplies power to the processor, the internal memory, an external memory, the display, the camera, the communications module, and the like. The power management module may be further configured to monitor parameters such as a battery capacity, a battery cycle count, and a status of battery health (electric leakage or impedance). In some embodiments, the power management module 241 may alternatively be disposed in the processor 210. In some embodiments, the power management module 241 and the charging management module may alternatively be disposed in a same device.

A wireless communication function of the terminal 200 may be implemented through the antenna module 1, the antenna module 2, the radio frequency module 250, the communications module 260, a modem, the baseband processor, and the like. The antenna 1 and the antenna 2 are configured to: transmit and receive electromagnetic wave signals. Each antenna in the terminal 200 may be configured to cover one or more communication bands. Different antennas may be further multiplexed, to improve antenna utilization. For example, a cellular network antenna may be multiplexed as a wireless local area network diversity antenna. In some embodiments, an antenna may be used in combination with a tuning switch.

The radio frequency module 250 may provide a communications processing module that is applied to the terminal 200 and that includes a wireless communication solution such as 2G/3G/4G/5G. The radio frequency module 250 may include at least one filter, a switch, a power amplifier, a low noise amplifier (Low Noise Amplifier, LNA), and the like. The radio frequency module may receive an electromagnetic wave through the antenna 1, perform processing such as filtering or amplification on the received electromagnetic wave, and transfer the electromagnetic wave to the modem for demodulation. The radio frequency module may further amplify a signal modulated by the modem, and convert the signal into an electromagnetic wave for radiation through the antenna 1. In some embodiments, at least some function modules in the radio frequency module 250 may be disposed in the processor 210. In some embodiments, at least some function modules in the radio frequency module 250 may be disposed in a same device as at least some modules in the processor 210.

The modem may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker, the receiver, or the like), or displays an image or a video through the display. In some embodiments, the modem may be an independent device. In some embodiments, the modem may be independent of the processor, and is disposed in a same device as the radio frequency module or another function module.

The communications module 260 may provide a communications processing module that is applied to the terminal 200 and that includes a wireless communication solution such as a wireless local area network (Wireless Local Area Networks, WLAN) (for example, a wireless fidelity (Wireless Fidelity, Wi-Fi) network), Bluetooth (Blue Tooth, BT), a global navigation satellite system (Global Navigation Satellite System, GNSS), frequency modulation (Frequency Modulation, FM), near field communication (Near Field Communication, NFC), or infrared (Infrared, IR). The communications module 260 may be one or more devices integrating at least one communications processing module. The communications module receives an electromagnetic wave through the antenna 2, performs frequency modulation and filtering processing on an electromagnetic wave signal, and sends a processed signal to the processor. The communications module 260 may further receive a to-be-sent signal from the processor, perform frequency modulation and amplification on the signal, and convert the signal into an electromagnetic wave for radiation through the antenna 2.

In some embodiments, the antenna 1 of the terminal 200 is coupled to the radio frequency module, and the antenna 2 is coupled to the communications module 260. In this way, the terminal 200 can communicate with a network and another device through a wireless communications technology. The wireless communications technology may include a global system for mobile communications (Global System For Mobile Communications, GSM), a general packet radio service (General Packet Radio Service, GPRS), code division multiple access (Code Division Multiple Access, CDMA), wideband code division multiple access (Wideband Code Division Multiple Access, WCDMA), time division-synchronous code division multiple access (Time-Division Code Division Multiple Access, TD-SCDMA), long term evolution (Long Term Evolution. LTE), BT, GNSS, WLAN, NFC, FM, an IR technology, and/or the like. The GNSS may include a global positioning system (Global Positioning System, GPS), a global navigation satellite system (global navigation satellite system. GLONASS), a BeiDou navigation satellite system (BeiDou Navigation Satellite System, BDS), a quasi-Zenith satellite system (Quasi-Zenith Satellite System, QZSS), and/or a satellite-based augmentation system (Satellite-Based Augmentation Systems, SBAS).

The terminal 200 implements the display function through the GPU, the display 294, the application processor, and the like. The GPU is a microprocessor for image processing, and is connected to the display and the application processor. The GPU is configured to perform: mathematical and geometric calculation, and render an image. The processor 210 may include one or more GPUs that execute a program instruction to generate or change display information.

The display 294 is configured to display an image, a video, and the like. The display includes a display panel. The display panel may be a liquid crystal display (Liquid Crystal Display, LCD), an organic light-emitting diode (Organic Light-Emitting Diode, OLED), an active-matrix organic light-emitting diode (Active-Matrix Organic Light-Emitting Diode, AMOLED), a flexible light-emitting diode (Flex Light-Emitting Diode, FLED), a mini-LED, a micro-LED, a micro-OLED, a quantum dot light-emitting diode (Quantum Dot Light-Emitting Diodes, QLED), or the like. In some embodiments, the terminal 200 may include one or N displays, where N is a positive integer greater than 1.

The terminal 200 can implement a photographing function by using the ISP, the camera 293, the video codec, the GPU, the display, the application processor, and the like.

The ISP is configured to process data fed back by the camera. For example, during photographing, a shutter is turned on, and light is transmitted to a photosensitive element of the camera through a lens. An optical signal is converted into an electrical signal, the photosensitive element of the camera transmits the electrical signal to the ISP for processing, and the electrical signal is converted into an image that can be seen. The ISP may further optimize an algorithm for noise, brightness, and complexion of an image. The ISP may further optimize parameters such as exposure and a color temperature of a shooting scenario. In some embodiments, the ISP may be disposed in the camera 293.

The camera 293 is configured to capture a static image or a video. An optical image of an object is generated through the lens, and is projected to the photosensitive element. The photosensitive element may be a charge coupled device (charge coupled device. CCD) or a complementary metal-oxide-semiconductor (complementary metal-oxide-semiconductor, CMOS) photoelectric transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the terminal 200 may include one or N cameras, where N is a positive integer greater than 1.

The digital signal processor is configured to process a digital signal. In addition to the digital image signal, the digital signal processor may further process another digital signal. For example, when the terminal 200 selects a frequency, the digital signal processor is configured to perform Fourier transform and the like on frequency energy.

The video codec is configured to compress or decompress a digital video. The terminal 200 may support one or more codecs. In this way, the terminal 200 may play or record videos in a plurality of encoding formats, for example, MPEG 1, MPEG 2, MPEG 3, and MPEG 4.

The NPU is a neural-network (Neural-Network, NN) computing processor, quickly processes input information by referring to a structure of a biological neural network, for example, by referring to a transfer mode between human brain neurons, and may further continuously perform self-learning. Applications such as intelligent cognition of the terminal 200, such as image recognition, facial recognition, speech recognition, and text understanding, can be implemented through the NPU.

The external memory interface 220 may be configured to be connected to an external storage card such as a micro SD card, to extend a storage capability of the terminal 200. The external storage card communicates with the processor through the external memory interface, to implement a data storage function, For example, files such as music and a video are stored in the external storage card.

The internal memory 221 may be configured to store computer executable program code, and the executable program code includes an instruction. The processor 210 runs the instruction stored in the internal memory 221, to implement various function applications and data processing of the terminal 200. The memory 221 may include a program storage area and a data storage area. The program storage area may store an operating system, an application program required by at least one function (for example, a voice playing function or an image playing function), and the like. The data storage area may store data (such as audio data and a phone book) created during use of the terminal 200, and the like. The data (such as the audio data and the phone book) created during use of the terminal 200 may be referred to as user data. In addition, the internal memory 221 may include a RAM and a read-only memory (Read-Only Memory, ROM), and may further include a non-volatile memory, for example, at least one magnetic disk storage device, a flash memory device, another volatile solid-state storage device, or a universal flash storage (Universal Flash Storage, UFS).

The internal memory 221 includes the data partition (for example, a data partition) described in the embodiments of this application. The data partition stores a file or data that needs to be read/written when an operating system is started, and the user data created during use of the terminal. The data partition may be a preset storage area in the internal memory 221. For example, the data partition may be included in the RAM in the internal memory 221.

The virtual data partition in the embodiments of this application may be a storage area of the RAM in the internal memory 221. Alternatively, the virtual data partition may be a storage area of the ROM in the internal memory 221. Alternatively, the virtual data partition may be an external storage card such as a micro SD card connected to the external memory interface 220.

The terminal 200 may implement an audio function through the audio module 270, the speaker 270A, the receiver 270B, the microphone 270C, the headset jack 270D, the application processor, and the like, for example, music playing or recording.

The audio module is configured to convert digital audio information into an analog audio signal for output, and is also configured to convert analog audio input into a digital audio signal. The audio module may be further configured to encode and decode audio signals. In some embodiments, the audio module may be disposed in the processor 210, or some function modules in the audio module are disposed in the processor 210.

The speaker 270A, also referred to as a "horn", is configured to convert an audio electrical signal into a sound signal. The terminal 200 may be used to listen to music or answer a hands-free call through the speaker.

The receiver 270B, also referred to as an "earpiece", is configured to convert an audio electrical signal into a sound signal. When a call is answered or an audio message is received through the terminal 200, the receiver may be put close to a human ear to listen to voice.

The microphone 270C, also referred to as a "mike" or a "microphone", is configured to convert a sound signal into an electrical signal. When making a call or sending a voice message, a user may make a sound near the microphone through the mouth of the user, to input a sound signal to the microphone. At least one microphone may be disposed in the terminal 200. In some embodiments, two microphones may be disposed in the terminal 200, to collect a sound signal and further implement a noise reduction function. In some embodiments, alternatively, three, four, or more microphones may be disposed in the terminal 200, to collect a sound signal, reduce noise, identify a sound source, implement a directional recording function, and the like.

The headset jack 270D is configured to be connected to a wired headset. The headset jack may be a USB port, or may be a 3.5 mm open mobile terminal platform (Open Mobile Terminal Platform, OMTP) standard interface or cellular telecommunications industry association of the USA (Cellular Telecommunications Industry Association of the USA, CTIA) standard interface.

The pressure sensor 280A is configured to sense a pressure signal, and can convert the pressure signal into an electrical signal. In some embodiments, the pressure sensor may be disposed on the display. There are many types of pressure sensors such as a resistive pressure sensor, an inductive pressure sensor, a capacitive pressure sensor, and the like. The capacitive pressure sensor may include at least two parallel plates made of a conductive material. Capacitance between electrodes changes when force is applied to the pressure sensor. The terminal 200 determines pressure strength based on a capacitance change. When a touch operation is performed on the display, the terminal 200 detects strength of the touch operation through the pressure sensor. The terminal 200 may also calculate a touch position based on a detection signal of the pressure sensor. In some embodiments, touch operations that are applied to a same touch position but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on the SMS message application icon, an instruction for creating a new SMS message is executed.

The gyroscope sensor 280B may be configured to determine a moving posture of the terminal 200. In some embodiments, an angular velocity of the terminal 200 around three axes (namely, axes x, y, and z) may be determined through the gyroscope sensor. The gyroscope sensor may be used for image stabilization during photographing. For example, when the shutter is pressed, the gyroscope sensor detects an angle at which the terminal 200 jitters, calculates, based on the angle, a distance for which a lens module needs to compensate, and allows the lens to cancel the jitter of the terminal 200 through reverse motion, to implement image stabilization. The gyroscope sensor may also be used for navigation and a somatic game scenario.

The barometric pressure sensor 280C is configured to measure atmospheric pressure. In some embodiments, the terminal 200 calculates an altitude through a barometric pressure value measured by the barometric pressure sensor, to assist positioning and navigation.

The magnetic sensor 280D includes a Hall sensor. The terminal 200 may detect opening and closing of a flip leather case through the magnetic sensor. In some embodiments, when the terminal 200 is a clamshell phone, the terminal 200 may detect opening and closing of a flip cover through the magnetic sensor. Further, a feature such as automatic unlocking of the flip cover is set based on a detected opening or closing state of the leather case or a detected opening or closing state of the flip cover.

The acceleration sensor 280E may detect values of accelerations in various directions (usually on three axes) of the terminal 200. When the terminal 200 is still, a value and a direction of gravity may be detected. The acceleration sensor 280E may be further configured to identify a posture of the terminal, and is applied to applications such as a pedometer and switching between landscape mode and portrait mode.

The range sensor 280F is configured to measure a distance. The terminal 200 may measure a distance through infrared light or a laser. In some embodiments, in a shooting scenario, the terminal 200 may use the range sensor to measure a distance, to implement quick focusing.

For example, the optical proximity sensor 280G may include a light-emitting diode (LED) and an optical detector, for example, a photodiode. The light-emitting diode may be an infrared light-emitting diode. The light-emitting diode is configured to emit infrared light. The photodiode is configured to detect infrared reflected light from a nearby object. When sufficient reflected light is detected, it may be determined that there is an object near the terminal 200. When insufficient reflected light is detected, it may be determined that there is no object near the terminal 200. The terminal 200 may detect, through the optical proximity sensor, that the user holds the terminal 200 close to an ear to make a call, to automatically turn off a screen for power saving. The optical proximity sensor may also be used in a smart cover mode or a pocket mode to automatically unlock or lock the screen.

The ambient light sensor 280L is configured to sense ambient light brightness. The terminal 200 may adaptively adjust brightness of the display based on the sensed ambient light brightness. The ambient light sensor may also be configured to automatically adjust a white balance during photographing. The ambient light sensor may also cooperate with the optical proximity sensor to detect whether the terminal 200 is in a pocket to prevent a false touch.

The fingerprint sensor 280H is configured to collect a fingerprint. The terminal 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the terminal 200 executes a temperature processing policy based on the temperature detected by the temperature sensor. For example, when the temperature reported by the temperature sensor exceeds a threshold, the terminal 200 lowers performance of a processor located near the temperature sensor, to reduce power consumption to implement thermal protection.

The touch sensor 280K is also referred to as a "touch panel", may be disposed on the display, and is configured to detect a touch operation performed on or near the touch sensor 280K. The touch sensor 280K may transfer the detected touch operation to the application processor, to determine a type of a touch event, and to provide corresponding visual output through the display.

The bone conduction sensor 280M may obtain a vibration signal. In some embodiments, the bone conduction sensor may obtain a vibration signal of a vibration bone of a human vocal-cord part. The bone conduction sensor may also contact a body pulse to receive a blood pressure beating signal. In some embodiments, the bone conduction sensor may be disposed in a headset. The audio module 270 may obtain, based on the vibration signal that is of the vibration bone of the vocal-cord part and that is obtained by the bone conduction sensor, a voice signal through parsing, to implement a voice function. The application processor may parse heart rate information based on the blood pressure beating signal obtained by the bone conduction sensor, to implement a heart rate detection function.

The button 290 includes a power button, a volume button, and the like. The button may be a mechanical button, or may be a touch button. The terminal 200 receives button-press input, and generates key signal input related to a user setting and function control of the terminal 200.

The motor 291 may generate a vibration prompt. The motor may be used for an incoming call vibration prompt, or may be used for a touch vibration feedback. For example, touch operations performed on different applications (for example, a photographing application and an audio playing application) may correspond to different vibration feedback effects. Touch operations performed on different areas on the display may correspond to different vibration feedback effects. Different application scenarios (for example, a time reminder, information receiving, an alarm clock, a game, and the like) may also correspond to different vibration feedback effects. Customization of a touch vibration feedback effect may further be supported.

The indicator 292 may be an indicator light that may be configured to indicate a charging status and a power change, or may be configured to indicate a message, a missed call, a notification, and the like.

The SIM card interface 295 is configured to connect to a subscriber identity module (Subscriber Identity Module, SIM). A SIM card may be inserted into the SIM card interface or removed from the SIM card interface, to implement contact with or separation from the terminal 200. The terminal 200 may support one or N SIM card interfaces, where N is a positive integer greater than 1. The SIM card interface may support a nano SIM card, a micro SIM card, a SIM card, and the like. A plurality of cards may be inserted into a same SIM card interface at the same time. The plurality of cards may be of a same type or different types. The SIM card interface may also be compatible with different types of SIM cards. The SIM card interface may also be compatible with an external storage card. The terminal 200 interacts with a network via the SIM card, to implement functions such as calling and data communication. In some embodiments, the terminal 200 uses an eSIM, namely, an embedded SIM card. The eSIM card may be embedded in the terminal 200, and cannot be separated from the terminal 200.

An embodiment of this application provides a data backup method. The method may be applied to a terminal provided in the embodiments of this application. The terminal includes a first data partition. The first data partition supports to start an operating system when the terminal is powered on. When detecting a power-on failure of the terminal or detecting a preset operation of a user, the terminal may create a blank second data partition, and start the operating system by using the second data partition. After the operating system is successfully started, the terminal may transmit user data in the first data partition to an external storage medium (a first storage medium) connected to the terminal.

Figure 3:
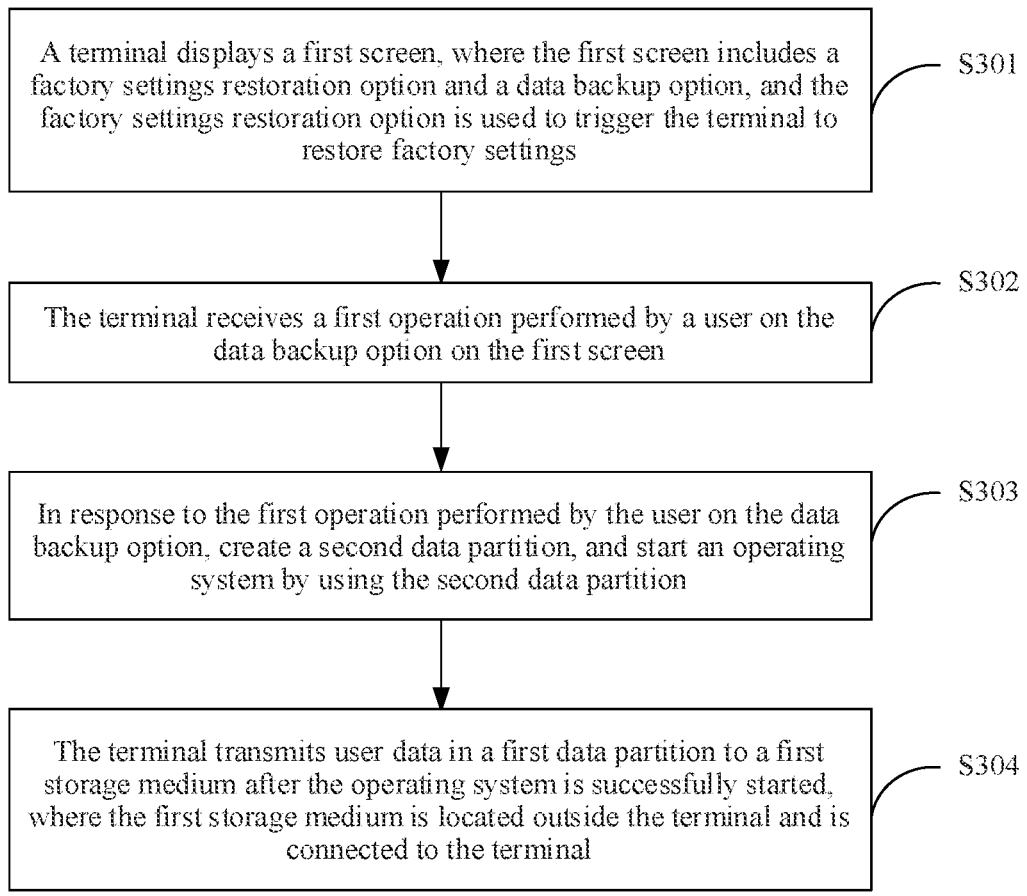
FIG. 3 is a flowchart of a data backup method according to an embodiment of this application.

In some embodiments, as shown in FIG. 3, the data backup method may include S301 to S304.

S301: The terminal displays a first screen. The first screen includes a factory settings restoration option and a data backup option. The factory settings restoration option is used to trigger the terminal to restore factory settings.

In an implementation, the terminal may display the first screen when detecting the power-on failure of the terminal. When the terminal fails to be powered on, the terminal may always display a power-on animation screen, but the terminal cannot be powered on. Alternatively, the terminal displays a blank screen.

In this embodiment of this application, an entire process of starting the operating system of the terminal may be divided into a plurality of stage points. The plurality of stage points may be referred to as boot-stage (Boot-Stage) points. A start point in the boot-stage (Boot-Stage) points is defined as "boot-start", and an end point is defined as "boot-end".

Figure 4:
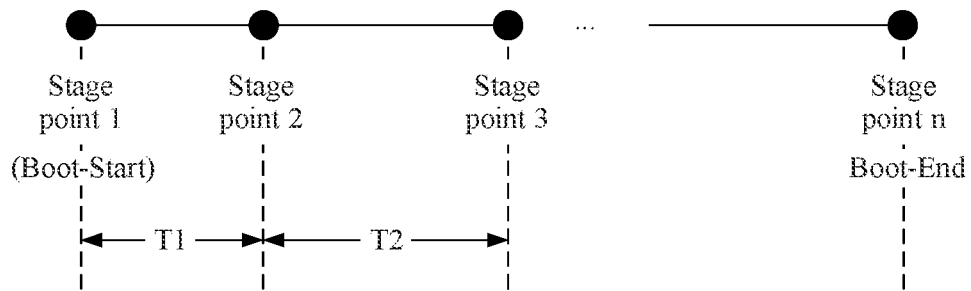
FIG. 4 is a power-on state transition diagram including boot-stage points according to an embodiment of this application.

FIG. 4 is a power-on state transition diagram including boot-stage (Boot-Stage) points. As shown in FIG. 4, a stage point 1, a stage point 2, a stage point 3, and a stage point n are all boot-stage (Boot-Stage) points in the process of starting the operating system. The stage point 1 is a start point in the boot-stage (Boot-Stage) points, and the operating system of the terminal is started from the stage point 1. The stage point n is an end point in the boot-stage (Boot-Stage) points, and startup of the operating system of the terminal is completed at the stage point n.

Usually, in a normal startup process of the operating system, after entering a boot-stage point, the terminal enters a next boot-stage point within a specific time period. For example, as shown in FIG. 4, in the normal startup process of the operating system, after a time period T1 starting from a moment at which the terminal enters the stage point 1 (namely, boot-start), the terminal enters the stage point 2, and after a time period T2 starting from a moment at which the terminal enters the stage point 2, the terminal enters the stage point 3. In other words, in the startup process of the operating system, after the terminal enters a boot-stage point, if the terminal does not enter a next boot-stage point within a specific time period, it indicates that the terminal fails to be powered on. In other words, the first event may be as follows: In the startup process of the operating system, after entering a boot-stage point, the terminal does not enter a next boot-stage point within a specific time period. The terminal may display the first screen in response to the first event.

In another implementation, the terminal may receive a third operation performed by the user on a preset shortcut key. The third operation may be a single-tap operation, a double-tap operation, a touch and hold operation, or the like. The terminal may display the first screen in response to the third operation performed by the user on the preset shortcut key.

In the foregoing application scenario (2) to application scenario (4), although the terminal can be powered on, the terminal that is powered on cannot be used by the user. In this case, if the terminal receives the third operation performed by the user on the preset shortcut key in the terminal, the terminal may display the first screen, so that the user can operate the first screen to control the terminal to restore factory settings or back up the user data.

For example, the preset shortcut key in this embodiment of this application may be any one or a combination of a plurality of buttons such as a "volume +" button, a "volume −" button, and a screen locking button. For example, the first event may be a single-tap operation performed by the user on both the "volume +" button and the "volume −" button. Alternatively, the first event may be a touch and hold operation performed by the user on both the "volume +" button and the screen locking button.

In another implementation, the terminal may alternatively display the first screen in response to a preset gesture entered by the user on a touchscreen. For example, the preset gesture may be an S-shaped gesture. In the foregoing application scenario (2) to application scenario (4), although the terminal can be powered on, the terminal that is powered on cannot be used by the user. In this case, if the terminal receives the S-shaped gesture entered by the user on the touchscreen, the terminal may display the first screen, so that the user can operate the first screen to control the terminal to restore factory settings or back up the user data.

For example, the terminal is a mobile phone 100 shown in FIG. 5(a) to FIG. 5(d). The mobile phone 100 displays a first screen 501 shown in FIG. 5(a). The first screen 501 is used to restore the mobile phone 100 to factory settings. Specifically, a "restore factory settings" option 502 and a "download the latest version and restore" option 503 on the first screen 501 may be used to trigger the mobile phone 100 to restore the factory settings. Compared with the guide screen 101 shown in FIG. 1(a), the first screen 501 shown in FIG. 5(a) further includes a "back up data" option 504. The "back up data" option 504 is used to trigger the mobile phone 100 to back up user data in the mobile phone 100.

Figure 12A:
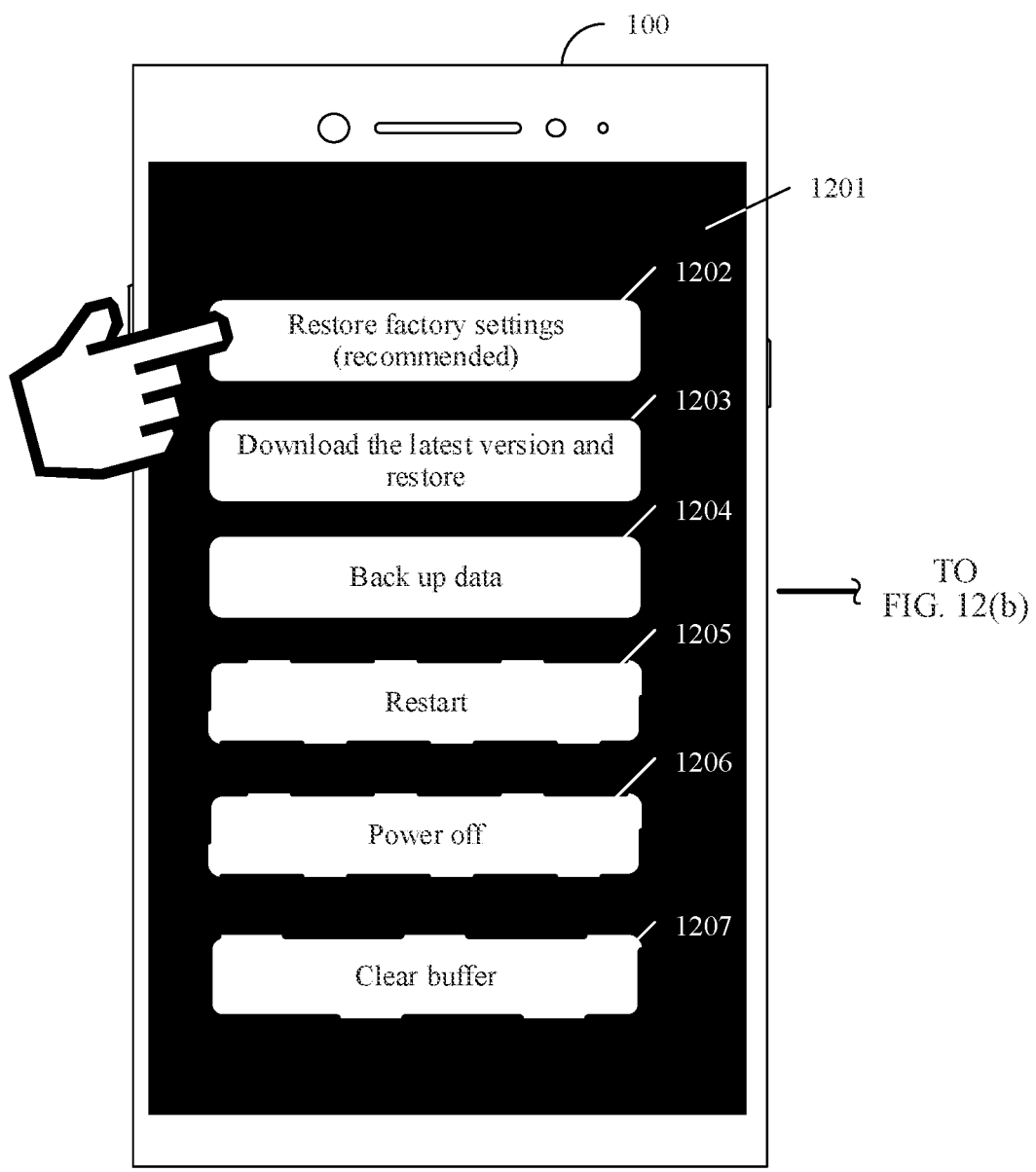
FIG. 12(*a*) to FIG. 12(*c*) are a schematic diagram of an example of another terminal screen according to an embodiment of this application.

Optionally, as shown in FIG. 12(a), a first screen 1201 may further include at least one of a "restart" option 1205, a "power off" option 1206, and a "clear buffer" option 1207. The "restart" option 1205 is used to trigger restart of the mobile phone 100. The "power off" option 1206 is used to trigger power-off of the mobile phone 100. The "clear buffer" option 1207 is used to trigger the mobile phone 100 to clear data buffered in a running process of the mobile phone 100, to resolve a problem that the mobile phone 100 cannot be normally used because the mobile phone 100 buffers too much data.

S302: The terminal receives a first operation performed by the user on the data backup option on the first screen.

For example, the terminal is the mobile phone 100 shown in FIG. 5(a) to FIG. 5(d). The first operation performed by the user on the data backup option on the first screen may be a single-tap operation, a double-tap operation, a touch and hold operation, or the like performed by the user on the "back up data" option 504 on the first screen 501.

S303: In response to the first operation performed by the user on the data backup option, create the second data partition, and start the operating system by using the second data partition.

It may be understood that, only after the operating system of the terminal is started, data (for example, the user data in the first data partition) in the terminal can be accessed, and the terminal can back up the user data in the first data partition. However, the first data partition that is in the terminal and that supports to start the operating system is faulty. Therefore, the terminal cannot start the operating system by using the first data partition. Based on this, in response to the first operation performed by the user on the data backup option, in other words, in response to an operation performed by the user for requesting to back up the user data, the terminal may create a virtual data partition (namely, the second data partition), and start the operating system of the terminal by using the second data partition.

The terminal may select a storage medium from available storage media of the terminal as the second data partition, and then start the operating system by using the second data partition. The available storage media of the terminal may include an internal memory 221 of the terminal and an external storage card (for example, a micro SD card) connected to an external memory interface 220 of the terminal.

For example, the terminal may use a data directory in a virtual memory disk (RAM disk) as the second data partition. Alternatively, the terminal may use the external storage card (for example, the micro SD card) connected to the external memory interface 220 as the second data partition, or create a blank second data partition in the external storage card. Alternatively, the terminal may use a storage medium other than a RAM and the external storage card in the terminal as the second data partition. This is not limed in this embodiment of this application.

For example, in response to the first operation performed by the user on the data backup option, the terminal may determine whether storage space of the RAM of the terminal is greater than a first preset threshold. For example, the first preset threshold may be 4 GB. If the storage space of the RAM of the terminal is greater than or equal to the first preset threshold, the terminal may use the data directory in the virtual memory disk (RAM disk) as the second data partition. If the storage space of the RAM of the terminal is less than the first preset threshold, the terminal may determine whether there is a preset backup partition in the terminal. If there is the preset backup partition in the terminal, the terminal may use the backup partition as the second data partition. If there is no preset backup partition in the terminal, the terminal may determine whether the external memory interface 220 of the terminal is connected to an external storage card (for example, a micro SD card). If the external memory interface 220 is connected to the external storage card, the terminal may use the external storage card as the second data partition. If the external memory interface 220 is connected to no external storage card, the terminal may guide the user to insert an external storage card into the external memory interface 220, so that the external storage card inserted by the user can be used as the second data partition.

It may be understood that the second data partition is a data partition just created by the terminal. That the terminal starts the operating system by using the second data partition is equivalent to that the terminal starts the operating system by using the first data partition when the terminal is powered on for the first time after delivery. The second data partition has no problem in the foregoing application scenario (1) to application scenario (4). Therefore, the second data partition does not cause a startup failure of the operating system, and does not cause a power-on failure of the terminal. In other words, the terminal can start the operating system by using the second data partition.

The second data partition is a blank virtual data partition. The terminal may select a storage medium from the available storage media of the terminal, and create a blank virtual data partition in the storage medium. For example, the terminal may create a blank data partition in the RAM. The terminal may dynamically create the data partition in the RAM. Therefore, a dedicated data partition does not need to be reserved on a storage device (such as an embedded multimedia card (embedded multi media card, EMMC)/a universal flash storage (universal flash storage, UFS)) of the terminal, or an external memory does not need to be inserted into the terminal to serve as a data partition.

The blank virtual data partition does not store any historical data used to run the operating system. Therefore, the blank virtual data partition has no problem in the foregoing application scenario (1) to application scenario (4), and does not cause a startup failure of the system. In other words, the terminal can start the operating system by using the virtual data partition.

After creating the second data partition, the terminal may first format the second data partition. It is assumed that a mount point of the first data partition is a mount point 1, that is, a directory 1, such as /data. The terminal may mount the second data partition onto the mount point 1 of the first data partition, and mount the first data partition onto a new mount point (for example, a mount point 2, that is, a directory 2, such as /data_old). The mount point 2 is an accessible mount point. In this way, after starting the operating system, the terminal may access the mount point 2, and read the user data in the first data partition from the mount point 2.

A directory that needs to be accessed when the terminal starts the operating system is unchanged. For example, the directory that needs to be accessed when the terminal starts the operating system is the directory 1 (such as /data). In this case, the second data partition is mounted onto the directory 1 (such as /data). Therefore, the terminal may access the directory 1 (such as /data), and start the operating system by using the second data partition currently mounted onto the directory 1.

Optionally, the second data partition may be pre-created. The terminal may start the operating system by using the pre-created second data partition when detecting the power-on failure of the terminal or detecting the preset operation. The terminal may pre-format the pre-created second data partition. When detecting the power-on failure of the terminal or detecting the preset operation, the terminal may mount the pre-created second data partition onto an original mount point (for example, the mount point 1, that is, the directory 1, such as /data) of the first data partition, and mount the first data partition onto a new mount point (for example, the mount point 2, that is, the directory 2, such as /data_old). In this way, the terminal may access the directory 1 (such as /data), and start the operating system by using the second data partition currently mounted onto the directory 1.

It should be noted that, for a specific method in which the terminal starts the operating system by using the second data partition, refer to a method in which the terminal starts the operating system by using the first data partition when the terminal is powered on for the first time after delivery. Details are not described in this embodiment of this application.

S304: The terminal transmits the user data in the first data partition to the first storage medium after the operating system is successfully started, where the first storage medium is located outside the terminal and is connected to the terminal.

The first storage medium may be connected to the terminal in a wired or wireless manner. In this embodiment of this application, the first storage medium used to back up the user data may include one or more of storage media such as an external storage card that is located outside the terminal and that is connected to the external memory interface 220 of the terminal, another terminal (for example, a computer) that is located outside the terminal and that is connected to the terminal, and cloud.

After the operating system is successfully started, the terminal may transmit the user data in the first data partition to any storage medium (for example, the first storage medium) that can establish a connection to the terminal.

Specifically, after the operating system is successfully started, the terminal may first determine whether a storage medium establishes a wired connection to the terminal. If the storage medium establishes a wired connection to the terminal, the terminal may transmit the user data in the first data partition to the storage medium (namely, the first storage medium). If no storage medium establishes a wired connection to the terminal, the terminal may enable a wireless communication function (such as a Bluetooth function and/or a Wi-Fi function) of the terminal. Then, the terminal reads a wireless connection parameter (for example, a Bluetooth connection parameter and/or a Wi-Fi connection parameter) from the first data partition, so that the terminal can establish, based on the read wireless connection parameter, a wireless connection (for example, a Bluetooth connection or a Wi-Fi connection) to the first storage medium (that is, another terminal) that established a wireless connection to the terminal. Finally, the terminal may transmit the user data to the first storage medium through the wireless connection.

Optionally, w % ben no storage medium establishes a wired connection to the terminal, the terminal may prompt the user to establish a wired connection between the terminal and a storage medium. For example, the mobile phone 100 may display a first guide screen 701 shown in FIG. 7. The first guide screen 701 includes guide information "The mobile phone is not connected to an external SD card. Please connect to an external SD card!".

This embodiment of this application provides the data backup method. The data backup option may be provided on the first screen to be used by the terminal to restore the factory settings, to provide a data backup entrance before the user triggers the terminal to restore the factory settings. In this way, before triggering the terminal to restore the factory settings, the user may trigger, by using the data backup option, the terminal to back up the user data.

In addition, only after the operating system of the terminal is started, data (for example, the user data in the first data partition) in the terminal can be accessed, and the terminal can back up the user data in the first data partition. However, the first data partition that is in the terminal and that supports to start the operating system is faulty. Therefore, the terminal cannot start the operating system by using the first data partition. Based on this, in response to the first operation performed by the user on the data backup option, the terminal may create a virtual data partition (namely, the second data partition), and start the operating system of the terminal by using the second data partition. After the operating system is started, the terminal may transmit the user data to the first storage medium, to back up the user data.

In conclusion, according to the method provided in this embodiment of this application, even if the terminal cannot be used because the first data partition is faulty, before the terminal restores the factory settings (in other words, before the user data is lost), the user can choose whether to back up the user data. In addition, the operating system may be started by using a new data partition (for example, the second data partition), to read the user data in the first data partition, so as to back up the user data. In this way, after the user data is backed up, even if the terminal restores the factory settings, the user can restore the backed-up user data to the terminal that has restored the factory settings, so that the user data is not lost.

Figure 6:
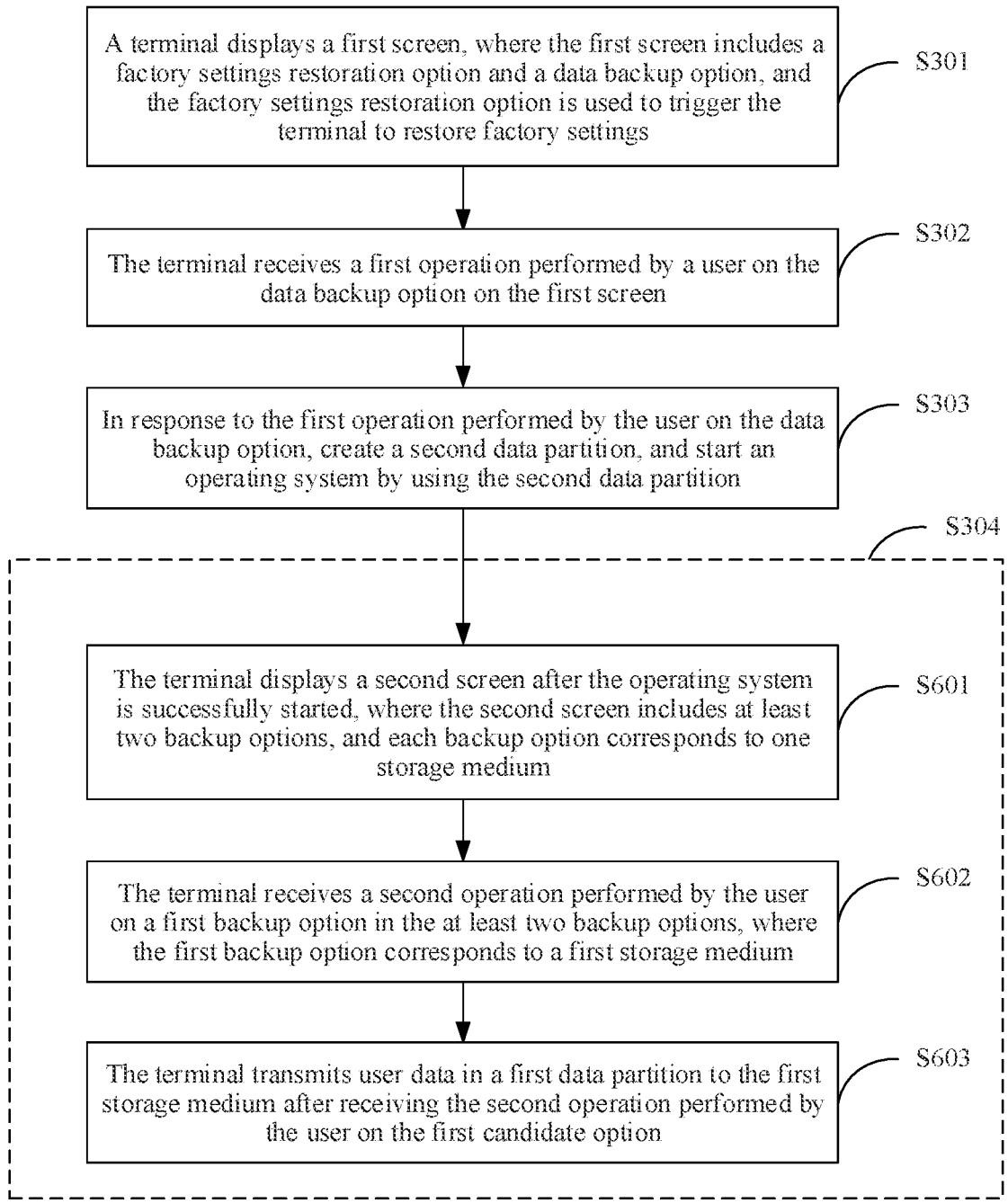
FIG. 6 is a flowchart of another data backup method according to an embodiment of this application.

The terminal can be connected to a plurality of storage media. After the operating system is started, the user may select the first storage medium from the plurality of storage media, to back up the user data. Specifically, as shown in FIG. 6, S304 may include S601 to S603.

S601: The terminal displays a second screen after the operating system is successfully started. The second screen includes at least two backup options. Each backup option corresponds to one storage medium.

Figure 5A:
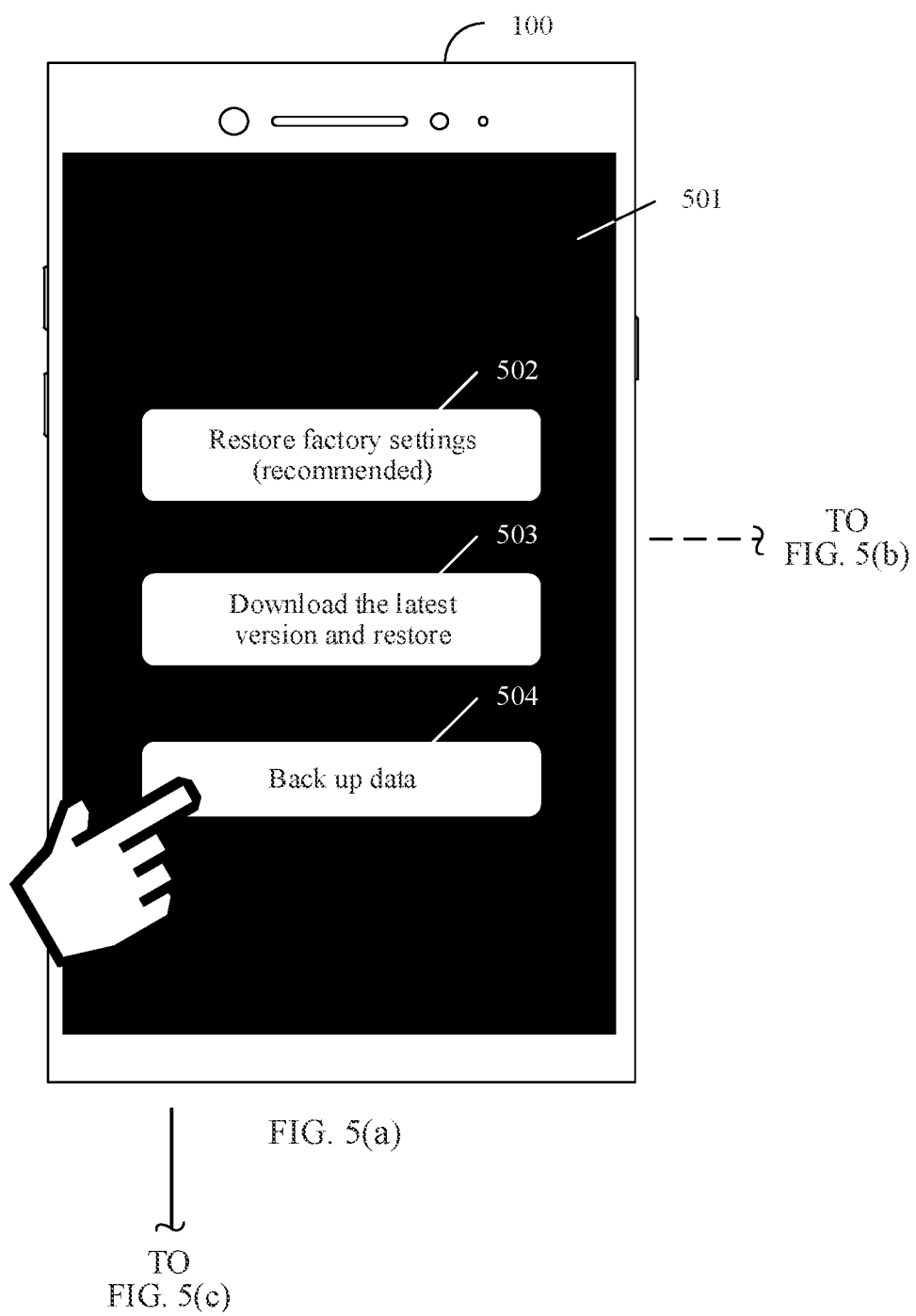
FIG. 5(*a*) to FIG. 5(*d*) are a schematic diagram of an example of another terminal screen according to an embodiment of this application.
Figure 5B:
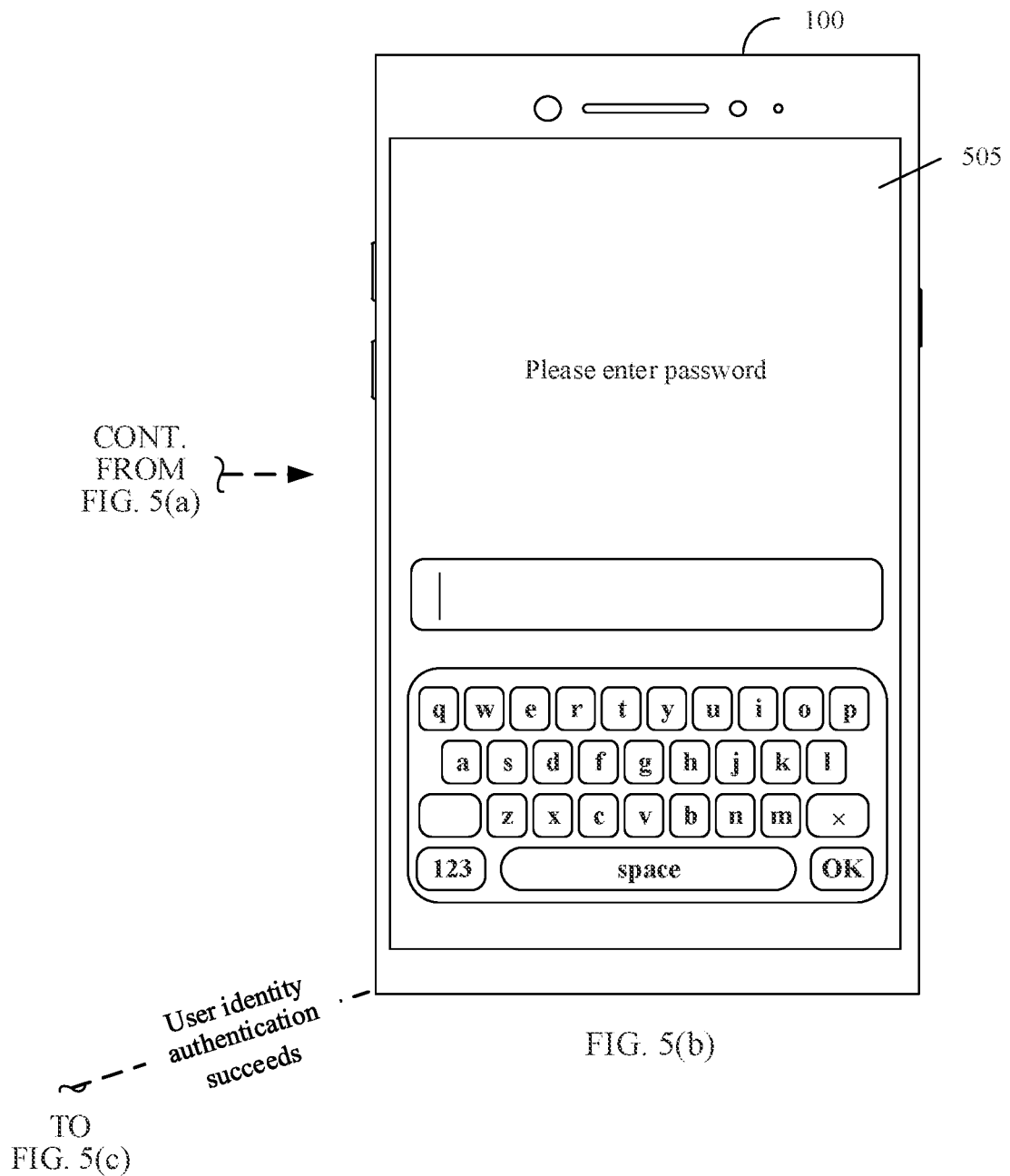

For example, in response to a tap operation performed by the user on the "back up data" option 504 on the first screen 501 shown in FIG. 5(a), the mobile phone 100 may create the second data partition, and start the operating system of the terminal by using the second data partition. After the operating system is successfully started, the mobile phone 100 may display a second screen 506 shown in FIG. 5(c). The second screen 506 includes an "external SD card" backup option, a "back up to computer" backup option, and a "back up to cloud" backup option.

Figure 5C:
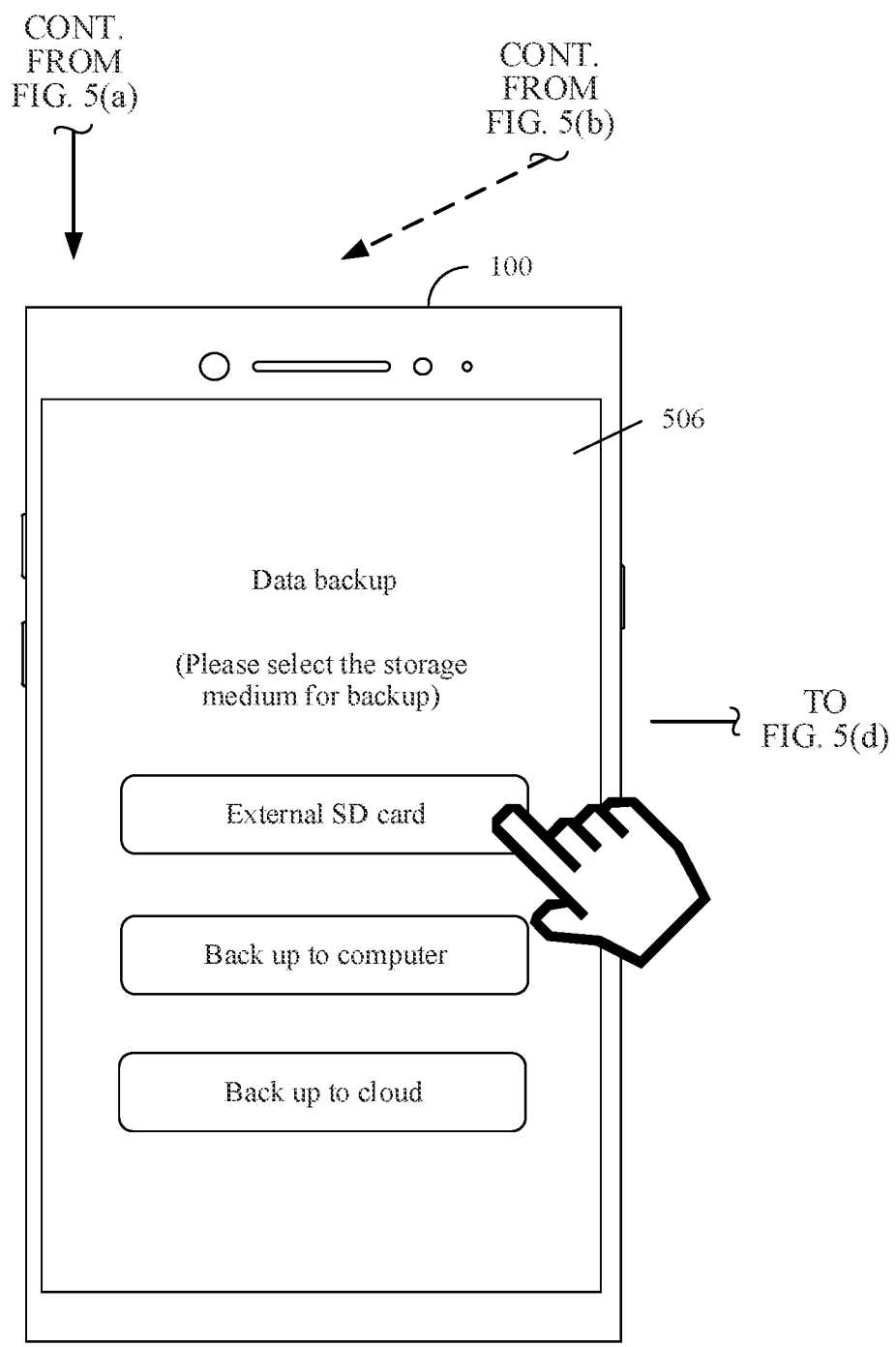
Figure 5D:
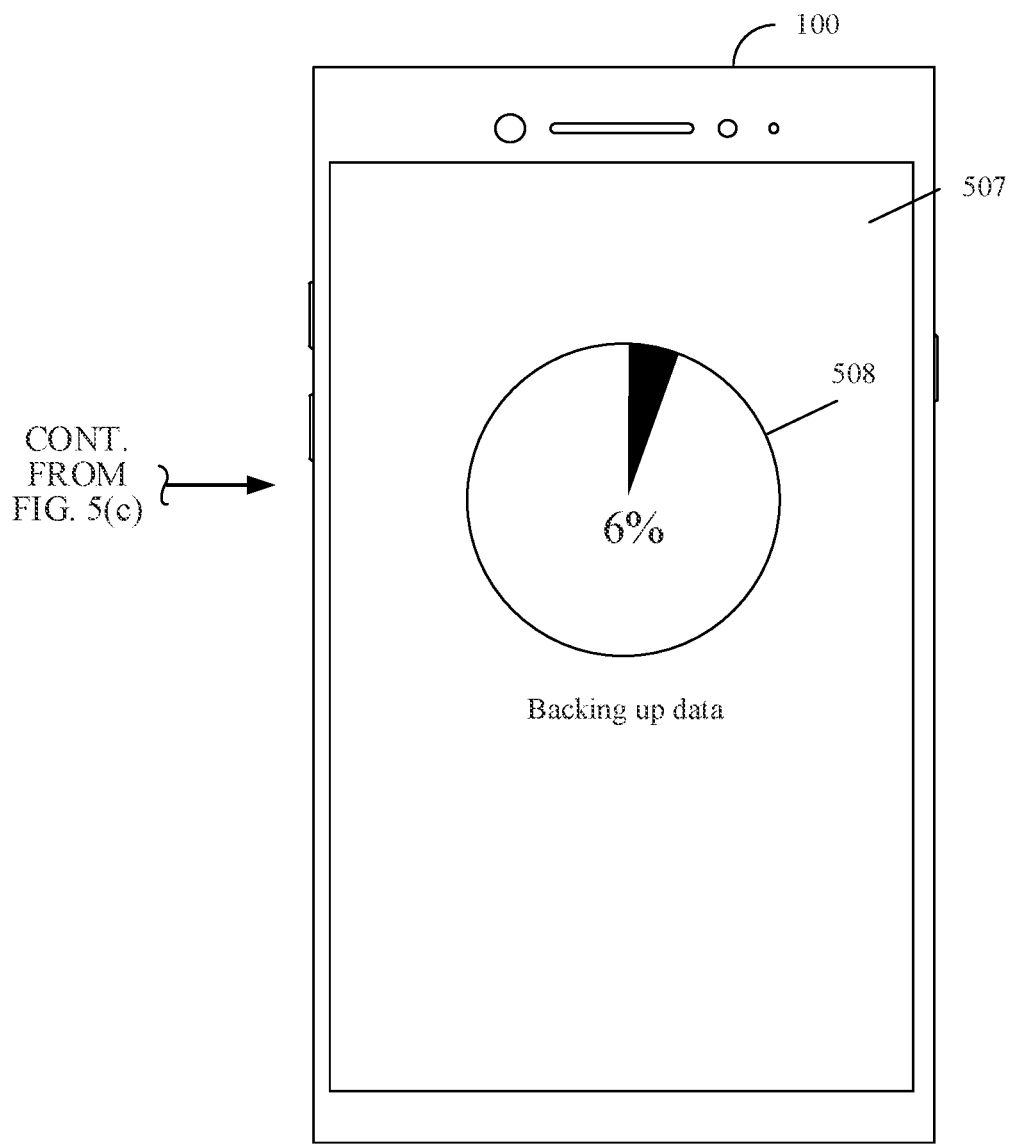

The "external SD card" backup option shown in FIG. 5(c) is used to trigger the mobile phone 100 to back up the user data in the mobile phone 100 to an external SD card. The "back up to computer" backup option is used to trigger the mobile phone 100 to back up the user data in the mobile phone 100 to a computer. The "back up to cloud" backup option is used to trigger the mobile phone 100 to back up the user data in the mobile phone 100 to a cloud server.

S602: The terminal receives a second operation performed by the user on a first backup option in the at least two backup options. The first backup option corresponds to the first storage medium.

The second operation may be a single-tap operation, a double-tap operation, a touch and hold operation, or the like. The second operation is used by the user to select the first backup option from the at least two backup options. For example, as shown in FIG. 5(c), the mobile phone 100 may receive a single-tap operation performed by the user on the "external SD card" backup option.

S603: The terminal transmits the user data in the first data partition to the first storage medium after receiving the second operation performed by the user on the first candidate option.

It may be understood that, even if data that is in the first data partition and that is used to support to start the operating system is damaged, or the first data partition is in a read-only state, or data in the first data partition cannot be compatible with system software, the terminal can still read the user data from the first data partition after the operating system of the terminal is started. The terminal may read the user data from the first data partition, and then transmit the read user data to the first storage medium.

For example, in response to a selection operation performed by the user on the "external SD card" backup option shown in FIG. 5(c), the mobile phone 100 may determine whether an external memory interface of the mobile phone 100 is connected to an external SD card. If the external memory interface of the mobile phone 100 is connected to the external SD card, the mobile phone 100 may read the user data from the first data partition, and then transmit the read user data to the external SD card of the mobile phone 100. If the external memory interface of the mobile phone 100 is connected to no external SD card, the mobile phone 100 may guide the user to insert an external SD card into the external memory interface of the mobile phone 100, to back up the user data.

Figure 7:
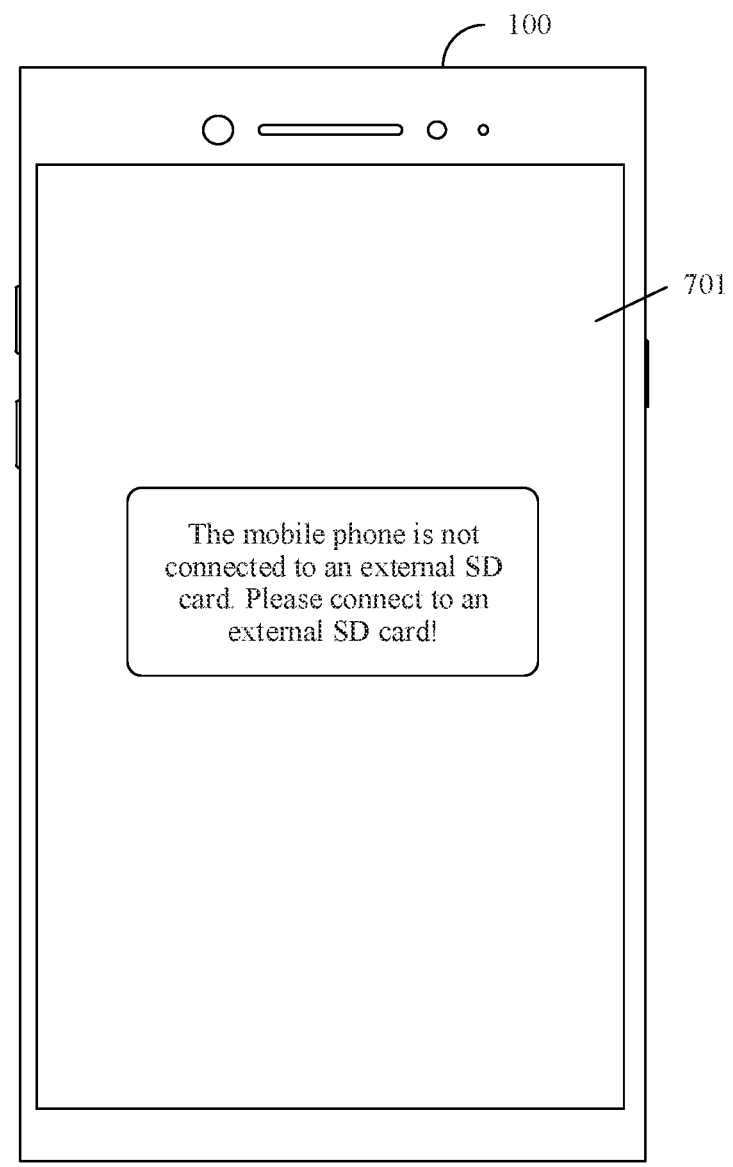
FIG. 7 is a schematic diagram of an example of another terminal screen according to an embodiment of this application.

For example, after receiving the second operation performed by the user on the "external SD card" backup option shown in FIG. 5(c), the mobile phone 100 may display the first guide screen 701 shown in FIG. 7. The first guide screen 701 includes the guide information "The mobile phone is not connected to an external SD card. Please connect to an external SD card!". When the mobile phone 100 detects that the user connects the external SD card to the mobile phone 100 shown in FIG. 7, the mobile phone 100 may read the user data from the first data partition, then transmit the read user data to the external SD card of the mobile phone 100, and display a dynamic backup screen 607 shown in FIG. 5(d).

It is assumed that the user selects the "back up to computer" backup option shown in FIG. 5(c). After receiving the second operation performed by the user on the "back up to computer" backup option, the mobile phone 100 may guide the user to install a mobile phone assistant on each of the mobile phone 100 and a target computer, and guide the user to establish a connection between the mobile phone 100 and the target computer. The connection between the mobile phone 100 and the target computer may be a wired connection or a wireless connection. For example, the mobile phone 100 may establish a wired connection to the target computer through a USB data cable. The wireless connection may be a Bluetooth connection, a Wi-Fi connection, an NFC connection, or the like. For a method for establishing a wireless connection between the terminal and the storage medium, refer to the foregoing descriptions in the embodiments of this application. Details are not described in this embodiment of this application.

A method in which the terminal transmits the user data to the target computer through the wired connection or the wireless connection to the target computer and a manner in which the terminal guides the user to establish the connection between the terminal and the target computer are not described in this embodiment of this application.

Figure 8:
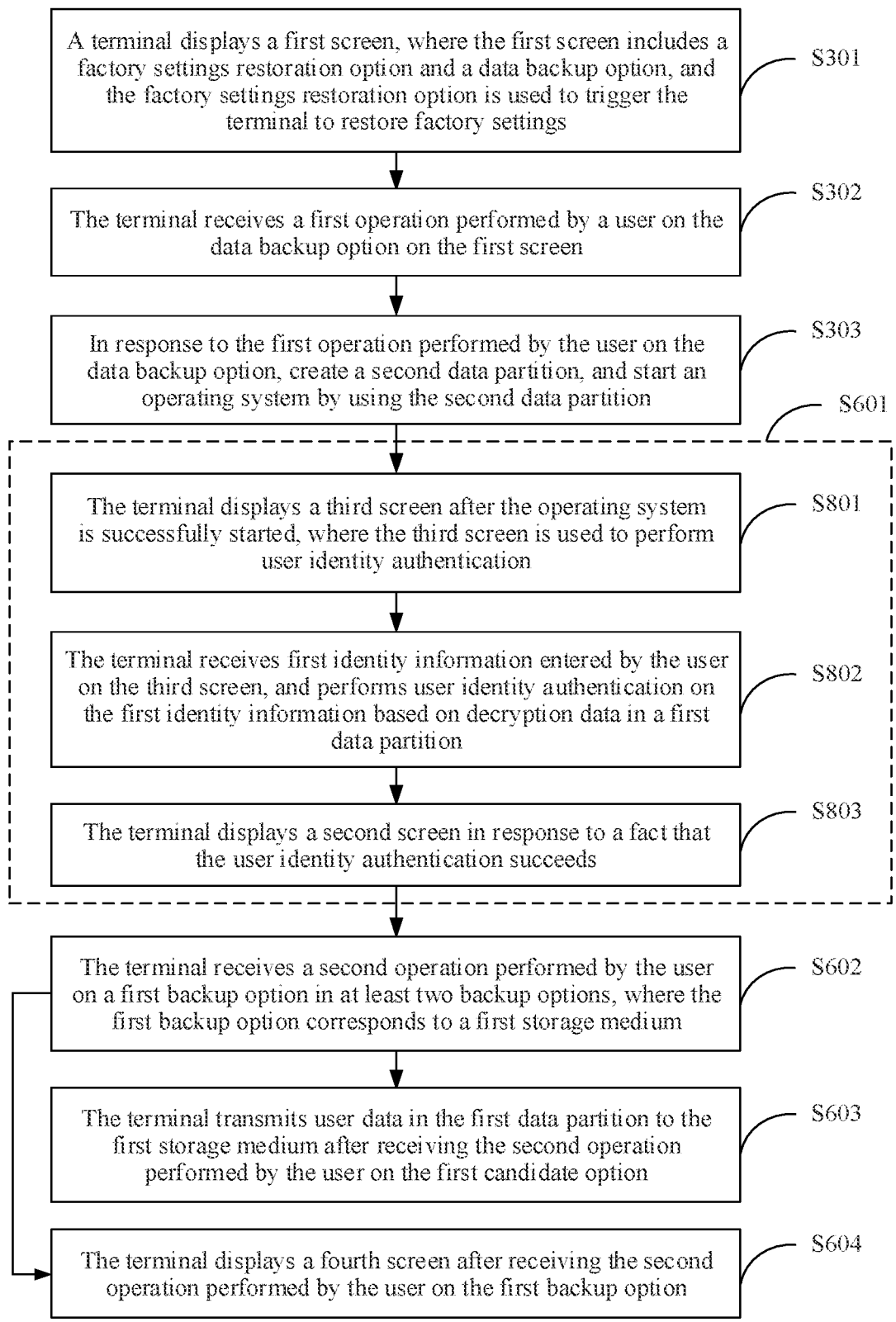
FIG. 8 is a flowchart of another data backup method according to an embodiment of this application.

Optionally, when transmitting the user data to the first storage medium, the terminal may further display transmission progress of the user data to the user in real time. Specifically, after S602, the method in this embodiment of this application may further include S604. For example, as shown in FIG. 8, after S602 shown in FIG. 6, the method in this embodiment of this application may further include S604.

S604: The terminal displays a fourth screen after receiving the second operation performed by the user on the first backup option.

The fourth screen includes first indication information, and the first indication information is used to indicate progress of transmitting the user data by the terminal to the first storage medium.

For example, the terminal is the mobile phone 100 shown in FIG. 5(a) to FIG. 5(d). In response to the single-tap operation performed by the user on the "external SD card" backup option shown in FIG. 5(a), the mobile phone 100 may display a fourth screen 507 shown in FIG. 5(d). The fourth screen 507 includes first indication information 508.

Optionally, S604 may include S2401 to S2403.

The first indication information in this embodiment of this application may be a text used to indicate the transmission progress of the user data. For example, the first indication information may be "Backing up data 2%". Alternatively, the first indication information may include a text and a progress bar that are used to indicate the transmission progress of the user data. For example, the first indication information may include "a circular progress bar 6%+backing up data" 508 shown in FIG. 5(d). A specific shape of the progress bar is not limited in this embodiment of this application. For example, the progress bar may alternatively be a rectangle.

In the data backup method provided in this embodiment of this application, when transmitting the user data to the first storage medium, the terminal displays the transmission progress of the user data to the user in real time. In this way, the transmission progress of the user data can be delivered to the user in real time, so that performance of interaction between the terminal and the user can be improved, and user experience can be improved.

It may be understood that, that the terminal is powered on and started by using the second data partition is equivalent to that the terminal is powered on for the first time after delivery. When the terminal is powered on for the first time after delivery, the terminal usually does not need to perform user identity authentication. However, in the solution in this embodiment of this application, after the terminal starts the system by using the second data partition, the previous user data may be backed up. If the terminal does not perform user identity authentication when the terminal is powered on and started by using the second data partition, a security risk exists.

In an implementation, to improve data security in the terminal, after the operating system is successfully started, the terminal may not directly display the second screen, but first perform user identity authentication. After the user identity authentication succeeds, the terminal displays the second screen. Specifically, S601 may include S801 to S803. For example, as shown in FIG. 8, S601 shown in FIG. 6 may include S801 to S803.

S801: The terminal displays a third screen after the operating system is successfully started. The third screen is used to perform user identity authentication.

The third screen may be a screen used to enter user identity information such as a fingerprint password, iris information, facial feature information, voice data, a digital password, or a pattern password. This is not limed in this embodiment of this application.

For example, the third screen is a screen used to enter a digital password. The mobile phone 100 may perform S303 in response to the first operation performed by the user on the "back up data" option 504 on the first screen 501 shown in FIG. 5(a). When the operating system is successfully started, the mobile phone 100 may display a third screen 505 shown in FIG. 5(b). The third screen 505 is used to enter a digital password to verify a user identity.

S802: The terminal receives first identity information entered by the user on the third screen, and performs user identity authentication on the first identity information based on decryption data in the first data partition.

It may be understood that, even if data that is in the first data partition and that is used to support to start the operating system is damaged, or the first data partition is in a read-only state, or data in the first data partition cannot be compatible with system software, the terminal can still read the decryption data for user identity authentication from the first data partition after the operating system of the terminal is started. The decryption data is stored in an original data partition (namely, the first data partition). Specifically, the decryption data may be stored in a decryption-related directory in the first data partition. For example, it can be learned from the foregoing embodiment that the mount point of the first data partition is changed to the directory /data_old, and the decryption data may be stored, for example, in a decryption-related directory /system_de in /data_old. In other words, the decryption data is stored in the directory /data_old/system_de.

To read the decryption data stored in the first data partition, before performing user identity authentication, the terminal may associate the decryption-related directory (for example, /data_old/system_de) in the first data partition with a decryption-related directory (for example, /data/system_de) in the mount point (for example, the mount point 1, that is, the directory 1, such as /data) of the second data partition. In this way, when accessing the decryption-related directory (for example, /data/system_de) in the mount point of the second data partition, the terminal may read the decryption-related decryption data in the first data partition.

For example, a method for associating the directory /data_old/system_de with the directory /data/system_de by the terminal may include: mounting, by the terminal, the directory (/data_old/system_de) onto the directory (/data/system_de) in a mount-bind manner.

In some other embodiments, the terminal may copy the decryption-related decryption data in the first data partition to the second data partition. Alternatively, code may be modified, so that the terminal reads content in the directory /data_old/system_de for user identity authentication after the system is started. In this way, the directory /data_old/system_de can be associated with the directory /data/system_de.

After receiving the first identity information entered by the user, the terminal may read the decryption data from the first data partition. Alternatively, after the operating system is successfully started, the terminal may read the decryption data from the first data partition. Then, the terminal performs user identity authentication on the first identity information based on the decryption data.

The first identity information in this embodiment of this application may be any one of a fingerprint password, iris information, facial feature information, voice data, a digital password, or a pattern password.

S803: The terminal displays the second screen in response to a fact that the user identity authentication succeeds.

The mobile phone 100 shown in FIG. 5(a) to FIG. 5(d) is used as an example. It is assumed that the user enters the first identity information on the third screen 505 shown in FIG. 5(b), and authentication on the first identity information succeeds. In response to a fact that the user identity authentication succeeds, the mobile phone 100 displays the second screen 506 shown in FIG. 5(c).

If the user identity authentication fails, the terminal may continue to display the third screen. Optionally, the terminal may further display, on the third screen, prompt information indicating that the authentication fails, for example, "User identity authentication fails. Please enter password again!".

In some application scenarios, to prevent a malicious user from stealing user data in a terminal of another person by using the method in this embodiment of this application, if the user identity authentication fails, the terminal may send an alarm prompt, to alert an owner to pay attention to information security protection of the terminal. Alternatively, if the user identity authentication fails, the terminal may enter a lock mode. In the lock mode, the terminal does not respond to any operation of the user. After the terminal enters the lock mode for a period of time (for example, one hour), the terminal may automatically exit the lock mode. The time in which the terminal keeps in the lock mode may be set by the user.

In the data backup method provided in this embodiment of this application, only after the user identity authentication succeeds, the terminal displays the second screen, and the user can select the first backup option on the second screen to back up the user data. In this way, a malicious user can be prevented from stealing user data in a terminal of another person by using the method in this embodiment of this application, so that security of the data in the terminal can be improved.

In this embodiment of this application, an objective of starting the operating system by the terminal 100 by using the second data partition is to back up the user data stored in the first data partition rather than use an application on the terminal. Based on this, after the operating system is successfully started, if the user identity authentication succeeds, the terminal may read a global system running mode identifier before loading a home screen of the terminal. It should be noted that, if the terminal starts the operating system by using a blank virtual data partition (namely, the second data partition), the mode identifier indicates that the system is in a data backup and recovery mode. If the mode identifier indicates that the system is in the data backup and recovery mode, the terminal does not load a default home screen of the system, that is, does not load a home screen launcher (a launcher application), and therefore does not display the home screen of the terminal. If the terminal does not display the home screen, the user cannot operate the terminal to use an application on the terminal.

Figure 9:
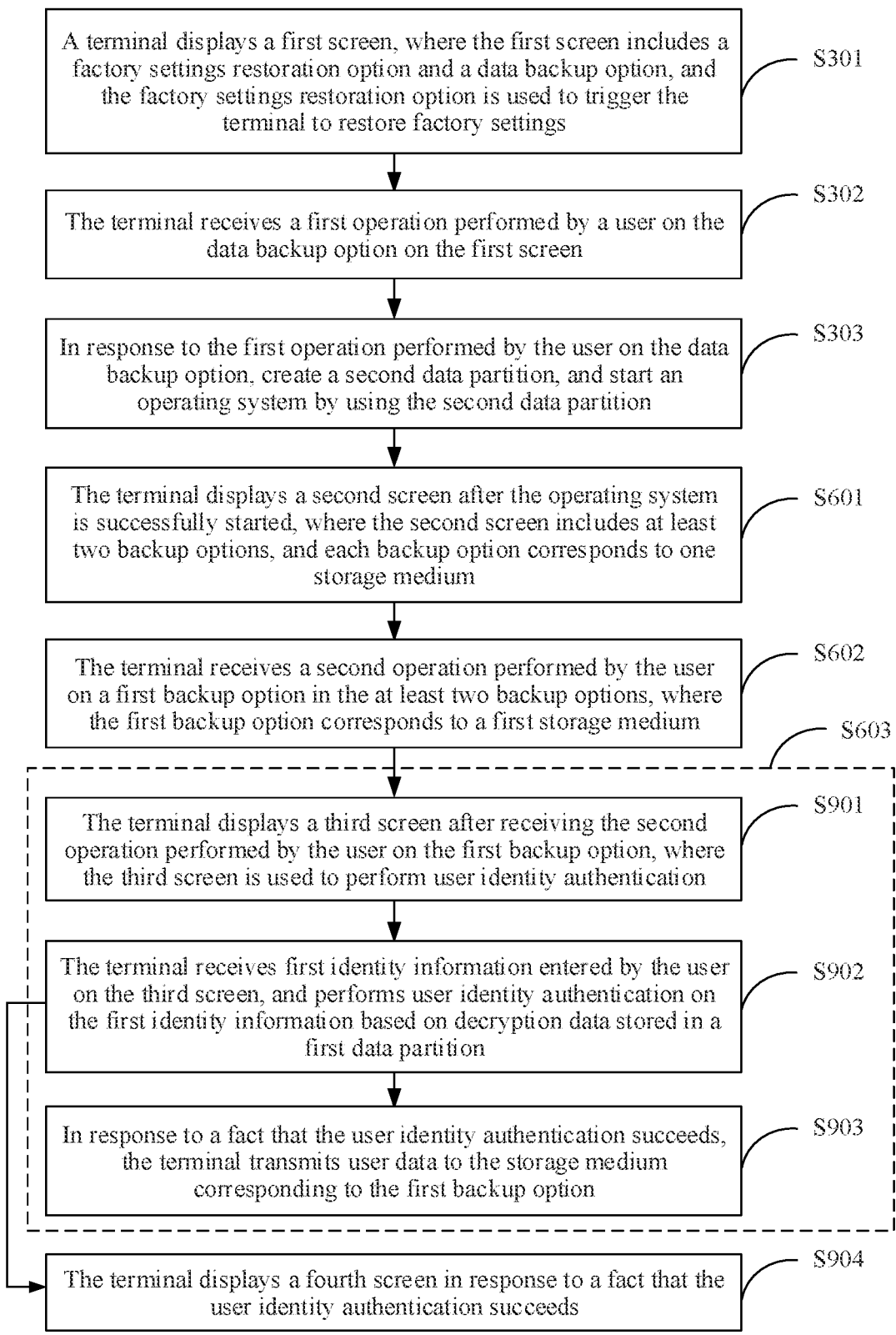
FIG. 9 is a flowchart of another data backup method according to an embodiment of this application.
Figure 10A:
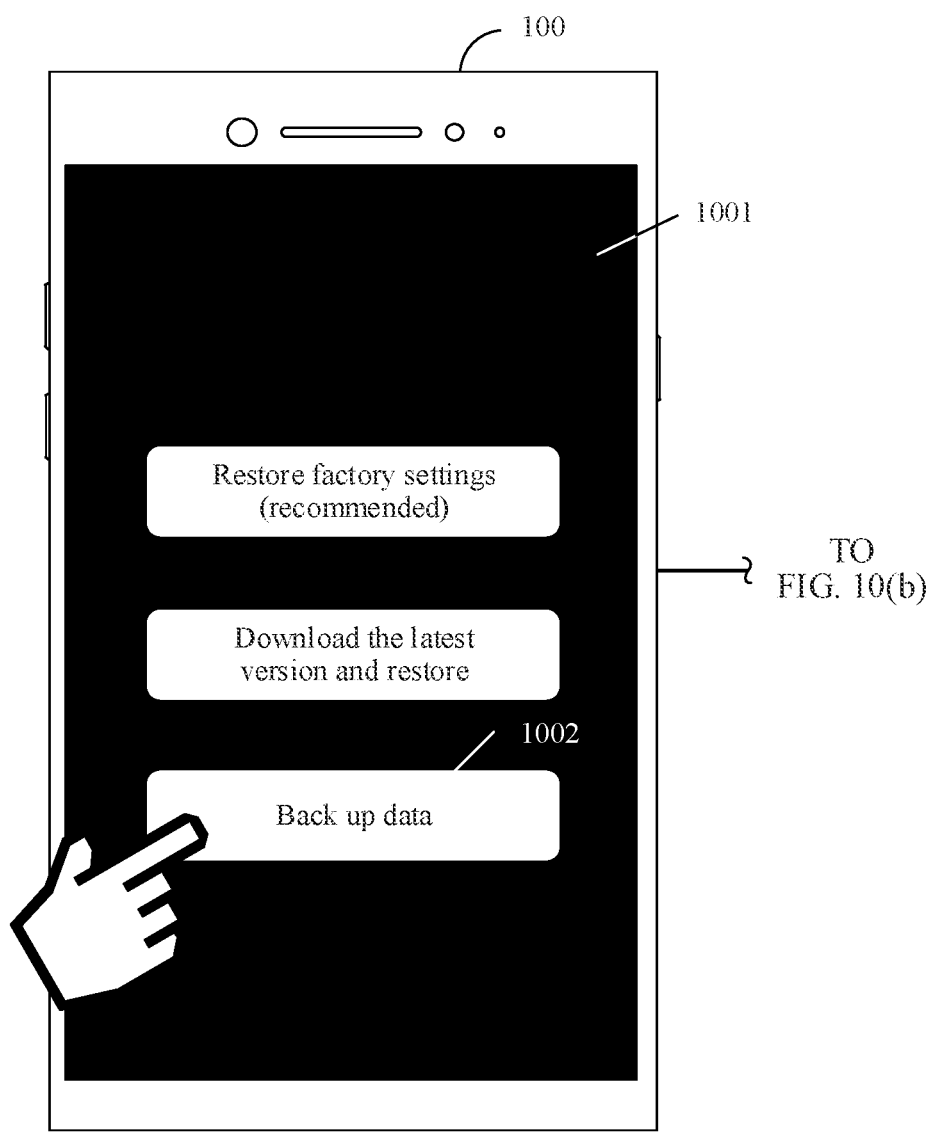
FIG. 10(*a*) to FIG. 10(*d*) are a schematic diagram of an example of another terminal screen according to an embodiment of this application.
Figure 10B:
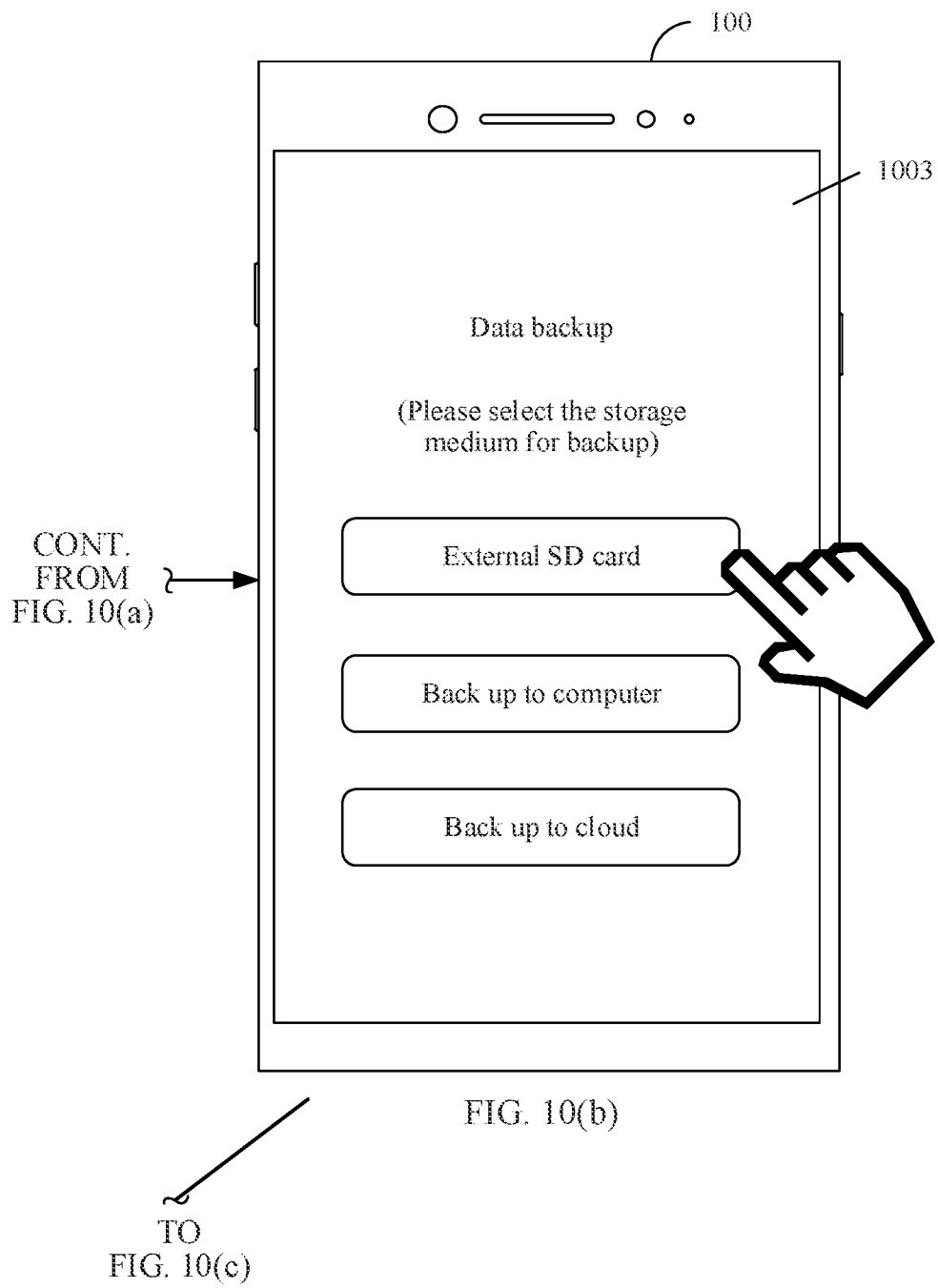
Figure 10C:
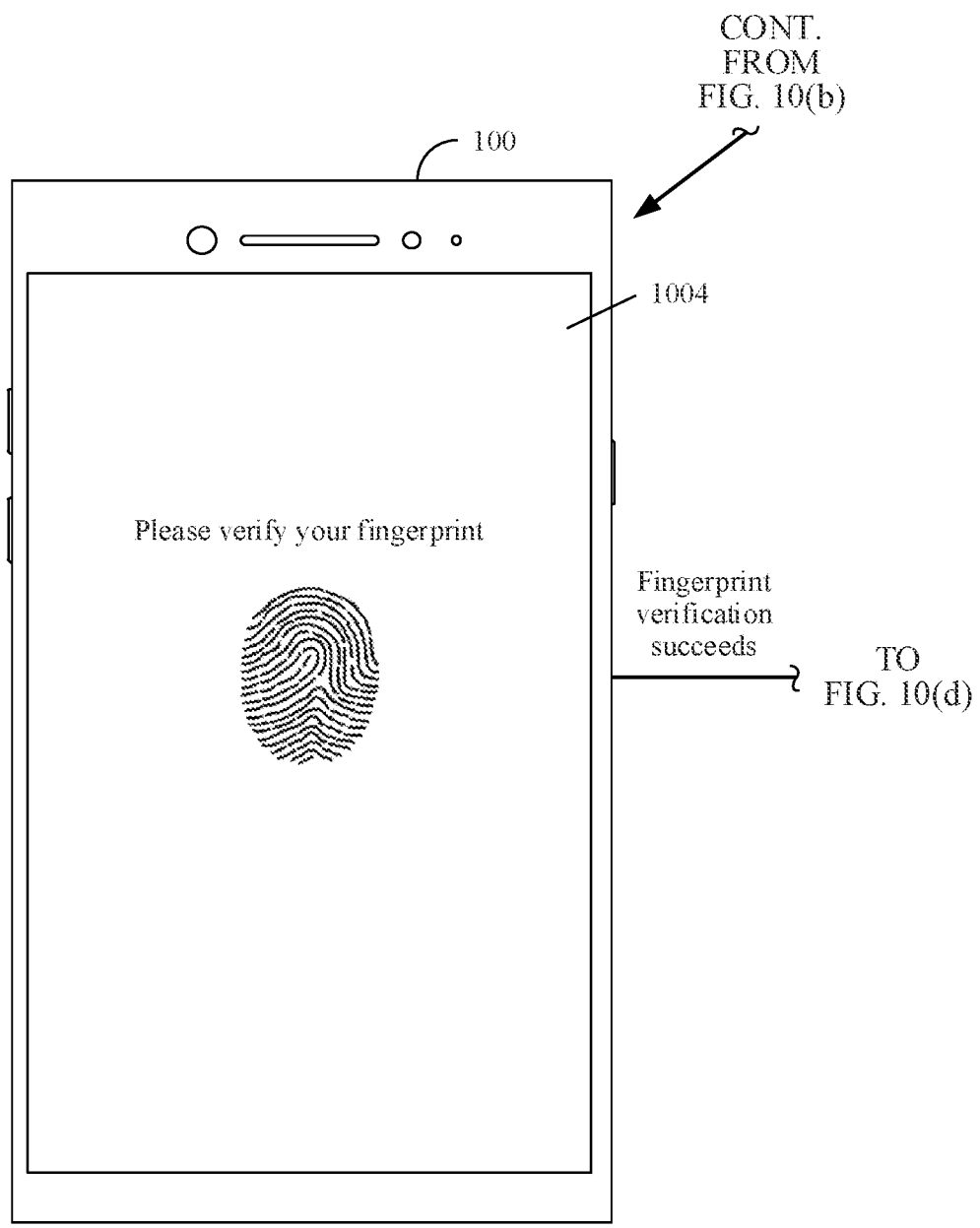
Figure 10D:
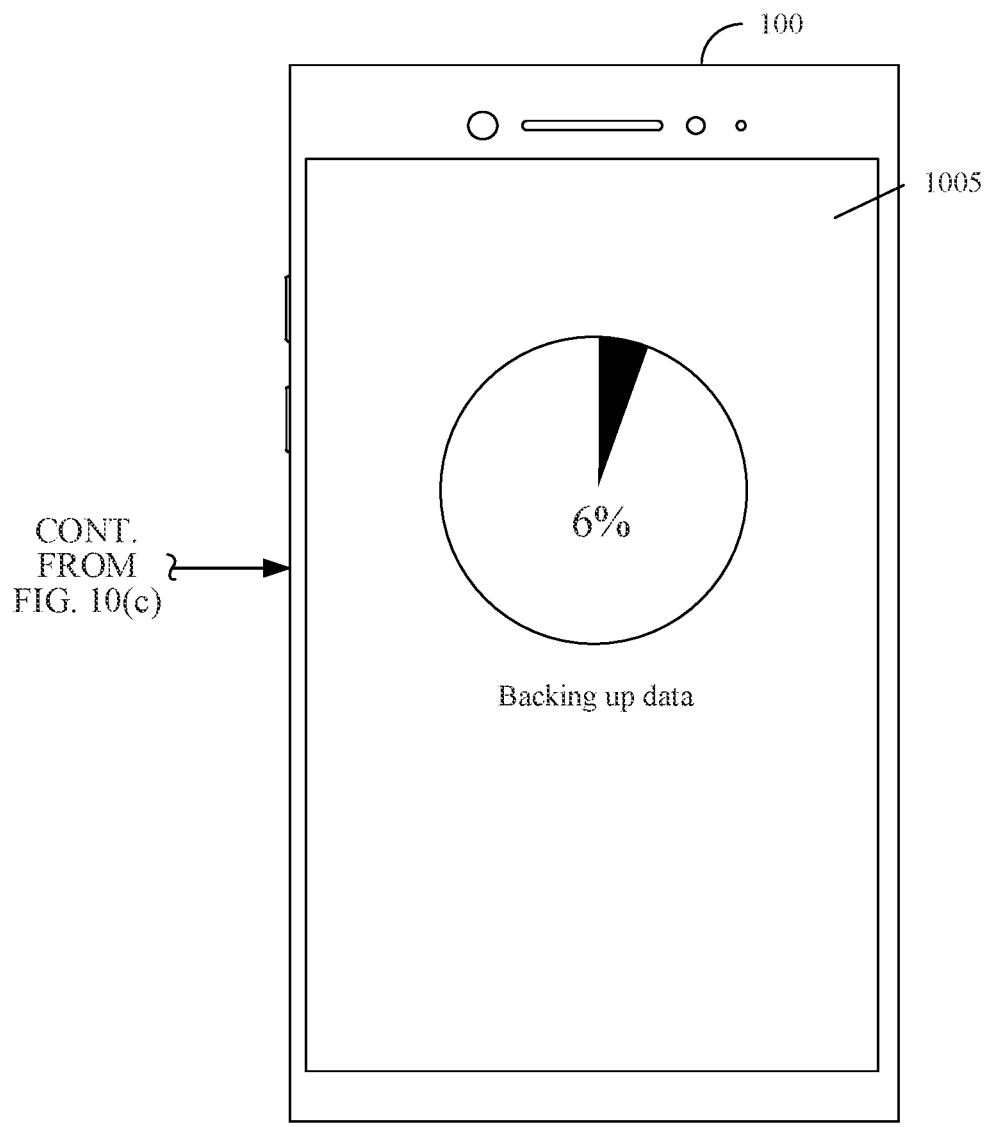

In another implementation, to improve data security in the terminal, after the operating system is successfully started, the terminal may directly display the second screen. However, after receiving the second operation performed by the user on the first backup option on the second screen, the terminal may not first transmit the user data to the first storage medium, but first perform user identity authentication. After the user identity authentication succeeds, the terminal transmits the user data to the first storage medium. Specifically, S603 may include S901 to S903. For example, as shown in FIG. 9, S603 shown in FIG. 6 may include S901 to S903.

S901: The terminal displays a third screen after receiving the second operation performed by the user on the first backup option. The third screen is used to perform user identity authentication.

For detailed descriptions of the third screen, refer to the descriptions of the third screen in S801. Details are not described again in this embodiment of this application.

For example, the terminal is a mobile phone 100 shown in FIG. 10(*a*) to FIG. 10(*d*), and the third screen is a screen used to enter fingerprint information. In response to a tap operation performed by the user on a "back up data" option 1002 on a first screen 1001 shown in FIG. 10(*a*), the mobile phone 100 may create the second data partition, and start the operating system of the terminal by using the second data partition. After the operating system is successfully started, the mobile phone 100 may display a second screen 1003 shown in FIG. 10(*b*). After receiving a second operation (for example, a single-tap operation) performed by the user on an "external SD card" backup option on a second screen 1003 shown in FIG. 10(*b*), the mobile phone 100 may display a third screen 1004 shown in FIG. 10(*c*).

S902: The terminal receives first identity information entered by the user on the third screen, and performs user identity authentication on the first identity information based on decryption data stored in the first data partition.

For detailed descriptions of S902, refer to the descriptions of S802 in this embodiment of this application. Details are not described again in this embodiment of this application.

S903: The terminal transmits the user data to the first storage medium in response to a fact that the user identity authentication succeeds.

For example, it is assumed that authentication on fingerprint information (namely, the first identity information) entered by the user on the third screen 1004 shown in FIG. 10(*c*) succeeds. In this case, the mobile phone 100 may transmit the user data to an external SD card.

Correspondingly, the terminal may display the fourth screen when the user identity authentication succeeds. As shown in FIG. 9, after S902, the method in this embodiment of this application may further include S904.

S904: The terminal displays the fourth screen in response to a fact that the user identity authentication succeeds.

For detailed descriptions of the fourth screen, refer to the descriptions of the fourth screen in S604. Details are not described again in this embodiment of this application.

In the data backup method provided in this embodiment of this application, after receiving the second operation performed by the user on the first backup option, the terminal needs to perform user identity authentication. The terminal can transmit the user data to the first storage medium only after the user identity authentication succeeds. In this way, a malicious user can be prevented from stealing user data in a terminal of another person by using the method in this embodiment of this application, so that security of the data in the terminal can be improved.

Further, after the terminal transmits the user data to the first storage medium, when the user data transmission is completed, the terminal may further display a sixth screen. The sixth screen is used to indicate that the user data is successfully backed up. Specifically, after S603, S604, S903, and S904, the method in this embodiment of this application may further include S1006.

S1006: The terminal displays the sixth screen in response to completion of the user data transmission.

The sixth screen includes second indication information. The second indication information is used to indicate that the user data is successfully backed up.

Figure 11:
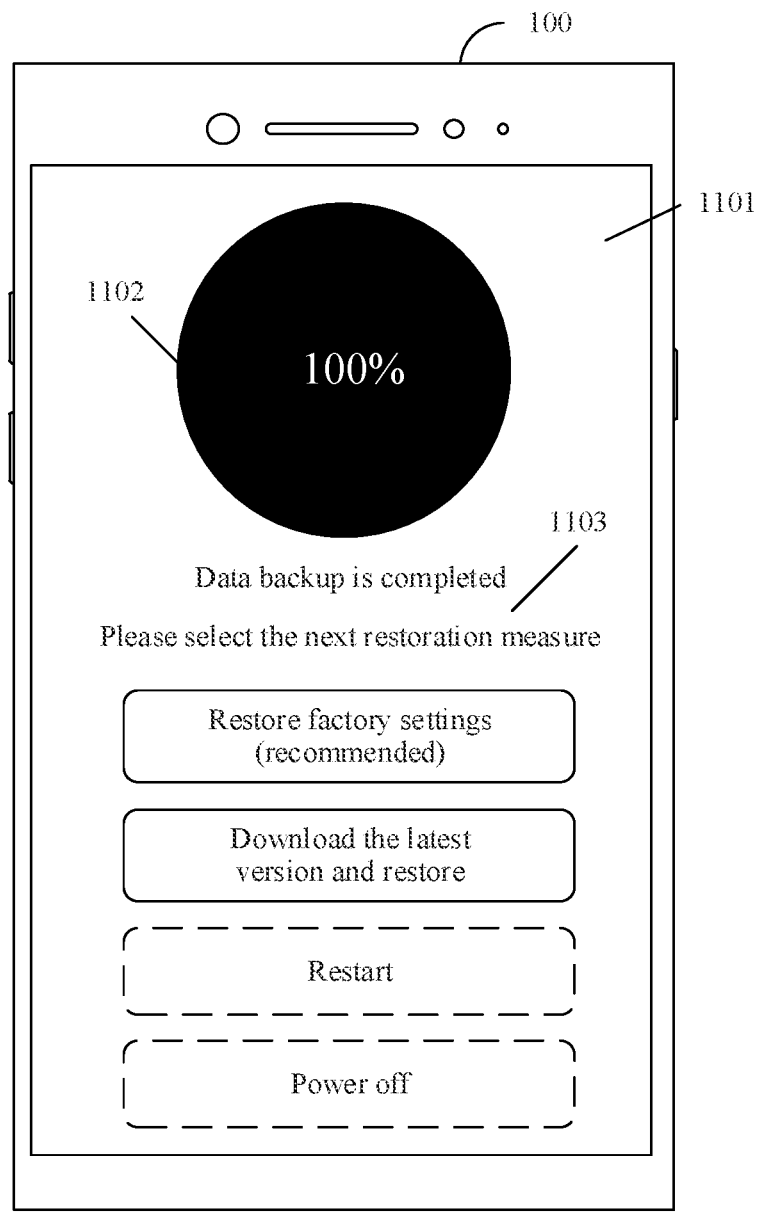
FIG. 11 is a schematic diagram of an example of another terminal screen according to an embodiment of this application.

For example, after the mobile phone 100 displays the fourth screen 507 shown in FIG. 5(*d*), or after the mobile phone 100 displays a fourth screen 1005 shown in FIG. 10(*d*), when the user data transmission is completed, the mobile phone 100 may display a sixth screen 1101 shown in FIG. 11. The sixth screen 1101 includes second prompt information 1102.

Similar to the first prompt information, the second indication information in this embodiment of this application may be a text used to indicate transmission progress of the user data. For example, the second indication information may be "Data backup is completed" or "Backing up data 100%". Alternatively, the second indication information may include a text and a progress bar that are used to indicate the transmission progress of the user data. For example, the second indication information may include "a circular progress bar 100%+data backup is completed" 1102 shown in FIG. 11. A specific shape of the progress bar is not limited in this embodiment of this application. For example, the progress bar may alternatively be a rectangle.

Optionally, the sixth screen may further include a factory settings restoration option. The factory settings restoration option is used to trigger the terminal to restore factory settings. When the user data transmission is completed, the terminal may display the sixth screen including the factory settings restoration option. In this way, the terminal may receive a tap operation performed by the user on the factory settings restoration option on the sixth screen, to restore the factory settings. After backup of the user data in the terminal is completed, the user can restore the backed-up user data to the terminal that has restored the factory settings, so that the user data is not lost.

The first screen displayed by the terminal is used to trigger the terminal to restore the factory settings. Therefore, the first screen not only may include the data backup option, but also may include the factory settings restoration option used to trigger the terminal to restore the factory settings. For example, the first screen 501 shown in FIG. 5(*a*) not only includes the "back up data" option 504, but also includes the "restore factory settings" option 502 and the "download the latest version and restore" option 503. For another example, the first screen 1201 shown in FIG. 12(*a*) not only includes a "back up data" option 1204, but also includes a "restore factory settings" option 1202 and a "download the latest version and restore" option 1203.

After the terminal displays the first screen, the user may tap the data backup option. For example, as shown in FIG. 5(*a*), the user taps the "back up data" option 504. The user may alternatively tap the factory settings restoration option. For example, as shown in FIG. 12(*a*), the user taps the "restore factory settings" option 1202. In response to a tap operation performed by the user on the "restore factory settings" option 1102, the mobile phone 100 displays a fifth screen 1208 shown in FIG. 12(*b*). The fifth screen 1208 includes a "start to restore factory settings" option 1109 and a "back" option 1210.

In this embodiment of this application, the "restore factory settings" option, the "start to restore factory settings" option, and the "download the latest version and restore" option each may be used to trigger the terminal to restore the factory settings. Therefore, the "restore factory settings" option and the "download the latest version and restore" option each may be referred to as a factory settings restoration option.

Usually, the mobile phone 100 may restore the factory settings in response to a tap operation performed by the user on the "start to restore factory settings" option 1109 shown in FIG. 12(*b*). In this embodiment of this application, to avoid a case in which the user is not aware of a feature that "the user data is lost after the terminal restores the factory settings", the user may be prompted to back up the user data after the user taps the "start to restore factory settings" option 1109 shown in FIG. 12(*b*). Specifically, after S301, the method in this embodiment of this application may further include S1301 and S1302, and S302 may be replaced with S1303. For example, as shown in FIG. 13, after S301 shown in FIG. 6, the method in this embodiment of this application may further include S1301 and S1302. S302 shown in FIG. 6 may be replaced with S1303.

S1301: The terminal receives a first operation performed by the user on the factory settings restoration option on the first screen.

S1302: The terminal displays a fifth screen in response to the first operation performed by the user on the factory settings restoration option. The fifth screen is used to indicate the user to determine whether to restore factory settings. The fifth screen includes a data backup option.

For example, in response to a tap operation performed by the user on the "start to restore factory settings" option 1109 shown in FIG. 12(*b*), the mobile phone 100 may display a fifth screen 1211 shown in FIG. 12(*c*). The fifth screen 1211 includes a "continue to restore factory settings" option 1214 and a "back up data" option 1213. The "continue to restore factory settings" option 1214 is used to trigger the mobile phone 100 to restore the factory settings. The "back up data" option 1213 is used to trigger the mobile phone 100 to back up the user data.

Optionally, the fifth screen may further include third prompt information. The third prompt information is used to indicate the user to back up the user data before the user triggers the terminal to restore the factory settings. For example, as shown in FIG. 12(*c*), the fifth screen 1211 may further include third prompt information "Please back up personal data before restoring factory settings!" 1212.

S1303: The terminal receives a first operation performed by the user on the data backup option on the fifth screen.

For example, the mobile phone 100 may receive a first operation (for example, a single-tap operation) performed by the user on the "back up data" option 1213 on the fifth screen 1211. In response to the first operation performed by the user on the "back up data" option 1213 on the fifth screen 1211, the mobile phone 100 may display the second screen 506 shown in FIG. 5(*c*) or the third screen 505 shown in FIG. 5(*b*).

According to S1301: the terminal receives a first operation performed by the user on the factory settings restoration option on the first screen, it can be learned that the user intends to trigger the terminal to restore the factory settings. In the solution of this embodiment of this application, before the terminal restores the factory settings, the user is prompted to back up the user data. Based on the prompt of the terminal, before triggering the terminal to restore the factory settings, the user chooses to first back up the user data.

Figure 14:
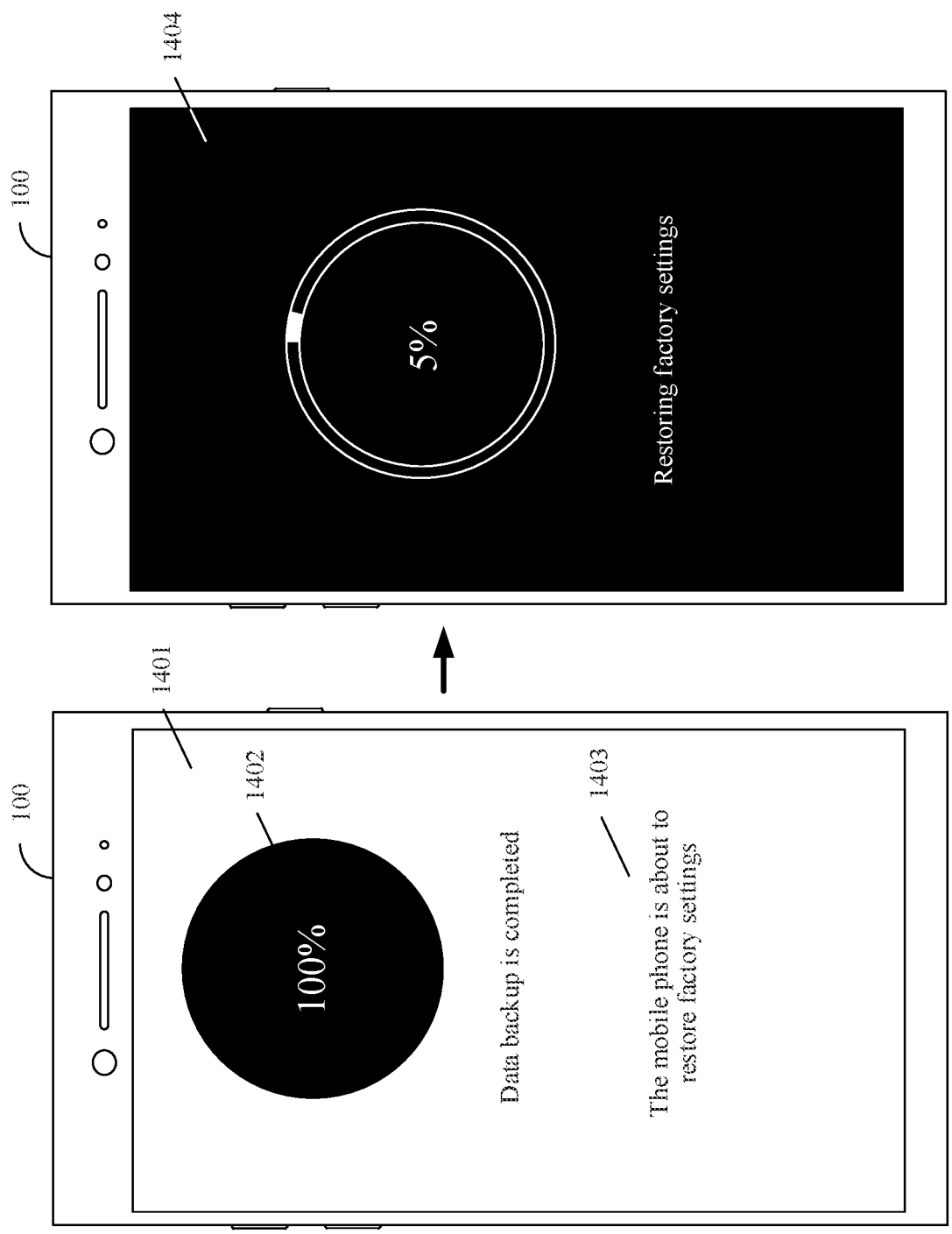
FIG. 14(*a*) and FIG. 14(*b*) are a schematic diagram of an example of another terminal screen according to an embodiment of this application.

Based on the foregoing descriptions, in consideration of a requirement of the user for triggering the terminal to restore the factory settings, after the terminal successfully backs up the user data (in other words, the terminal completes transmitting the user data to the first storage medium), the terminal may automatically restore the factory settings. For example, in response to completion of the user data transmission, the mobile phone 100 may display a sixth screen 1401 shown in FIG. 14(*a*). The sixth screen 1401 includes second indication information 1402. The second indication information 1402 is used to indicate that the user data is successfully backed up. Optionally, the sixth screen 1401 may further include prompt information "The mobile phone is about to restore factory settings" 1403. After displaying the sixth screen, the terminal may automatically start to restore the factory settings, and display a screen of restoring the factory settings by the terminal. For example, after displaying the sixth screen 1401 in FIG. 14(*a*) for a specific period of time (for example, n seconds), the mobile phone 100 may automatically start to restore the factory settings, and display a screen 1404 of restoring the factory settings that is shown in FIG. 14(b).

In some embodiments, the terminal may display the first screen when detecting the power-on failure of the terminal or detecting the preset operation. The terminal may receive the first operation performed by the user on the data backup option on the first screen. After receiving the first operation performed by the user on the data backup option on the first screen, the terminal may display a display screen including a backup continuing option. The display screen including the backup continuing option is used to indicate the user to determine whether to back up the user data (namely, the user data stored in the first partition). The terminal may receive a first operation performed by the user on the backup continuing option. After receiving the first operation performed by the user on the backup continuing option, the terminal may create the second data partition, and start the operating system by using the second data partition. After the operating system is successfully started, the terminal may transmit the user data in the first data partition to the first storage medium.

For example, the data backup option may be an "emergency backup" option 1902 on a first screen 1901 shown in FIG. 19A(1). The mobile phone 100 may receive a first operation (for example, a single-tap operation) performed by the user on the "emergency backup" option 1902. After receiving the single-tap operation performed by the user on the "emergency backup" option 1902, the mobile phone 100 may display a display screen 1903 shown in FIG. 19A(2). The display screen 1903 includes a "continue backup" option 1904. The mobile phone 100 may receive a first operation (for example, a single-tap operation) performed by the user on the "continue backup" option 1904, create the second data partition, and start the operating system by using the second data partition. A "back" option 1906 is used to trigger the mobile phone 100 to display the first screen 1901 shown in FIG. 19A(1).

Optionally, the first screen 1901 may further include a "download and restore" option 1905. The "download and restore" option 1905 is equivalent to the "download the latest version and restore" option 1203 shown in FIG. 12(a). The "download and restore" option 1905 is used to trigger the mobile phone 100 to download system software of a latest version and restore factory settings.

In some embodiments, if the terminal cannot be normally used due to a fault such as repeated restart, repeated occurrence of a blank screen, or freezing during use of the terminal, the user may charge the terminal or connect the terminal to another powered-on electronic device (for example, a computer) through a USB data cable. If the terminal is connected to a power supply or is connected to the another powered-on electronic device through the USB data cable, and a third operation (for example, a touch and hold operation) performed by the user on a preset shortcut key is detected when the terminal is powered on, the terminal may display the first screen including the "emergency backup" option.

It should be noted that, in some application scenarios, if the terminal cannot be powered on (for example, the terminal always displays a blank screen and cannot respond to any operation of the user), the terminal cannot display the first screen. In this case, the terminal may automatically create the second data partition when detecting the power-on failure of the terminal or detecting the preset operation.

Figure 19B:
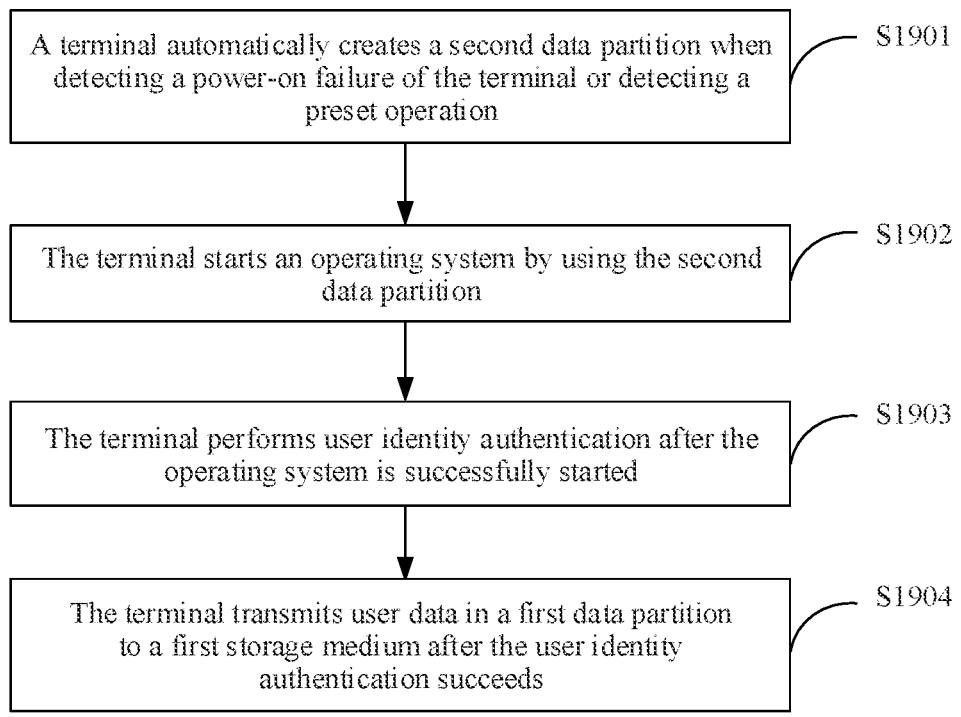
FIG. 19B is a flowchart of another data backup method according to an embodiment of this application.

In some other embodiments, as shown in FIG. 19B, the data backup method may include S1901 to S1904.

S1901: The terminal automatically creates the second data partition when detecting the power-on failure of the terminal or detecting the preset operation.

In an implementation, the terminal may automatically create the second data partition when detecting the power-on failure of the terminal. As described in the foregoing application scenario (1), a case of the power-on failure of the terminal may include the following: the terminal may always display a power-on animation screen, but the terminal cannot be powered on; or the terminal displays a blank screen; or the terminal is repeatedly restarted.

In this embodiment of this application, an entire process of starting the operating system of the terminal may be divided into a plurality of stage points. Usually, in a normal startup process of the operating system, after entering a boot-stage point, the terminal enters a next boot-stage point within a specific time period. In the startup process of the operating system, after the terminal enters a boot-stage point, if the terminal does not enter a next boot-stage point within a specific time period, it indicates that the terminal fails to be powered on. In other words, in the startup process of the operating system, after entering a boot-stage point, if the terminal does not enter a next boot-stage point within a specific time period, the terminal may automatically create the second data partition. For a specific manner in which the terminal detects the power-on failure of the terminal, refer to the detailed descriptions in the embodiment shown in FIG. 4. Details are not described again in this embodiment of this application.

In some embodiments, the terminal can be powered on, but the terminal that is powered on cannot be used by the user. For example, as described in the foregoing application scenario (2) to application scenario (3), although the terminal can be powered on, the terminal that is powered on cannot be used by the user. In this case, the terminal may automatically create the second data partition when detecting the preset operation of the user.

For example, the preset operation may be a third operation performed by the user on the foregoing preset shortcut key. For example, the third operation may be a touch and hold operation (for example, touch and hold for more than 5 seconds) performed by the user on a "volume+" button. Alternatively, the preset operation may be a preset gesture entered by the user on a touchscreen. For example, the preset gesture may be an S-shaped gesture.

Alternatively, in the foregoing application scenario (2) to application scenario (3), the terminal can automatically detect that the terminal cannot be normally used after being powered on. The terminal automatically creates the second data partition when detecting that the terminal cannot be normally used after being powered on. For example, after detecting that the terminal is powered on, w % ben the terminal cannot receive a password entered by the user on a lock screen or cannot receive fingerprint information entered by the user, and consequently cannot display ahome screen, the terminal may automatically create the second data partition. For example, after displaying the home screen, the terminal may automatically create the second data partition when detecting that the terminal cannot respond to input of the user on an icon on the home screen.

The second data partition is a blank virtual data partition. The terminal may select a storage medium from the available storage media of the terminal, and create a blank virtual data partition in the storage medium. For a method in which the terminal selects the storage medium for creating the second data partition, refer to the related descriptions in S303. Details are not described again in this embodiment of this application. For example, the terminal may create a blank data partition in a RAM. The terminal may dynamically create the data partition in the RAM. Therefore, a dedicated data partition does not need to be reserved on a storage device (such as an EMMC/a UFS) of the terminal, or an external memory does not need to be inserted into the terminal to serve as a data partition.

The blank virtual data partition does not store any historical data used to run the operating system. Therefore, the blank virtual data partition has no problem in the foregoing application scenario (1) to application scenario (4), and does not cause a startup failure of the system. In other words, the terminal can start the system by using the blank virtual data partition.

S1902: The terminal starts the operating system by using the second data partition.

After creating the second data partition, the terminal may first format the second data partition. It is assumed that a mount point of the first data partition is a mount point 1, that is, a directory 1, such as /data. The terminal may mount the second data partition onto the mount point 1 of the first data partition, and mount the first data partition onto a new mount point (for example, a mount point 2, that is, a directory 2, such as /data_old).

A directory that needs to be accessed when the terminal starts the operating system is usually unchanged. Therefore, after the newly created second data partition is mounted onto an original mount point of the first data partition, the terminal may use the newly created second data partition when starting the system. For example, the directory that needs to be accessed when the terminal starts the operating system is the directory 1 (such as /data), namely, the previous mount point of the first data partition. In this case, the second data partition is mounted onto the directory 1 (such as /data). Therefore, the terminal may access the directory 1 (such as /data), and start the operating system by using the second data partition currently mounted onto the directory 1.

Optionally, the second data partition may be pre-created. In this way, the terminal may directly start the operating system by using the pre-created second data partition when detecting the power-on failure of the terminal or detecting the preset operation. The terminal may pre-format the pre-created second data partition. When detecting the power-on failure of the terminal or detecting the preset operation, the terminal may mount the pre-created second data partition onto the original mount point (for example, the mount point 1, that is, the directory 1, such as /data) of the first data partition, and mount the first data partition onto a new mount point (for example, the mount point 2, that is, the directory 2, such as /data_old). In this way, the terminal may access the directory 1 (such as /data), and start the operating system by using the second data partition currently mounted onto the directory 1.

The new mount point (for example, the mount point 2) of the first data partition is an accessible mount point. In this way, after starting the operating system, the terminal may access the mount point 2, and read the user data in the first data partition from the mount point 2.

After the operating system is successfully started, the terminal may back up the user data in the first data partition. Specifically, after S1902, the method in this embodiment of this application may further include S1903 and S1904.

S1903: The terminal performs user identity authentication after the operating system is successfully started.

The terminal may display a lock screen after the operating system is successfully started. For example, after the operating system is successfully started, the terminal 100 may display a lock screen 2001 shown in FIG. 20(a). The terminal 100 may perform user identity authentication on the lock screen 2001.

Figures 20A, 20B:
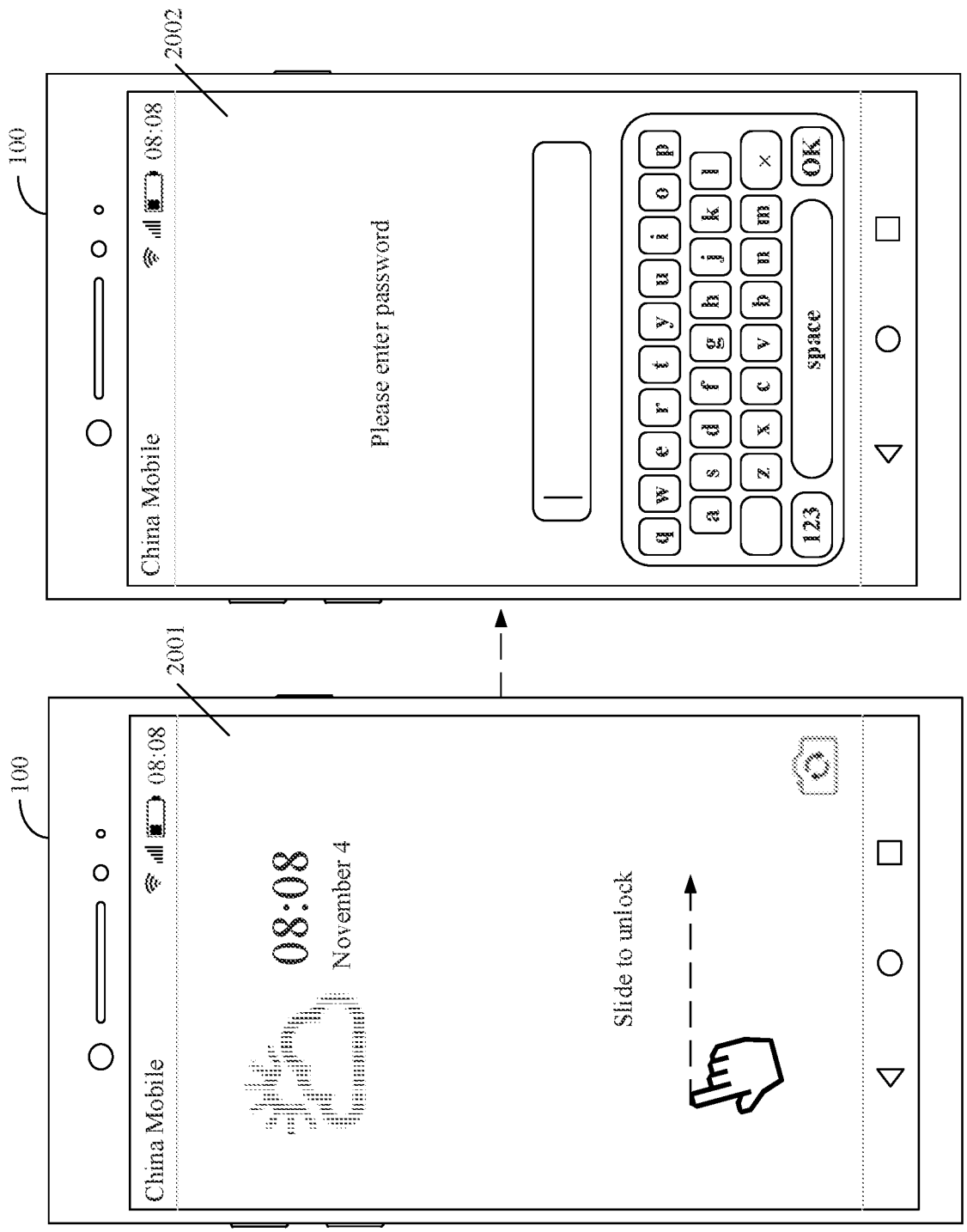
FIG. 20(*a*) and FIG. 20(*b*) are a schematic diagram of an example of another terminal screen according to an embodiment of this application.

It may be understood that, if the user sets no lock-screen password in the terminal 100, after the terminal 100 receives an unlock operation (for example, a slide operation shown in FIG. 20(a)) performed by the user on the lock screen, the user identity authentication succeeds. If the user sets a lock-screen password in the terminal 100, after receiving a slide operation shown in FIG. 20(a), the terminal may display a user authentication screen 2002 (that is, a third screen) shown in FIG. 20(b). The terminal 100 may receive first identity information (for example, a lock-screen password) entered by the user on the user authentication screen 2002, and verify the first identity information. If the verification succeeds, the user identity authentication succeeds.

If the user identity authentication fails, the terminal may continue to display the third screen. Optionally, the terminal may further display, on the third screen, prompt information indicating that the authentication fails, for example, "User identity authentication fails. Please enter password again!".

The third screen may be a screen used to enter user identity information such as a fingerprint password, iris information, facial feature information, voice data, a digital password, or a pattern password. This is not limed in this embodiment of this application.

It should be noted that the terminal performs authentication regardless of whether the user sets a password. However, the terminal needs to use decryption data (for example, the foregoing decryption data) in an authentication process. The decryption data is stored in an original data partition (namely, the first data partition). Specifically, the decryption data is stored in a decryption-related directory in the first data partition. For example, it can be learned from the foregoing embodiment that the mount point of the first data partition is the directory /data_old, and the decryption data is stored in a decryption-related directory /system_de in /data_old. In other words, the decryption data is stored in the directory /data_old/system_de.

To read the decryption data stored in the first data partition, after the system is started, before performing authentication, the terminal may associate the decryption-related directory (for example, /data_old/system_de) in the first data partition with a decryption-related directory (for example, /data/system_de) in the mount point (for example, the mount point 1, that is, the directory 1, such as /data) of the second data partition. In this way, when accessing the decryption-related directory (for example, /data/system_de) in the mount point of the second data partition, the terminal may read decryption-related content (such as the decryption data) in the first data partition.

For example, a method for associating the directory /data_old/system_de with the directory /data/system_de by the terminal may include: mounting, by the terminal, the directory (/data_old/system_de) onto the directory (/data/system_de) in a mount-bind manner.

In some other embodiments, a method for associating the directory /data_old/system_de with the directory /data/system_de by the terminal may alternatively include the following: The terminal may copy the decryption-related content in the first data partition to the second data partition. Alternatively, code may be modified, so that the terminal accesses content in the directory /data_old/system_de for user identity authentication after the system is started.

S1904: The terminal transmits the user data in the first data partition to the first storage medium after the user identity authentication succeeds.

After the user identity authentication succeeds, the user data in the first data partition is automatically decoded. Therefore, after the user identity authentication succeeds, the terminal may read the user data in the first data partition, and transmit the read user data to the first storage medium.

For example, if the user sets no lock-screen password in the terminal 100, after the terminal 100 receives the slide operation that is shown in FIG. 20(*a*) and that is performed by the user, the user identity authentication succeeds, and then the terminal 100 may transmit the user data in the first data partition to the first storage medium. Optionally, when transmitting the user data to the first storage medium, the terminal may further display transmission progress of the user data to the user in real time. For example, in response to the slide operation that is shown in FIG. 20(*a*) and that is performed by the user, the terminal 100 may display a fourth screen 2206 shown in FIG. 22(*b*). The fourth screen 2206 includes first prompt information "Backing up data". For detailed descriptions of the first prompt information, refer to the descriptions of the fourth screen in the foregoing embodiment. Details are not described again in this embodiment of this application.

If the user sets a lock-screen password in the terminal 100, after receiving the slide operation shown in FIG. 20(*a*), the terminal may display the user authentication screen 2002 shown in FIG. 20(*b*). If a lock-screen password received by the terminal 100 on the user authentication screen 2002 matches the lock-screen password that is set in the terminal 100, the user identity authentication succeeds, and the terminal 100 may display the fourth screen 2206 shown in FIG. 22(*b*).

It should be noted that for detailed descriptions of the first storage medium, refer to the related descriptions in S304. Details are not described again in this embodiment of this application.

This embodiment of this application provides the data backup method. When the terminal cannot be powered on or the terminal detects the preset operation of the user, the terminal may automatically create the blank virtual data partition (namely, the second data partition), and start the operating system of the terminal by using the second data partition. After the operating system is started, the terminal may transmit the user data to the first storage medium, to back up the user data.

Even if the terminal cannot be used because the first data partition is faulty, before restoring factory settings (in other words, before the user data is lost), the terminal may automatically create a new data partition, and start the operating system by using the new data partition (for example, the second data partition), to read the user data in the first data partition, so as to back up the user data. In this way, after the user data is backed up, even if the terminal restores the factory settings, the user can restore the backed-up user data to the terminal that has restored the factory settings, so that the user data is not lost.

Usually, in a normal use process of the terminal, if the user identity authentication succeeds, the terminal 100 may load a home screen (namely, a home screen) of the terminal. After the terminal 100 displays the home screen, the user may operate an application icon on the home screen, and use an application corresponding to the application icon on the home screen.

In this embodiment of this application, an objective of starting the operating system by the terminal 100 by using the second data partition is to back up the user data stored in the first data partition rather than use an application on the terminal. Based on this, after the operating system is successfully started, if the user identity authentication succeeds, the terminal may read a global system running mode identifier before loading the home screen of the terminal. It should be noted that, if the terminal starts the operating system by using a blank virtual data partition (namely, the second data partition), the mode identifier indicates that the system is in a data backup and recovery mode. If the mode identifier indicates that the system is in the data backup and recovery mode, the terminal does not load a default home screen of the system, that is, does not load a home screen launcher (a launcher application), and therefore does not display the home screen of the terminal. If the terminal does not display the home screen, the user cannot operate the terminal to use an application on the terminal.

Figure 21:
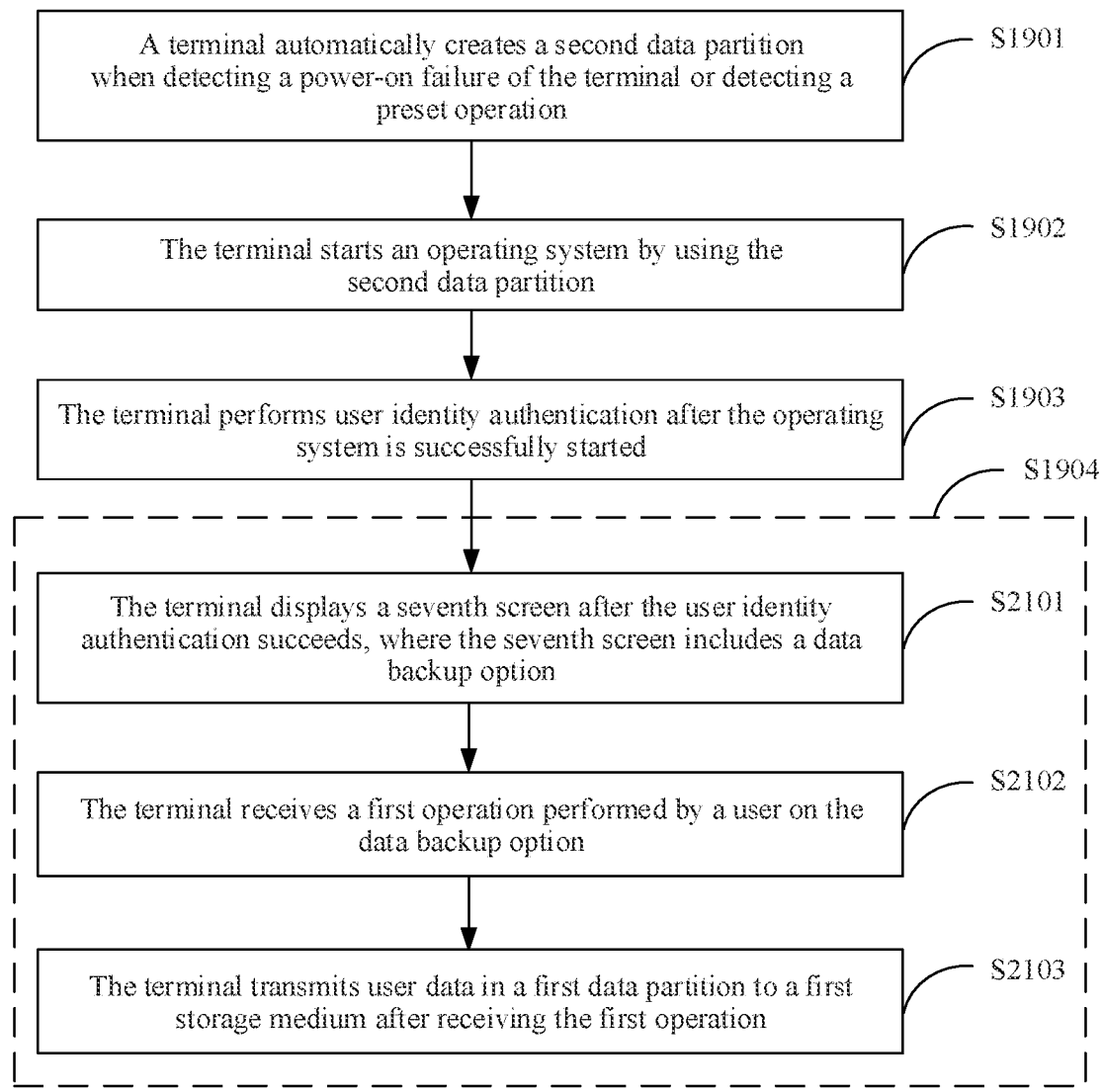
FIG. 21 is a flowchart of another data backup method according to an embodiment of this application.

In some embodiments, after the user identity authentication succeeds, the terminal may display a seventh screen including a data backup option. The terminal may receive a first operation performed by the user on the data backup option, and the user chooses whether to back up data. Specifically, as shown in FIG. 21, S1904 shown in FIG. 19B may include S2101 to S2103.

S2101: The terminal displays the seventh screen after the user identity authentication succeeds, where the seventh screen includes the data backup option.

For example, if no lock-screen password is set in the terminal 100, after the terminal 100 receives the slide operation that is shown in FIG. 20(*a*) and that is performed by the user, the user identity authentication succeeds, and the terminal 100 may display a seventh screen 2201 shown in FIG. 22(*a*). The seventh screen 2201 includes a "back up data" option 2202.

If a lock-screen password is set in the terminal 100, after a lock-screen password received by the terminal 100 on the user authentication screen 2002 is verified, the terminal 100 may display a seventh screen 2201 shown in FIG. 22(*a*).

As shown in FIG. 22(*a*), the seventh screen 2201 includes a "back up data" option 2202. The "back up data" option 2202 is used to trigger the mobile phone 100 to back up user data in the mobile phone 100.

Optionally, as shown in FIG. 22(*a*), the seventh screen 2201 may further include a "restore factory settings" option 2203. The "restore factory settings" option 2203 may be used to trigger the mobile phone 100 to restore the factory settings. Optionally, the seventh screen 2201 may further include a "restart" option 2204 and a "power off" option 2205. The "restart" option 2204 is used to trigger restart of the mobile phone 100. The "power off" option 2205 is used to trigger power-off of the mobile phone 100. Optionally, the seventh screen 2201 may further include a "clear buffer" option (not shown in the figure). The "clear buffer" option is used to trigger the mobile phone 100 to clear data buffered in a running process of the mobile phone 100, to resolve a problem that the mobile phone 100 cannot be normally used because the mobile phone 100 buffers too much data.

Optionally, the seventh screen may further include one or more options such as a "download and restore" option and a "clear buffer" option. For example, as shown in FIG. 22(*a*), the seventh screen 2201 may further include a "download and restore" option 2207. For specific functions of the "download and restore" option and the "clear buffer" option, refer to the related descriptions in the foregoing embodiment. Details are not described again in this embodiment of this application.

S2102: The terminal receives the first operation performed by the user on the data backup option.

For example, the terminal is the mobile phone 100 shown in FIG. 22(a) and FIG. 22(b). The first operation performed by the user on the data backup option on the seventh screen may be a single-tap operation, a double-tap operation, a touch and hold operation, or the like performed by the user on the "back up data" option 2202 on the seventh screen 2201.

S2103: The terminal transmits the user data in the first data partition to the first storage medium after receiving the first operation.

For example, after receiving a first operation performed by the user on the "back up data" option 2202 shown in FIG. 22(a), the mobile phone 100 may display the fourth screen 2206 shown in FIG. 22(b).

Figure 23A:
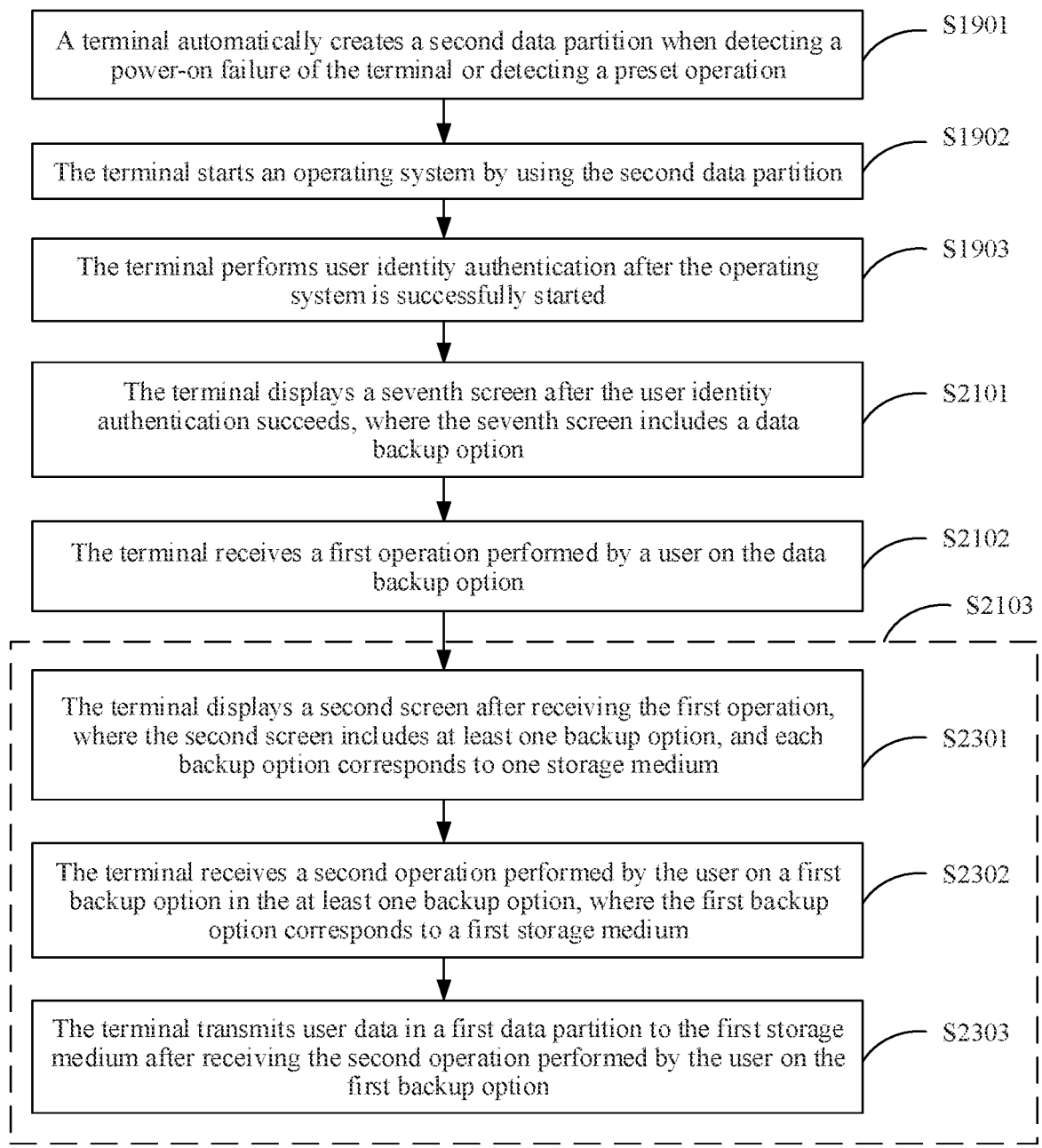
FIG. 23A is a flowchart of another data backup method according to an embodiment of this application.

The terminal can be connected to a plurality of storage media. After the operating system is started, the user may select the first storage medium from the plurality of storage media, to back up the user data. Specifically, as shown in FIG. 23A, S2103 may include S2301 to S2303.

S2301: The terminal displays a second screen after receiving the first operation. The second screen includes at least one backup option. Each backup option corresponds to one storage medium.

For example, after receiving a tap operation performed by the user on the "back up data" option 2202 on the first screen 2201 shown in FIG. 23B(1), the mobile phone 100 may display a second screen 2301 shown in FIG. 23B(2). The second screen 2301 may include an "external storage" backup option, a "mobile phone assistant" backup option, and a "cloud" backup option.

The "external storage" backup option shown in FIG. 23B(2) is used to trigger the mobile phone 100 to back up the user data in the mobile phone 100 to an external memory. The "mobile phone assistant" backup option (equivalent to the "back up to computer" backup option shown in FIG. 5(c)) is used to trigger the mobile phone 100 to back up the user data in the mobile phone 100 to a computer by using a mobile phone assistant. The "cloud" backup option (equivalent to the "back up to cloud" backup option shown in FIG. 5(c)) is used to trigger the mobile phone 100 to back up the user data in the mobile phone 100 to a cloud server.

S2302: The terminal receives a second operation performed by the user on a first backup option in the at least one backup option, where the first backup option corresponds to the first storage medium.

The second operation may be a single-tap operation, a double-tap operation, a touch and hold operation, or the like. The second operation is used to select the first backup option from the at least one backup option. For example, as shown in FIG. 23B(2), the mobile phone 100 may receive a single-tap operation performed by the user on the "external storage" backup option. The terminal may be connected to one or more external memories. For example, in response to the single-tap operation performed by the user on the "external storage" backup option, the mobile phone 100 may display an external storage screen 2302 shown in FIG. 23B(3). The external storage screen 2302 includes an "external storage card" backup option and a "USB storage" backup option. The "external storage card" backup option corresponds to an external storage card (namely, an external SD card) connected to the mobile phone 100. The "USB storage" backup option corresponds to a storage device connected to the mobile phone 100 through a USB port. The second operation may include: a single-tap operation performed by the user on the "external storage" backup option shown in FIG. 22(b), and a single-tap operation performed by the user on the "external storage card" backup option shown in FIG. 23B(3).

S2303: The terminal transmits the user data in the first data partition to the first storage medium after receiving the second operation performed by the user on the first backup option.

For example, after receiving the single-tap operation performed by the user on the "external storage card" backup option shown in FIG. 23B(3), the mobile phone 100 may display a fourth screen 2303 shown in FIG. 23B(4).

Figure 23C:
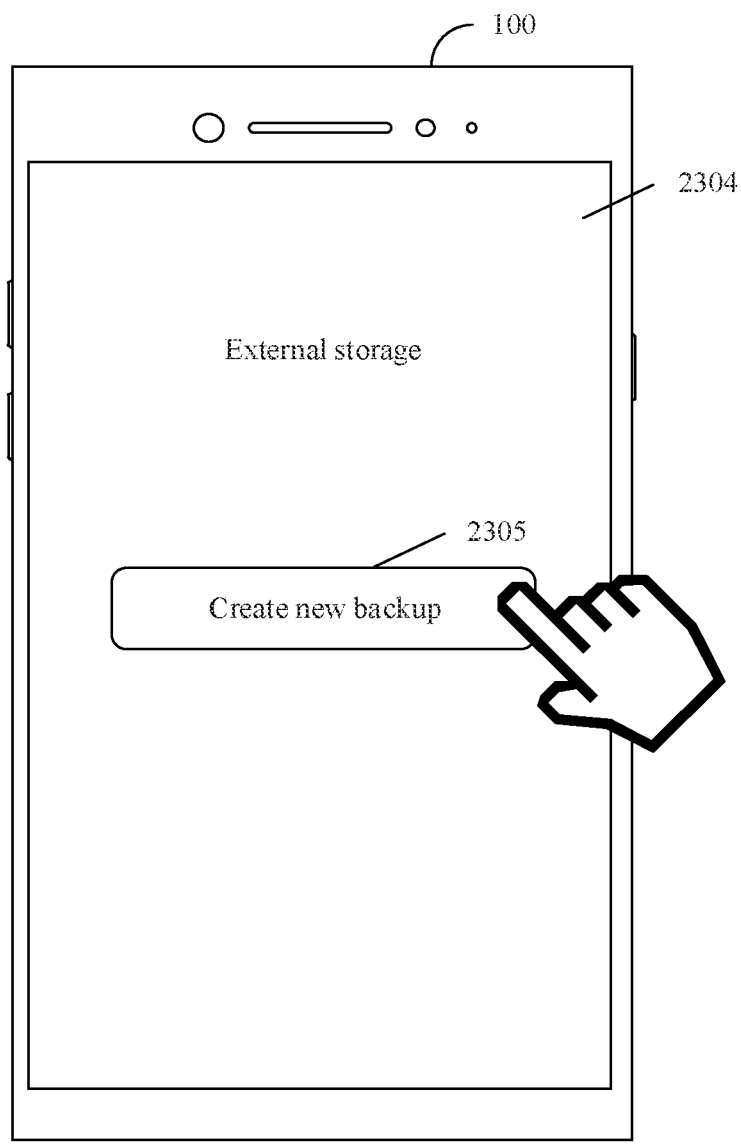
FIG. 23C is a schematic diagram of an example of another terminal screen according to an embodiment of this application.

Optionally, before transmitting the user data in the first data partition to the first storage medium, the terminal 100 may create, in the first storage medium, a backup folder used to store the data that is to be backed up. For example, in response to the single-tap operation performed by the user on the "external storage card" backup option shown in FIG. 23B(3), the mobile phone 100 may display a creation screen 2304 shown in FIG. 23C. The creation screen 2304 includes a "create backup" option 2305. In response to a single-tap operation performed by the user on the "create new backup" option 2305, the mobile phone 100 may newly create a backup folder in the first storage medium, and transmit the user data in the first data partition to the backup folder newly created in the first storage medium. For example, in response to the single-tap operation performed by the user on the "create new backup" option 2305, the mobile phone 100 may display the fourth screen 2303 shown in FIG. 23B(4).

A method in which the terminal transmits the user data to the first storage medium through a wired connection or a wireless connection to the first storage medium and a manner in which the terminal guides the user to establish the connection between the terminal and the first storage medium are not described in this embodiment of this application.

In the data backup method provided in this embodiment of this application, when transmitting the user data to the first storage medium, the terminal displays the transmission progress of the user data to the user in real time. In this way, the transmission progress of the user data can be delivered to the user in real time, so that performance of interaction between the terminal and the user can be improved, and user experience can be improved.

Figure 24A:
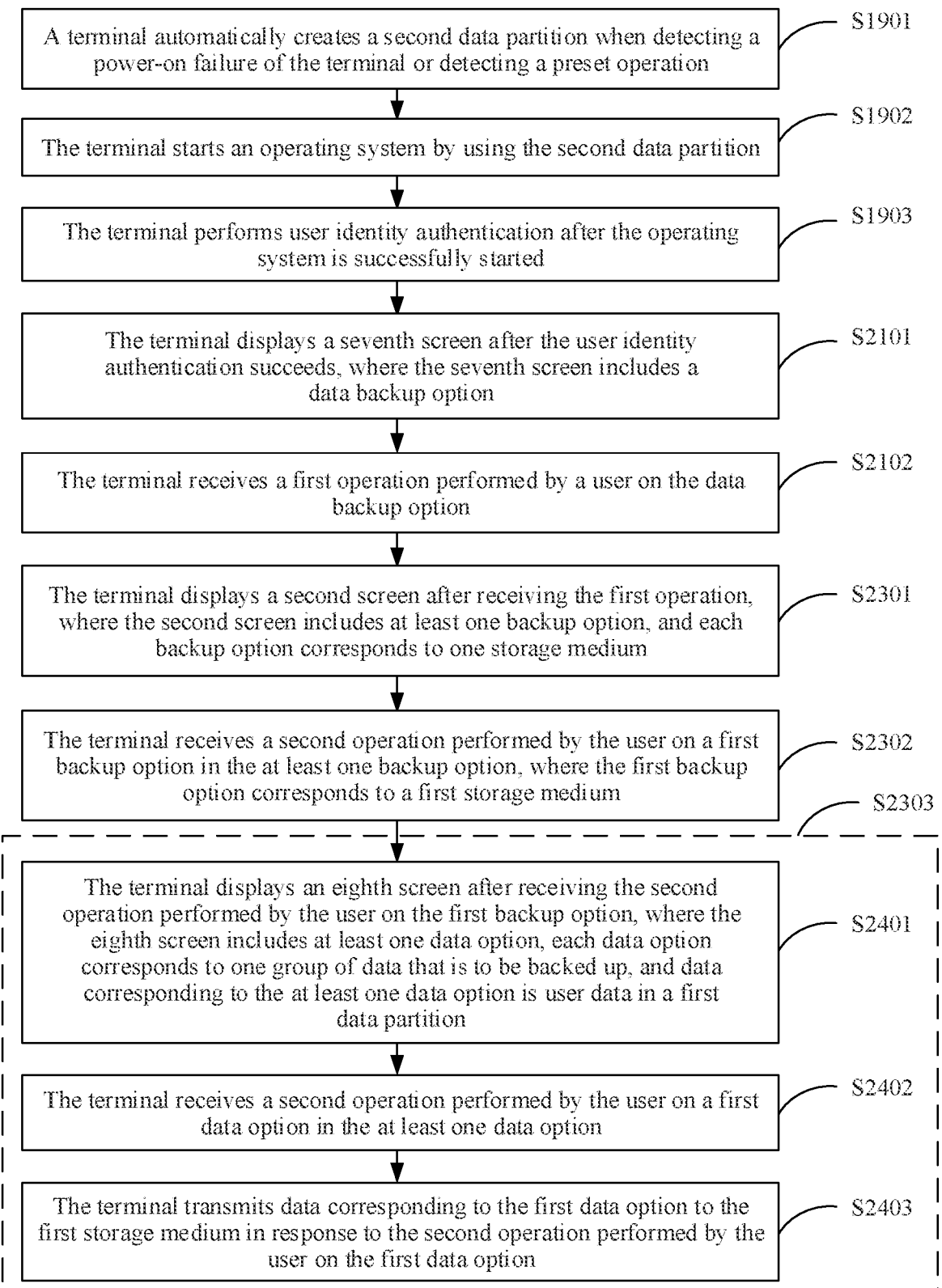
FIG. 24A is a flowchart of another data backup method according to an embodiment of this application.

In the foregoing embodiment, the user data transmitted by the terminal to the first storage medium may be all user data stored in the first data partition. However, in some cases, data that the user needs to back up may be only some user data stored in the first data partition. For example, the user may need to back up only contact information stored in the first data partition. In this case, before the terminal transmits the user data to the first storage medium, the user may select the data that needs to be backed up. As shown in FIG. 24A, S2303 shown in FIG. 23A may include S2401 to S2403.

S2401: The terminal displays an eighth screen after receiving the second operation performed by the user on the first backup option, where the eighth screen includes at least one data option, each data option corresponds to one group of data that is to be backed up, and data corresponding to the at least one data option is the user data in the first data partition.

For example, after receiving the single-tap operation performed by the user on the "external storage card" backup option shown in FIG. 23B(3), or the single-tap operation performed by the user on the "create new backup" option 2305, the mobile phone 100 may display an eighth screen 2401 shown in FIG. 24B(1). The eighth screen 2401 may include one or more data options, for example, one or more of a "contacts" option 2402, a "pictures" option 2403, a "videos" option 2404, and a "messages" option 2405. The "contacts" option 2402 corresponds to the contact information stored in the first data partition. For example, a contact is at least one of information such as a phone number, an email address, and a home address. The "pictures" option 2403 corresponds to picture information stored in the first data partition, for example, a photo. The "videos" option 2404 corresponds to video information stored in the first data partition. The "messages" option 2405 corresponds to a mail, an SMS message, and the like that are stored in the first data partition. Optionally, the eighth screen 2401 may further include a "back up all" option 2406. The "back up all" option 2406 corresponds to all the user data stored in the first data partition.

S2402: The terminal receives a second operation performed by the user on a first data option in the at least one data option.

For example, the mobile phone 100 may receive a selection operation performed by the user on each of the "contacts" option 2402 and the "pictures" option 2403 that are shown in FIG. 24B(1), and receive a single-tap operation performed by the user on a "start backup" button 2407 shown in FIG. 24B(1). The selection operation performed by the user on each of the "contacts" option 2402 and the "pictures" option 2403 that are shown in FIG. 24B(1), and the single-tap operation performed by the user on the "start backup" button 2407 shown in FIG. 24B(1) may be collectively referred to as the second operation performed by the user on the first data option (for example, the "contacts" option 2402 and the "pictures" option 2403).

S2403: The terminal transmits data corresponding to the first data option to the first storage medium in response to the second operation performed by the user on the first data option.

For example, in response to the second operation performed by the user on the first data option (for example, the "contacts" option 2402 and the "pictures" option 2403), the mobile phone 100 may transmit the data corresponding to the first data option to the first storage medium (for example, an external memory). For example, in response to the second operation performed by the user on the first data option (for example, the "contacts" option 2402 and the "pictures" option 2403), the mobile phone 100 may display a fourth screen 2408 shown in FIG. 24B(2). The fourth screen 2408 may not only include first prompt information 2409, but also may include third indication information. The third indication information is used to indicate a type of data that is being backed up. For example, the fourth screen 2408 may further include third indication information 2410 and 2411. The third indication information 2410 may be used to indicate that the data that is being backed up includes the contact information. The third indication information 2411 may be used to indicate that the data that is being backed up includes the picture information.

Figure 24C:
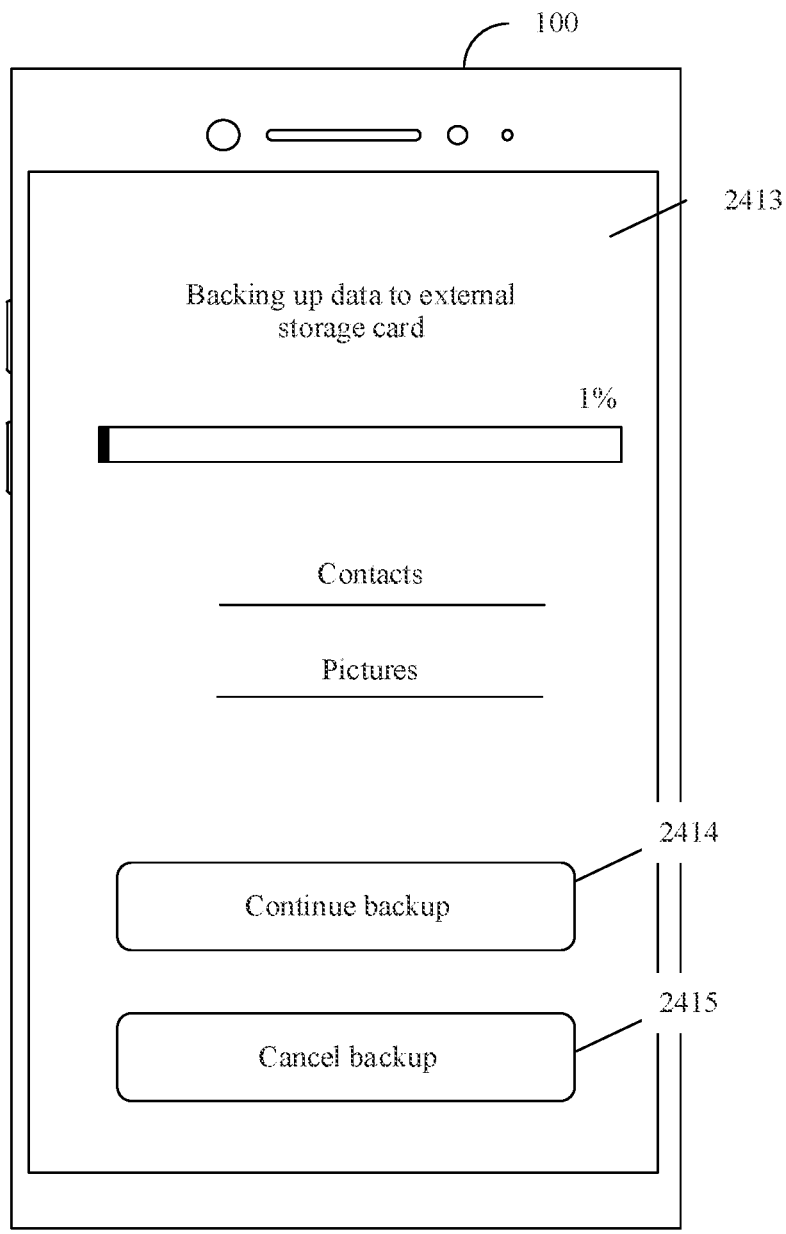
FIG. 24C is a schematic diagram of an example of another terminal screen according to an embodiment of this application.

Optionally, the fourth screen 2408 may further include a "cancel" button 2412. The "cancel" button 2412 is used to trigger the mobile phone 100 to stop data backup. To avoid a case in which the mobile phone 100 stops data backup because the user accidentally touches the "cancel" button 2412, in response to a single-tap operation performed by the user on the "cancel" button 2412 shown in FIG. 24B(2), the mobile phone 100 may display a backup suspension screen 2413 shown in FIG. 24C, to prompt the user to determine whether to stop data backup. The backup suspension screen 2413 includes a "continue backup" option 2414 and a "cancel backup" option 2415. In response to a single-tap operation performed by the user on the "continue backup" option 2414, the mobile phone 100 may continue data backup, and display the fourth screen 2408 shown in FIG. 24B(2). In response to a single-tap operation performed by the user on the "cancel backup" option 2415, the mobile phone 100 may stop data backup, and may be powered off or display the seventh screen 2201 shown in FIG. 23B(1).

In some embodiments, the terminal may display a sixth screen in response to completion of data transmission. For detailed descriptions of "the terminal may display a sixth screen in response to completion of data transmission", refer to the related descriptions in S1006. Details are not described again in this embodiment of this application.

In some embodiments, the seventh screen may further include a factory settings restoration option. For example, as shown in FIG. 22(a), the seventh screen 2201 further includes the "restore factory settings" option 2203. After the mobile phone 100 displays the seventh screen 2201, the user may tap the "restore factory settings" option 2203. In response to a tap operation performed by the user on the "restore factory settings" option 2203 shown in FIG. 22(a), the mobile phone 100 may display a fifth screen 1208 shown in FIG. 12(b). The fifth screen 1208 includes a "start to restore factory settings" option 1109 and a "back" option 1210.

Figure 12B:
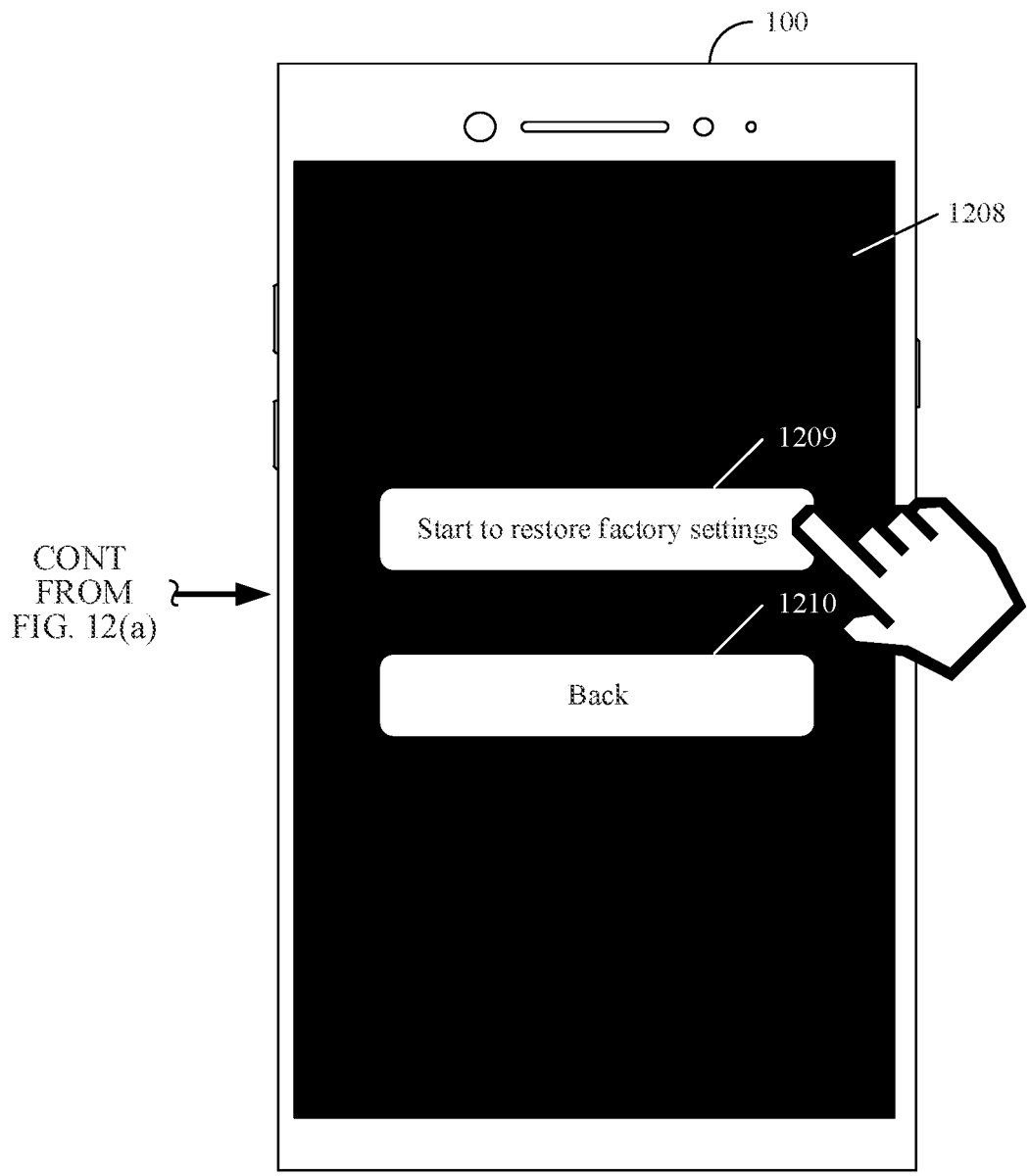
Figure 12C:
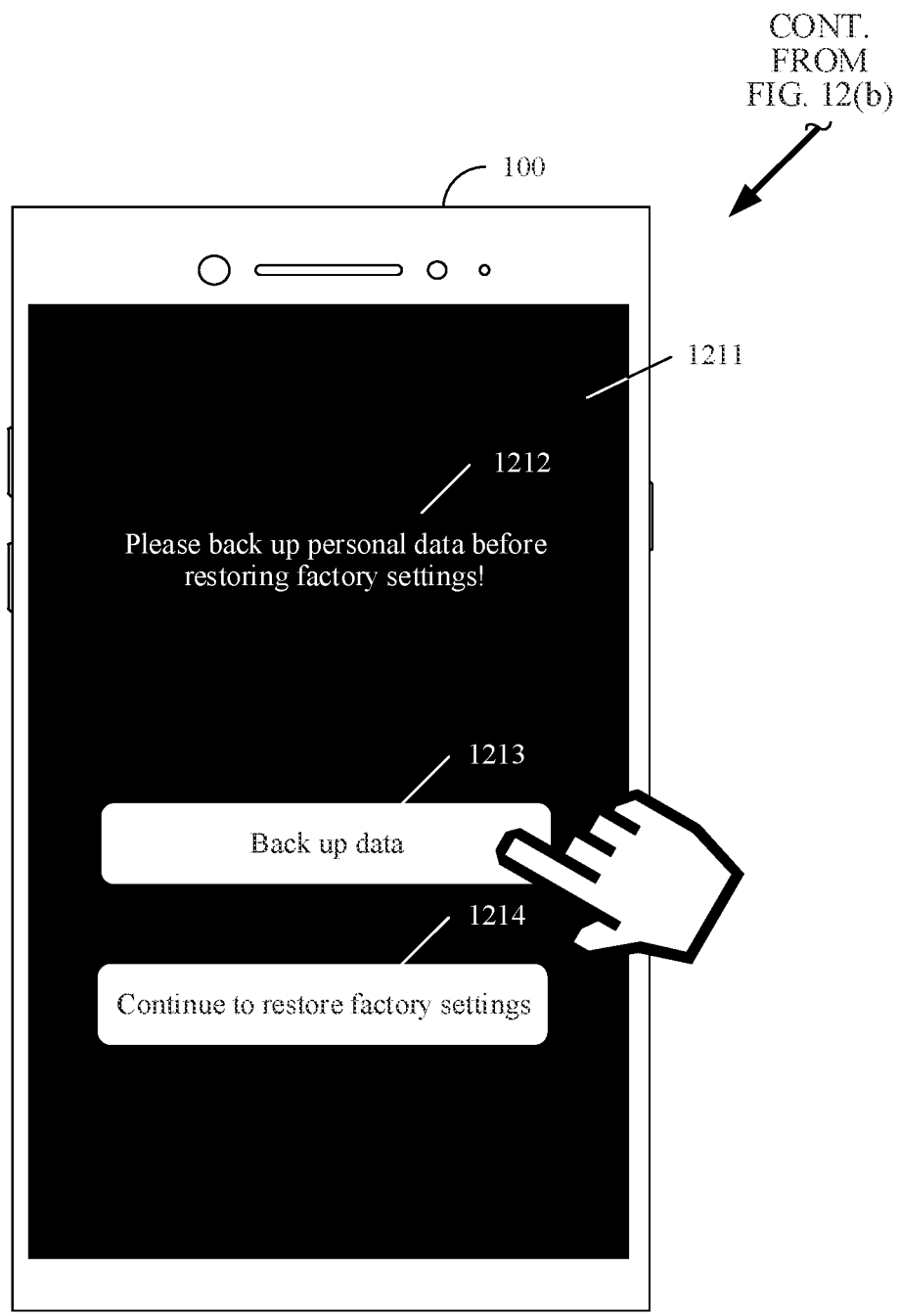
Figure 13:
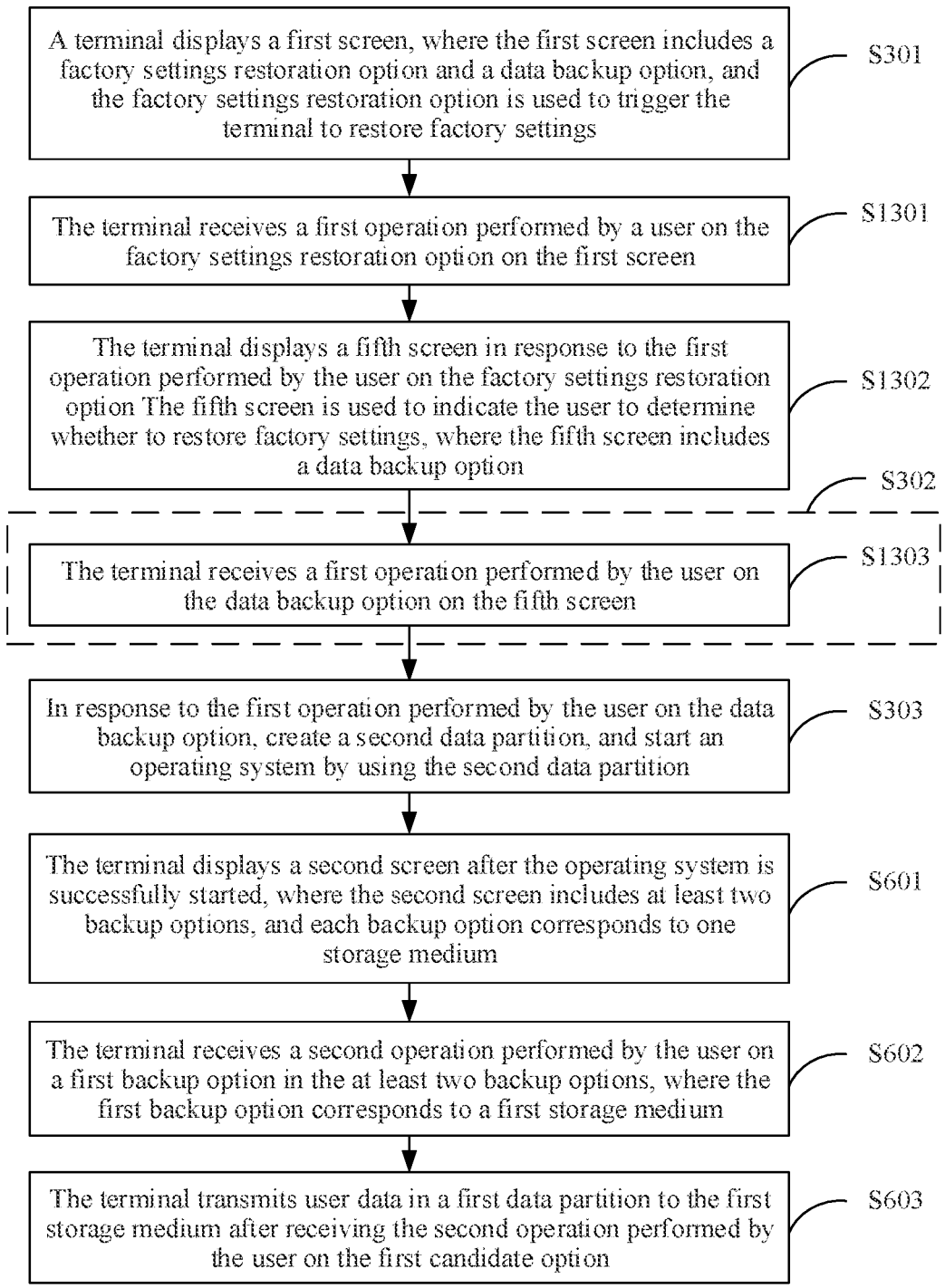
FIG. 13 is a flowchart of another data backup method according to an embodiment of this application.

Usually, the mobile phone 100 may restore the factory settings in response to a tap operation performed by the user on the "start to restore factory settings" option 1209 shown in FIG. 12(b). In this embodiment of this application, to avoid a case in which the user is not aware of a feature that "the user data is lost after the terminal restores the factory settings", the user may be prompted to back up the user data after the user taps the "start to restore factory settings" option 1209 shown in FIG. 12(b). Specifically, after S2101, the method in this embodiment of this application may further include: receiving, by the terminal, a first operation performed by the user on the factory settings restoration option on the seventh screen; and displaying, by the terminal, a fifth screen in response to the first operation performed by the user on the factory settings restoration option on the seventh screen. The fifth screen is used to indicate the user to determine whether to restore factory settings. The fifth screen includes a data backup option. The terminal may receive a first operation performed by the user on the data backup option on the fifth screen, and transmit the user data in the first data partition to the first storage medium. For detailed descriptions of the fifth screen, refer to the related descriptions in S1302. Details are not described again in this embodiment of this application.

According to a fact that the terminal receives the first operation performed by the user on the factory settings restoration option on the seventh screen, it can be learned that the user intends to trigger the terminal to restore the factory settings. In the solution of this embodiment of this application, before the terminal restores the factory settings, the user is prompted to back up the user data. Based on the prompt of the terminal, before triggering the terminal to restore the factory settings, the user chooses to first back up the user data.

Figure 25:
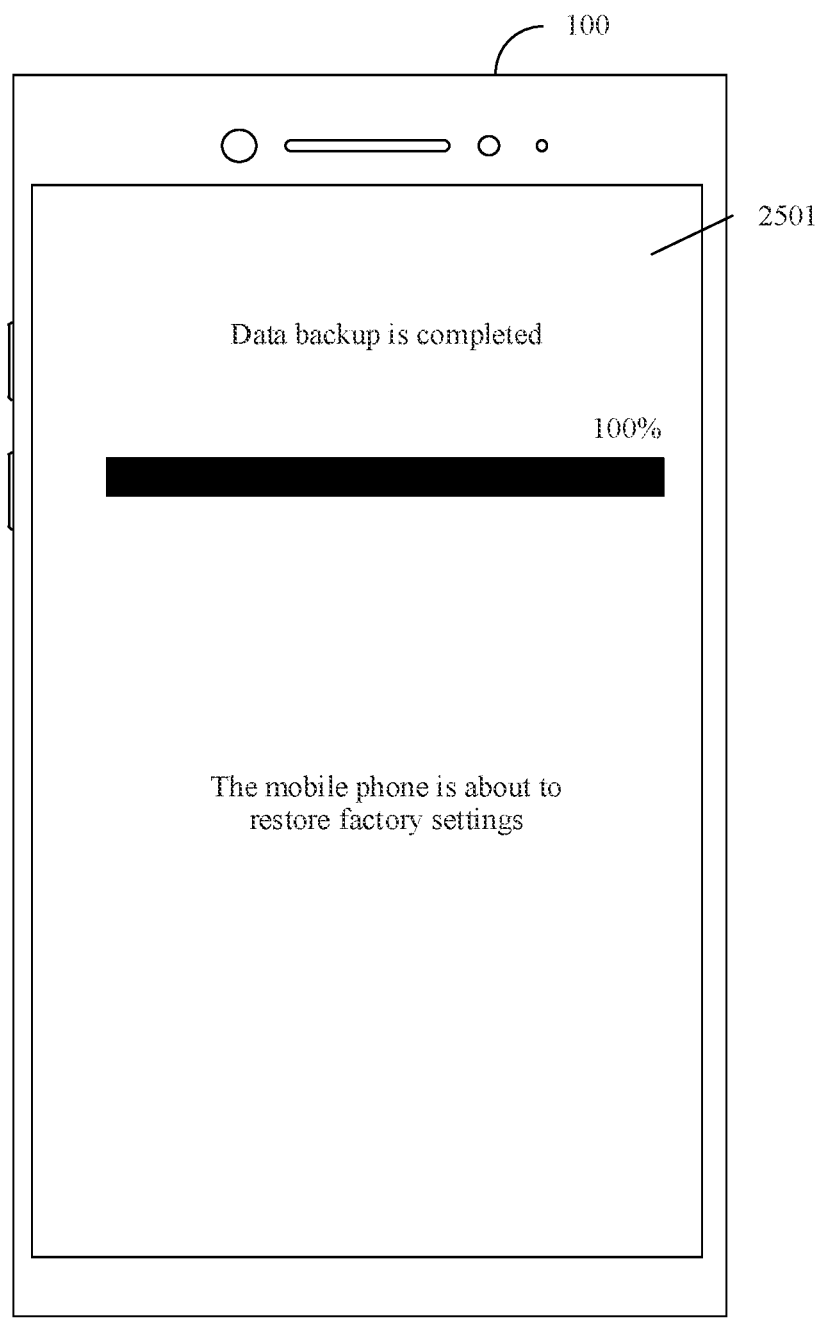
FIG. 25 is a schematic diagram of an example of another terminal screen according to an embodiment of this application.

Based on the foregoing descriptions, in consideration of a requirement of the user for triggering the terminal to restore the factory settings, after the terminal successfully backs up the user data (in other words, the terminal completes transmitting the user data to the first storage medium), the terminal may automatically restore the factory settings. For example, in response to completion of the user data transmission, the mobile phone 100 may display a sixth screen 1401 shown in FIG. 14(a). The sixth screen 1401 includes second indication information 1402. The second indication information 1402 is used to indicate that the user data is successfully backed up. Alternatively, in response to completion of the user data transmission, the mobile phone 100 may display a sixth screen 2501 shown in FIG. 25. The sixth screen 2501 includes second prompt information "Data backup is completed".

Optionally, the sixth screen 2501 may further include prompt information "The mobile phone is about to restore factory settings". After displaying the sixth screen, the terminal may automatically start to restore the factory settings, and display a screen of restoring the factory settings by the terminal. For example, after displaying the sixth screen 2501 in FIG. 25 for a specific period of time (for example, n seconds), the mobile phone 100 may automatically start to restore the factory settings, and display a screen 1404 of restoring the factory settings that is shown in FIG. 14(b).

In some application scenarios, according to a fact that the terminal receives the first operation performed by the user on the factory settings restoration option on the first screen or the seventh screen, it can be learned that the user intends to trigger the terminal to restore the factory settings. However, after the terminal successfully backs up the user data (in other words, after the terminal completes transmitting the user data to the first storage medium), the user may not expect the terminal to automatically restore the factory settings. In this case, after the terminal successfully backs up the user data, the terminal may indicate, on the sixth screen, the user to determine whether to continue to restore the factory settings. If the user chooses to continue to restore the factory settings, the terminal starts to restore the factory settings and displays the screen of restoring the factory settings by the terminal.

Figure 15:
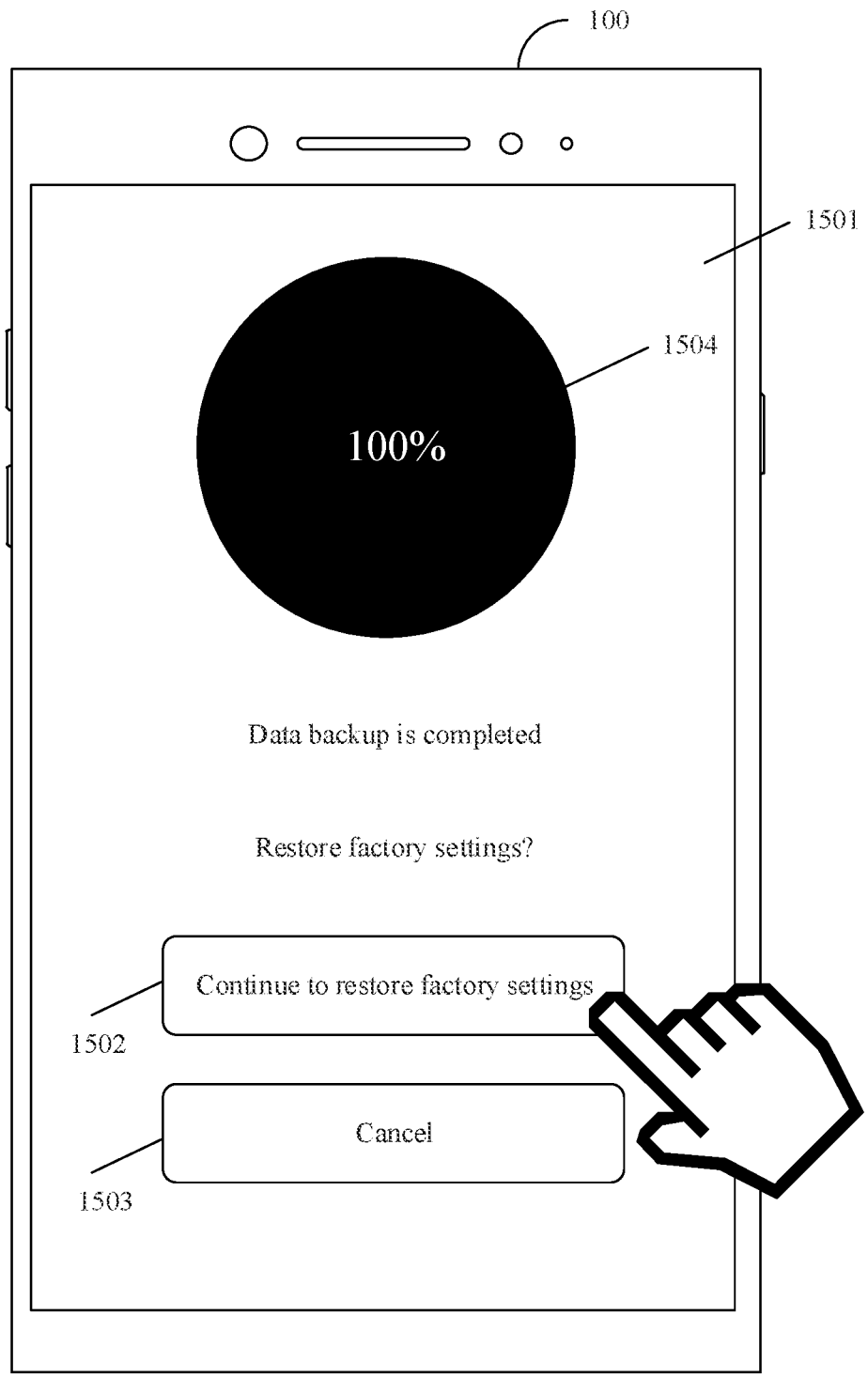
FIG. 15 is a schematic diagram of an example of another terminal screen according to an embodiment of this application.

For example, in response to completion of the user data transmission, the mobile phone 100 may display a sixth screen 1501 shown in FIG. 15. The sixth screen 1501 includes second indication information 1504. The second indication information 1504 is used to indicate that the user data is successfully backed up. The sixth screen 1501 may further include a "continue to restore factory settings" option 1502 and a "cancel" option 1503. In response to a tap operation performed by the user on the "continue to restore factory settings" option 1502, the mobile phone 100 may start to restore the factory settings and display the screen 1404 of restoring the factory settings that is shown in FIG. 14(b).

Correspondingly, after the terminal displays the first screen, the user may further tap another option on the first screen. For example, the user may tap any one of a "download the latest version and restore" option 1203, a "restart" option 1205, a "power off" option 1206, and a "clear buffer" option 1207 shown in FIG. 12(a). After the terminal displays the seventh screen, the user may further tap another option on the seventh screen. For example, the user may tap any one of the "restore factory settings" option 2203, the "restart" option 2204, and the "power off" option 2205 shown in FIG. 22(a). If the terminal performs a corresponding event in response to a tap operation performed by the user on an option other than the "back up data" option on the first screen or the seventh screen, a user data loss may be caused. To back up the user data before the user data is lost, in this embodiment of this application, in response to the tap operation performed by the user on the another option, the terminal may prompt the user to back up the user data. For a method in which the terminal prompts, in response to the tap operation performed by the user on the another option, the user to back up the user data, refer to the method in which the terminal prompts, in response to the tap operation performed by the user on the "restore factory settings" option, the user to back up the user data in this embodiment of this application.

For example, it is assumed that the user taps the "download the latest version and restore" option 1203 shown in FIG. 12(a). In response to the tap operation performed by the user on the "download the latest version and restore" option 1203 shown in FIG. 12(a), the mobile phone 100 may prompt the user to back up the user data. In consideration of a requirement of the user for triggering the terminal to download system software of the latest version and restore the factory settings, after the terminal successfully backs up the user data, the terminal may automatically download the system software of the latest version and restore the factory settings.

Recovery subsystems may be configured on some terminals before delivery. The recovery subsystem may be configured to: detect a fault or an error, automatically correct the fault or the error (this is referred to as self-healing for short), restart an operating system, uninstall a third-party application, restore factory settings, download a system of a latest version and restore factory settings, and the like.

Figure 16:
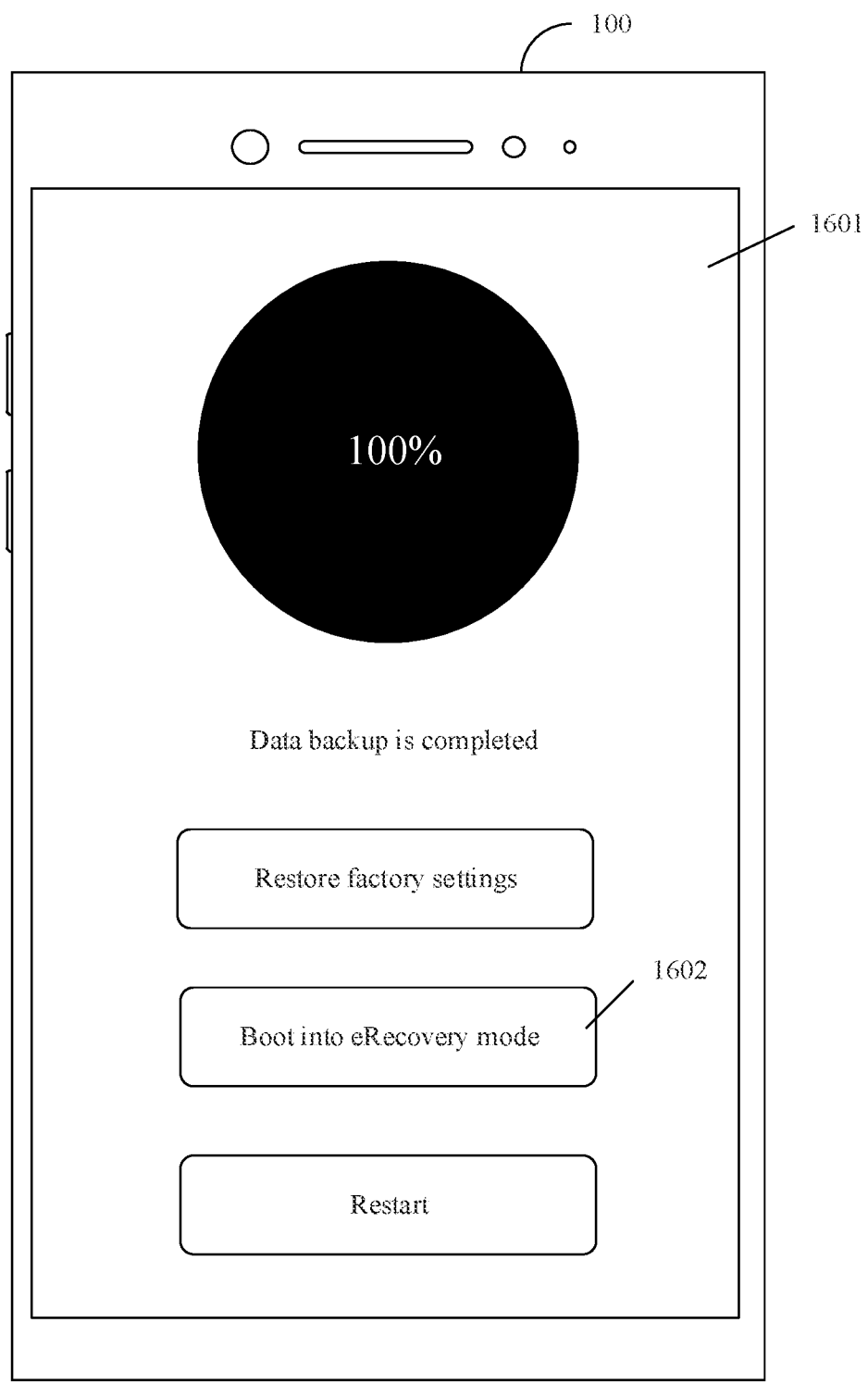
FIG. 16 is a schematic diagram of an example of another terminal screen according to an embodiment of this application.

The recovery subsystem in the terminal may detect a fault of the first data partition. When the recovery subsystem detects the fault of the first data partition but cannot correct the fault of the first data partition, the recovery subsystem may control the terminal to display the first screen, or may control the terminal to create the second data partition and display the seventh screen after the operating system is started by using the second data partition. The first screen or the seventh screen may include an identifier of the recovery subsystem. Correspondingly, after the terminal displays the first screen or the seventh screen, and successfully backs up the user data based on the operation of the user, the sixth screen displayed by the terminal may further include a recovery option of the recovery subsystem. The recovery option is used to trigger the terminal to correct the fault of the first data partition by using the recovery subsystem. For example, it is assumed that a recovery subsystem "eRecovery" of Huawei is configured on the mobile phone 100. As shown in FIG. 16, a sixth screen 1601 includes an eRecovery mode option "boot into eRecovery mode" 1602. In this way, the user may be provided with a plurality of methods for correcting the fault of the terminal.

Figure 26:
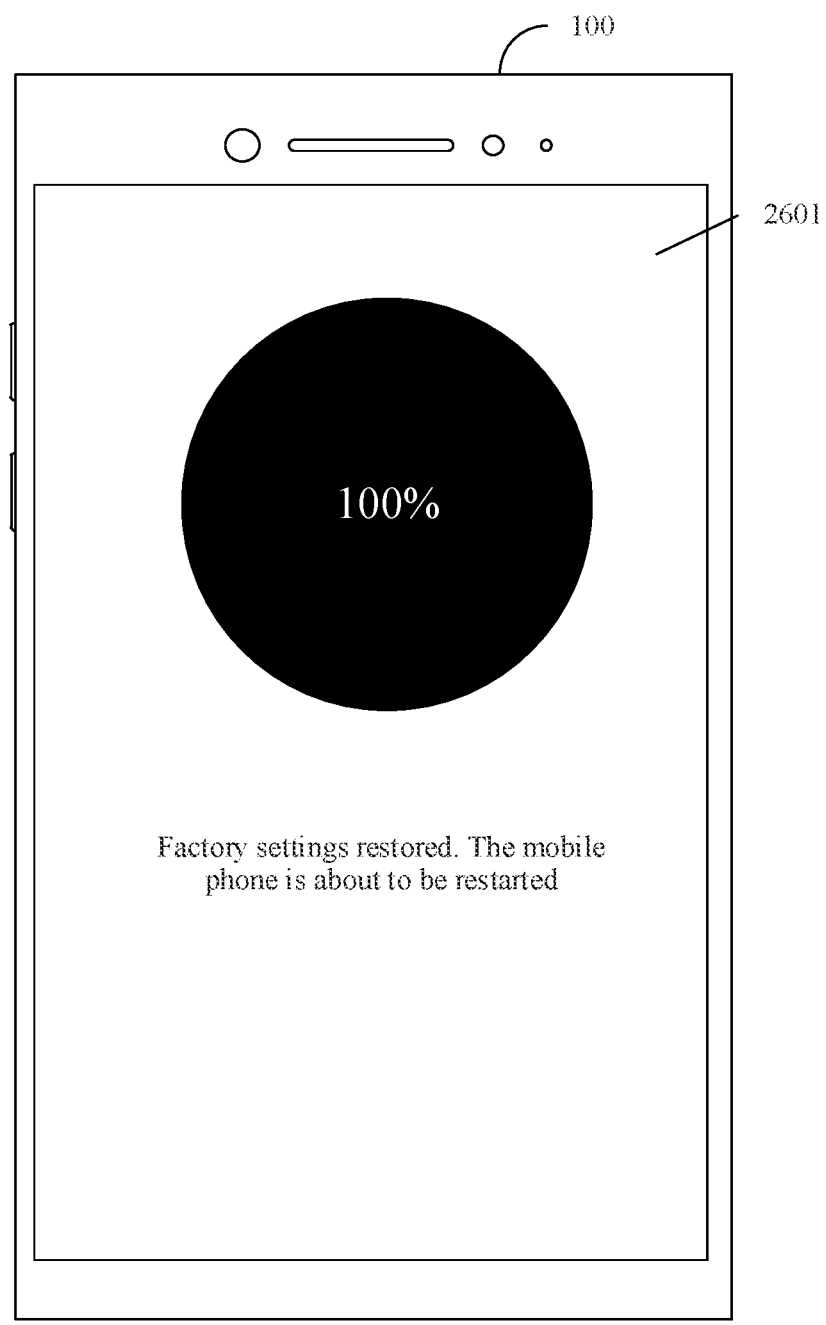
FIG. 26 is a schematic diagram of an example of another terminal screen according to an embodiment of this application.

In some embodiments, the terminal may be automatically restarted after completing restoring the factory settings. For example, after the mobile phone 100 completes restoring the factory settings, the mobile phone 100 may display a factory settings restoration completion screen 2601 shown in FIG. 26. After the mobile phone 100 displays the factory settings restoration completion screen 2601 for a period of time (for example, 3 seconds), the mobile phone 100 may be automatically restarted.

Figure 27A:
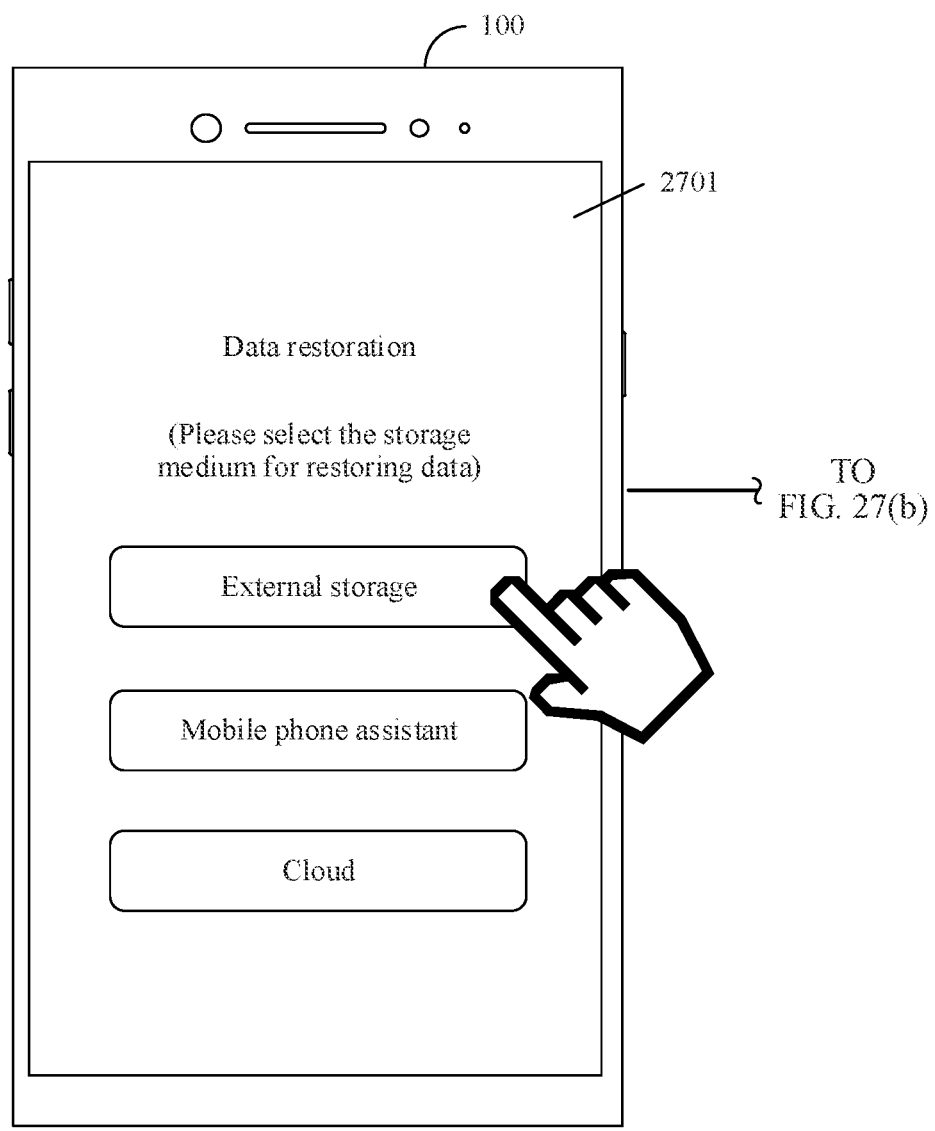
FIG. 27(*a*) to FIG. 27(*c*) are a schematic diagram of an example of another terminal screen according to an embodiment of this application.

After the terminal restores the factory settings and is restarted, the user data backed up in the first storage medium may be restored to the terminal in response to a user operation. For example, the mobile phone 100 may receive an enable operation (for example, a single-tap operation) performed by the user on an icon of a "backup" application or on a backup function item in a "settings" application in the mobile phone 100, and display a data restoration screen 2701 shown in FIG. 27(a). The data restoration screen 2701 includes an "external storage" backup option, a "mobile phone assistant" backup option, and a "cloud" backup option. For detailed descriptions of the "external storage" backup option, the "mobile phone assistant" backup option, and the "cloud" backup option, refer to the descriptions of FIG. 23B(2) in the foregoing embodiments. Details are not described again in this embodiment of this application.

The mobile phone 100 may be connected to one or more external memories. For example, in response to a tap operation (for example, a single-tap operation) performed by the user on the "external storage" backup option shown in FIG. 27(a), the mobile phone 100 may display an external storage screen 2702 shown in FIG. 27(b). The external storage screen 2702 includes an "external storage card" backup option and a "USB storage" backup option. In response to a tap operation (for example, a single-tap operation) performed by the user on the "external storage card" backup option shown in FIG. 27(b), the mobile phone 100 may display a backup record screen 2703 shown in FIG. 27(c). The backup record screen 2703 includes record items corresponding to a plurality of data backup records, for example, a backup record item 2704, a backup record item 2705, and a backup record item 2706.

The backup record item 2704 corresponds to a backup record of backing up data from the mobile phone 100 to the external storage card at 17:28 on Nov. 2, 2018. The backup record item 2705 corresponds to a backup record of backing up data from a mobile phone 200 to the external storage card at 12:12 on Oct. 7, 2018. The backup record item 2706 corresponds to a backup record of backing up data from the mobile phone 100 to the external storage card at 09:28 on Oct. 1, 2018. Each time the terminal backs up data to a storage medium (for example, the external storage card), the terminal may generate a backup record. The backup record may include a data backup time and an identifier of a device that performs data backup, for example, a media access control (media access control address, MAC) address of the mobile phone 100. The backup record may be stored in the storage medium used for data backup. The backup record may be stored together with the corresponding backed-up data.

Figure 27C:
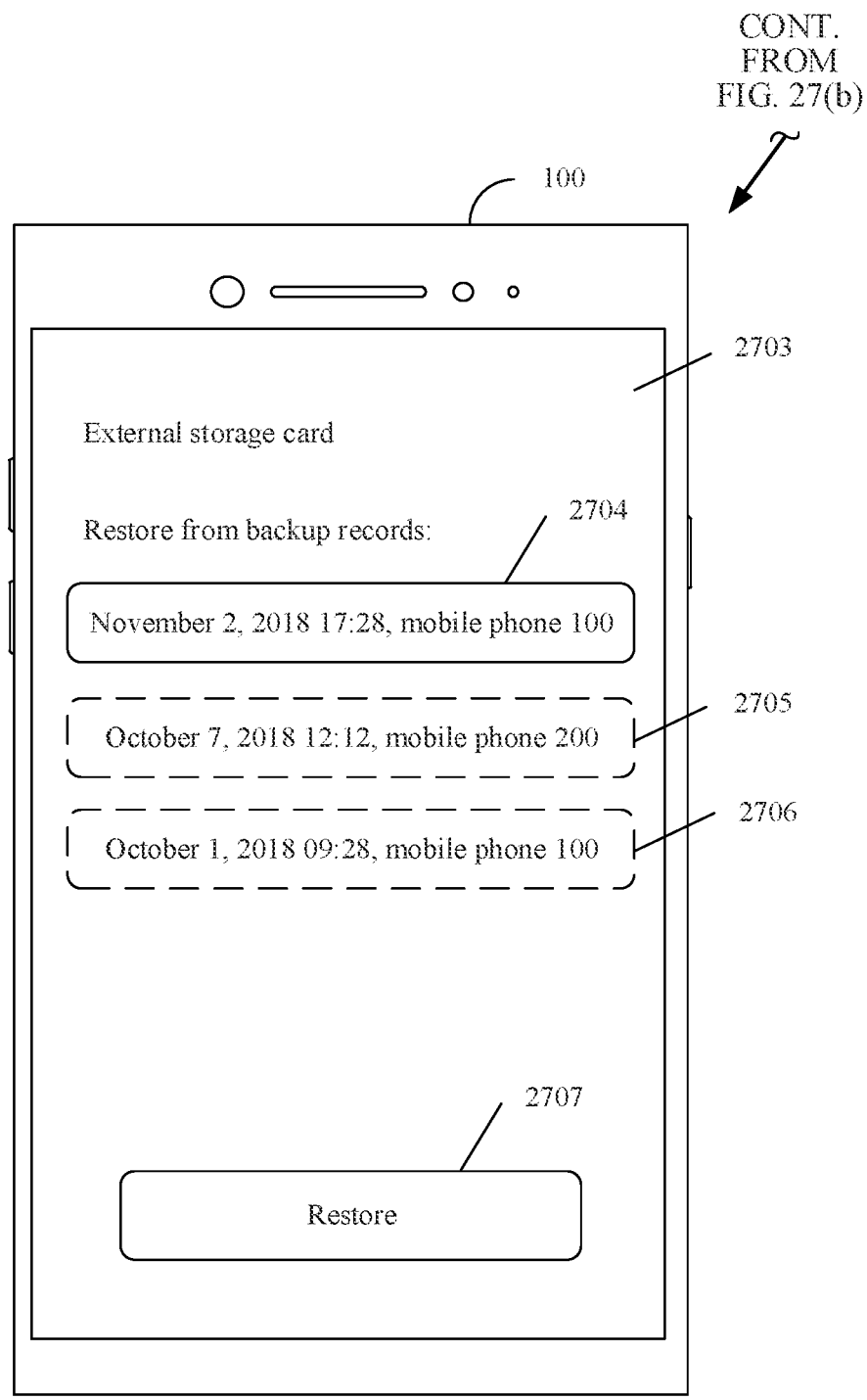
Figure 28A:
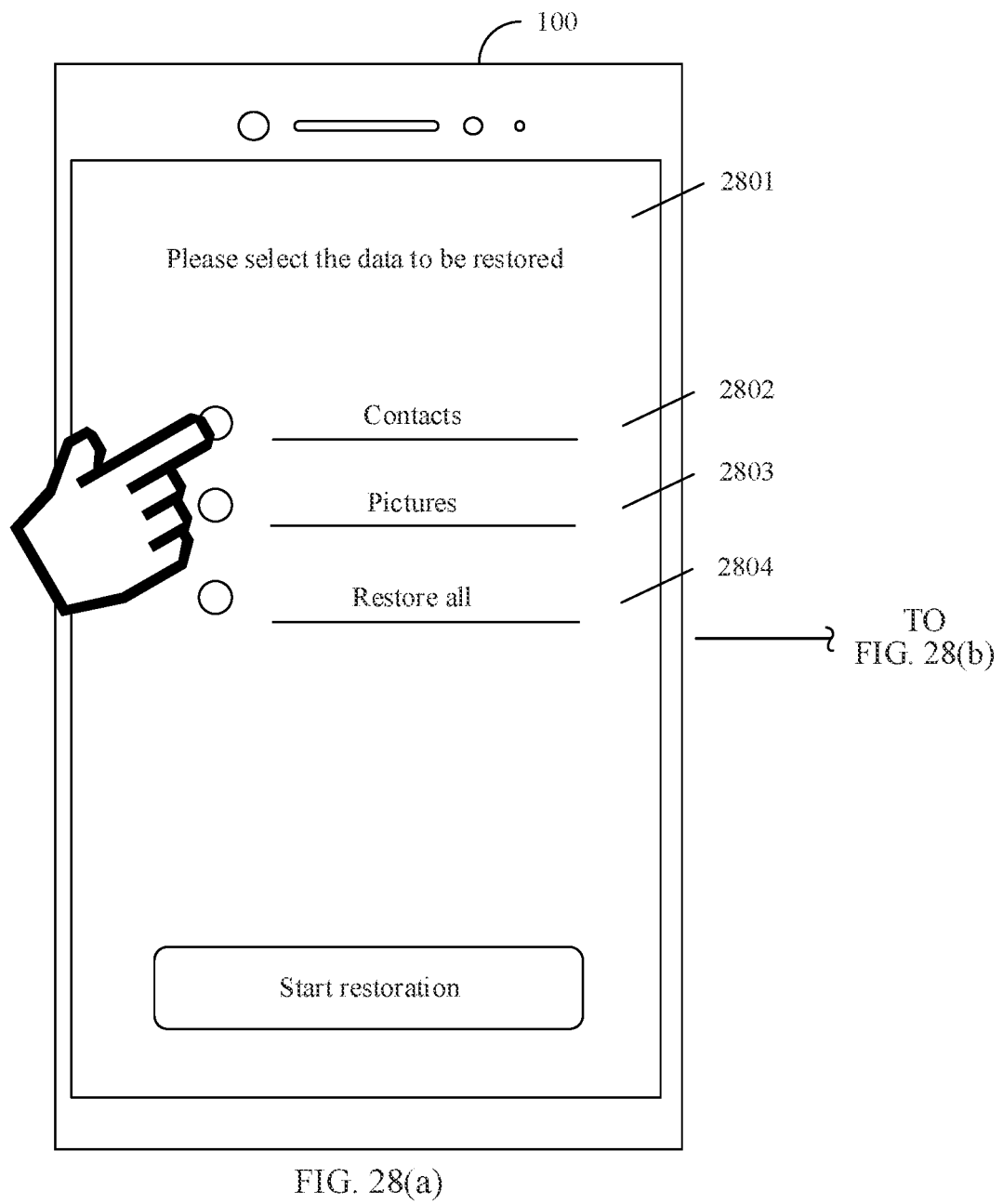
FIG. 28(*a*) to FIG. 28(*c*) are a schematic diagram of an example of another terminal screen according to an embodiment of this application.

For example, the mobile phone 100 may receive a selection operation (for example, a single-tap operation) performed by the user on the backup record item 2704, receive a tap operation (for example, a single-tap operation) performed by the user on a "restore" button 2707 shown in FIG. 27(c), and display a data selection screen 2801 shown in FIG. 28(a). The data selection screen 2801 includes one or more data options, and each of the one or more data options corresponds to one group of backed-up data corresponding to the backup record item 2704. With reference to the foregoing example, an example in which data corresponding to the backup record item 2704 includes contact information and picture information is used. As shown in FIG. 28(a), the data selection screen 2801 may include a "contacts" option 2802 corresponding to the contact information and a "pictures" option 2803 corresponding to the picture information. Optionally, the data selection screen 2801 may further include a "back up all" option 2804. The "back up all" option 2804 is used to trigger the mobile phone 100 to restore all the backed-up data corresponding to the backup record item 2704 to the mobile phone 100.

Figure 28C:
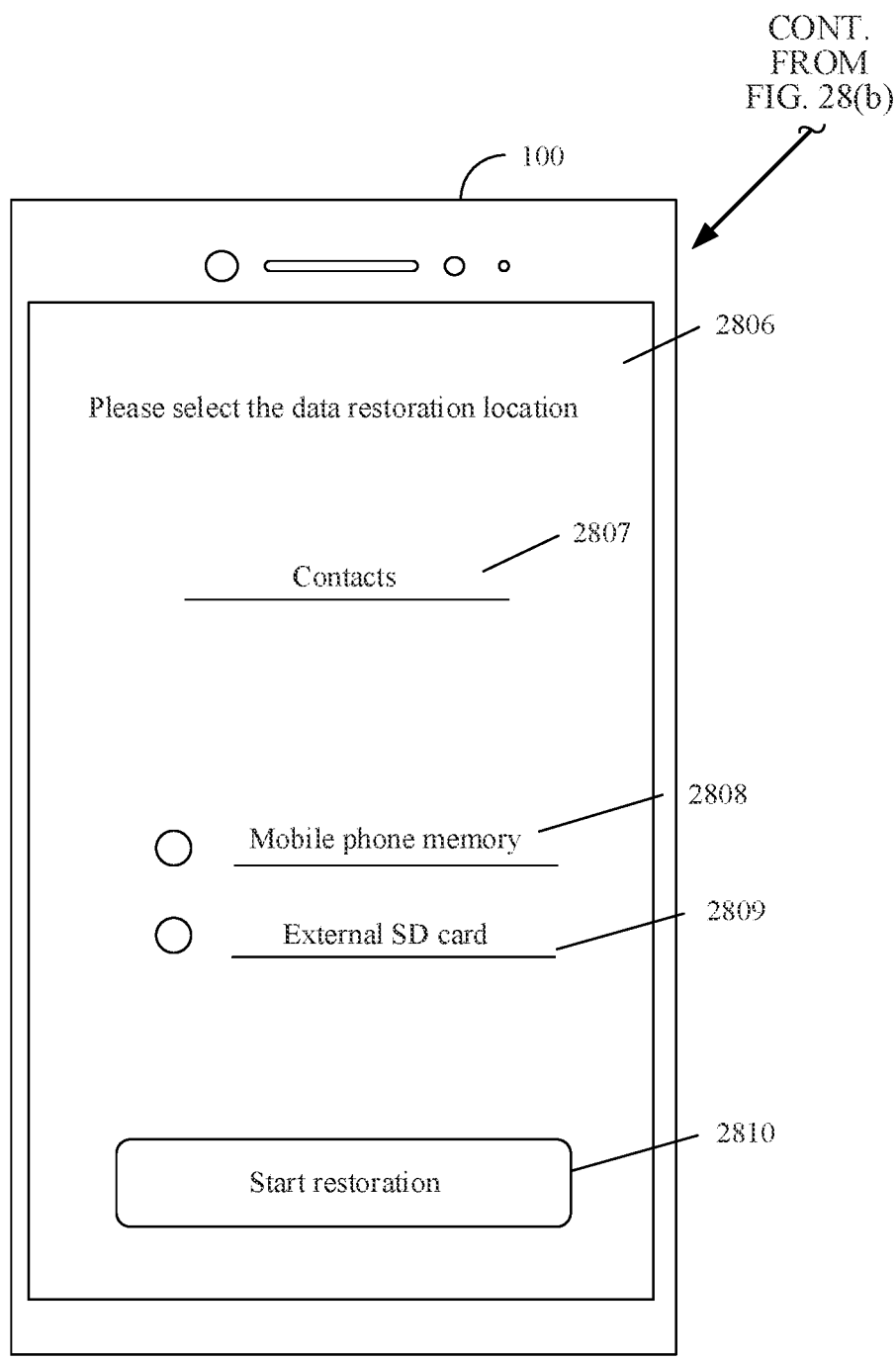

For example, the mobile phone 100 may receive a selection operation performed by the user on the "contacts" option 2802, and display a data selection screen shown in FIG. 28(b). The mobile phone 100 may receive a tap operation performed by the user on a "start restoration" button 2805 on the data selection screen shown in FIG. 28(b), and display a storage selection screen 2806 shown in FIG. 28(c). The storage selection screen 2806 is used to select a storage medium for storing to-be-restored data (such as the contact information). The storage selection screen 2806 may include a "mobile phone memory" storage option 2808 and an "external SD card" storage option 2809. The "mobile phone memory" storage option 2808 is used to trigger the mobile phone 100 to store the to-be-restored data (such as the contact information) in memory of the mobile phone 100. The "external SD card" storage option 2809 is used to trigger the mobile phone 100 to store the to-be-restored data (such as the contact information) in an external SD card of the mobile phone 100. Optionally, the storage selection screen 2806 may further include prompt information 2807. The prompt information 2807 is used to indicate the to-be-restored data. For example, the to-be-restored data includes the contact information.

For example, the mobile phone 100 may receive a tap operation performed by the user on the "external SD card" storage option 2809, receive a tap operation performed by the user on a "start restoration" button 2810, and store the to-be-restored data (such as the contact information) in the memory of the mobile phone 100. In other words, the mobile phone 100 can restore the contact information.

It may be understood that to implement the foregoing functions, the terminal or the like includes corresponding hardware structures and/or software modules for performing the functions. A person skilled in the art should easily be aware that, in combination with the examples described in the embodiments disclosed in this specification, units and algorithm steps can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. In actual implementation, there may be another division manner.

Figure 17:
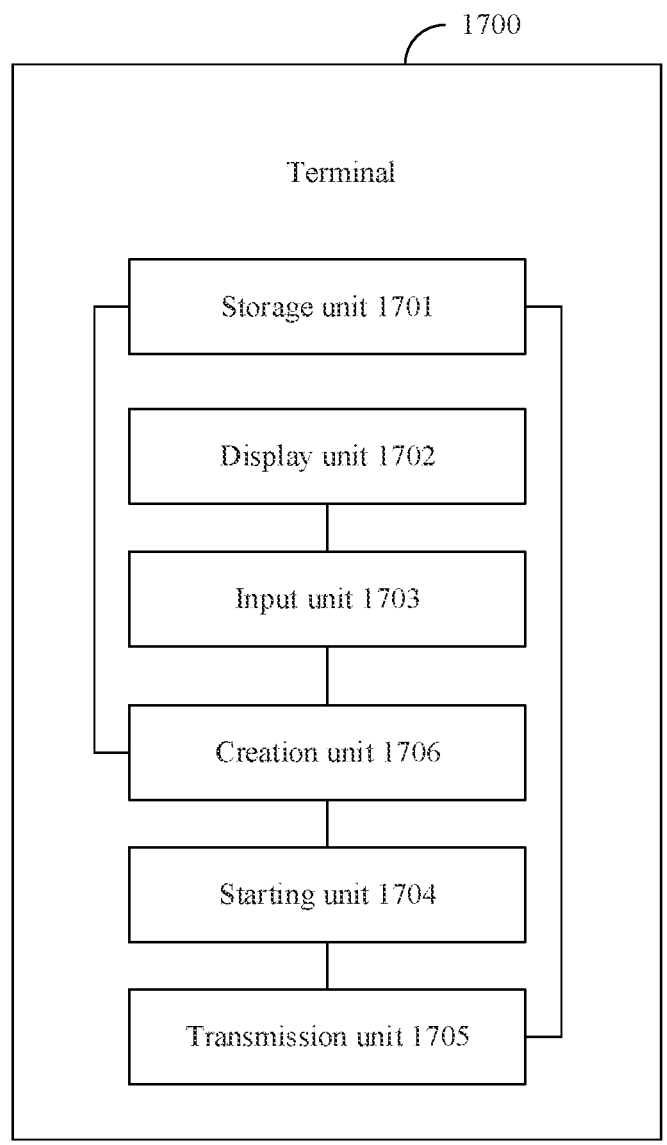
FIG. 17 is a schematic diagram of structural composition of a terminal according to an embodiment of this application.
Figure 29:
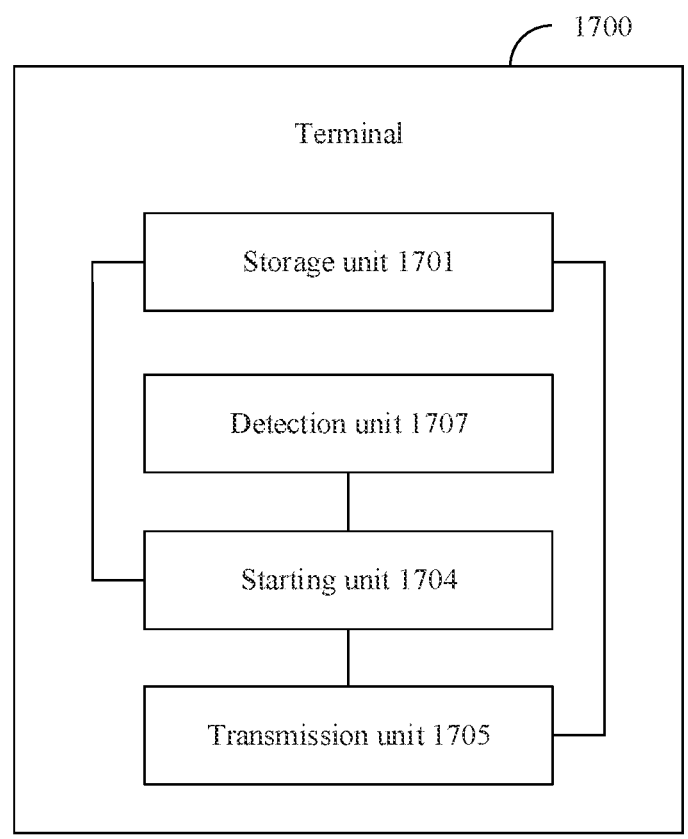
FIG. 29 is a schematic diagram of structural composition of another terminal according to an embodiment of this application.

When each function module is obtained through division based on each corresponding function, FIG. 17 is a possible schematic structural diagram of the terminal in the foregoing embodiments. The terminal 1700 includes a storage unit 1701, a display unit 1702, an input unit 1703, a starting unit 1704, a transmission unit 1705, and a creation unit 1706. FIG. 29 is a possible schematic structural diagram of the terminal in the foregoing embodiments. The terminal 1700 includes a storage unit 1701, a detection unit 1707, a starting unit 1704, and a transmission unit 1705.

The storage unit 1701 includes a first data partition. The first data partition supports to start an operating system when the terminal is powered on. A second data partition is also included in the storage unit 1701. The second data partition is a virtual data partition.

The display unit 1702 is configured to support the terminal 1700 in performing S301, S601, S604, S801, S803, S901, S904, S1006, S1302, S2101, S2301, and S2401 in the foregoing method embodiments, and/or another process in the technology described in this specification. The input unit 1703 is configured to support the terminal 1700 in performing S302, S602, the operation of "receiving first identity information entered by the user on the third screen" in each of S802 and S902, S1301, S1303, S2102, S2302, and S2402 in the foregoing method embodiments, and/or another process in the technology described in this specification. The creation unit 1706 is configured to support the terminal 1700 in performing the operation of "creating a second data partition" in each of S303 and S1901 in the foregoing method embodiments, and/or another process in the technology described in this specification. The starting unit 1704 is configured to support the terminal 1700 in performing the operation of "starting the operating system by using the second data partition" in S303 and S1902 in the foregoing method embodiments, and/or another process in the technology described in this specification. The transmission unit 1705 is configured to support the terminal 1700 in performing S304, S603, S903, S1904, S2103, S2303, and S2403 in the foregoing method embodiments, and/or another process in the technology described in this specification.

Further, the terminal 1700 may include an authentication unit. The authentication unit is configured to support the terminal 1700 in performing the operation of "performing user identity authentication on the first identity information based on decryption data stored in the first data partition" in each of S802 and S902, and S1903 in the foregoing method embodiments, and/or another process in the technology described in this specification.

Further, the terminal 1700 may include a restoration unit. The authentication unit is configured to: in response to completion of user data transmission, restore factory settings, and/or perform another process in the technology described in this specification.

The terminal 1700 may further include a detection unit. The detection unit 1707 is configured to detect a power-on failure of the terminal. For example, the detection unit 1707 is configured to support the terminal 2900 in performing the operation of "detecting a power-on failure of the terminal or detecting a preset operation" in S1901 in the foregoing method embodiments, and/or another process in the technology described in this specification.

Further, the terminal 1700 shown in FIG. 29 further includes a display unit 1702, a creation unit 1706, and an input unit 1703. Certainly, the terminal 1700 may alternatively include no creation unit 1706, or the creation unit 1706 is configured to pre-create the second data partition. In this case, the second data partition is pre-created.

All related content of the steps in the foregoing method embodiments may be cited in function descriptions of corresponding function modules. Details are not described herein again.

Certainly, the terminal 1700 includes but is not limited to the units and modules listed above, and functions that can be specifically implemented by the foregoing function units also include but are not limited to functions corresponding to the method steps described in the foregoing embodiments. For detailed descriptions of other units of the terminal 1700, refer to the detailed descriptions of the method steps corresponding to the units, details are not described again in this embodiment of this application.

Figure 18:
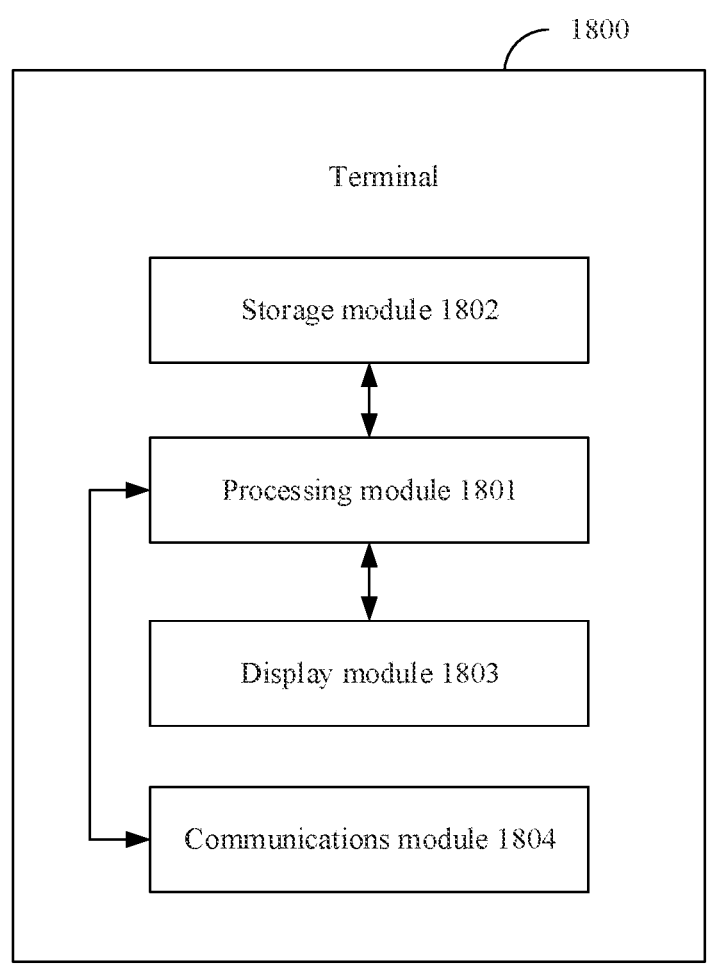
FIG. 18 is a schematic diagram of structural composition of another terminal according to an embodiment of this application.

When an integrated unit is used, FIG. 18 is a possible schematic structural diagram of the terminal in the foregoing embodiments. The terminal 1800 includes a processing module 1801, a storage module 1802, a display module 1803, and a communications module 1804. The storage module 1802 includes a first data partition, and the first data partition supports to start an operating system when the terminal 1800 is powered on. The foregoing second data partition is also included in the storage module 1802. The second data partition is a virtual data partition. The processing module 1801 is configured to control and manage an action of the terminal 1800. The display module 1803 is configured to display an image generated by the processing module 1801. The storage module 1802 is configured to store program code and data of the terminal. The communications module 1804 is configured to support the terminal in communicating with another network entity. For detailed descriptions of the units included in the terminal 1800, refer to the descriptions in the foregoing method embodiments. Details are not described herein again.

The processing module 1801 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1801 may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 1804 may be a transceiver, a transceiver circuit, a communications interface, or the like. The storage module 1802 may be a memory.

When the processing module 1801 is a processor (such as the processor 210 shown in FIG. 2), the communications module 1804 includes a Wi-Fi module and a Bluetooth module (such as the communications module 260 shown in FIG. 2). The communications module such as the Wi-Fi module and the Bluetooth module may be collectively referred to as a communications interface. The storage module 1802 is the memory (such as the internal memory 221 shown in FIG. 2 and an external SD card connected to the terminal 180 through the external memory interface 220). When the display module 1803 is a touchscreen (including the display 294 shown in FIG. 2), the terminal provided in this embodiment of this application may be the terminal 200 shown in FIG. 2. The processor, the communications interface, the touchscreen, and the memory may be coupled together by using a bus.

An embodiment of this application further provides a computer storage medium. The computer storage medium stores computer program code. When the foregoing processor executes the computer program code, the terminal performs related method steps in any one of FIG. 3, FIG. 6, FIG. 8, FIG. 9, FIG. 13, FIG. 19B, FIG. 21, FIG. 23A, or FIG. 24A, to implement the data backup method in the foregoing embodiments.

An embodiment of this application further provides a computer program product. When the computer program product is run on a computer, the computer is enabled to perform related method steps in any one of FIG. 3, FIG. 6, FIG. 8, FIG. 9, FIG. 13, FIG. 19B, FIG. 21, FIG. 23A, or FIG. 24A, to implement the data backup method in the foregoing embodiments.

The terminal 1700, the terminal 1800, the computer storage medium, and the computer program product provided in the embodiments of this application are all configured to perform corresponding methods provided above. Therefore, for beneficial effects that can be achieved by the terminal 1700, the terminal 1800, the computer storage medium, and the computer program product, refer to the beneficial effects of the corresponding methods provided above. Details are not described herein again.

The foregoing descriptions about implementations allow a person skilled in the art to clearly understand that, for the purpose of convenient and brief description, division into the foregoing function modules is merely taken as an example for illustration. In actual application, the foregoing functions may be allocated to different function modules for implementation according to a requirement. To be specific, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the division into the modules or units is merely logical function division. There may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on a plurality of different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method, comprising:
    detecting a power-on failure of a terminal or a preset operation from a user;
    displaying, in response to detecting the power-on failure or the preset operation, a first screen comprising a data backup option;
    receiving a first operation from the user on the data backup option;
    creating, in response to the first operation, a second data partition, wherein the second data partition is a virtual data partition, and wherein the second data partition comprises no historical data for running an operating system;
    starting, after detecting the power-on failure or the preset operation, the operating system of the terminal using the second data partition;
    connecting to a storage medium located outside the terminal; and
    transmitting, after starting the operating system, user data from a first data partition to the storage medium.

2. The method of claim 1, wherein before transmitting the user data, the method further comprises performing user identity authentication after the operating system successfully starts, and wherein transmitting the user data comprises transmitting the user data to the storage medium after the user identity authentication succeeds.

3. The method of claim 2, further comprising:
    displaying a second screen, wherein the second screen performs the user identity authentication;
    receiving first identity information from the user on the second screen; and
    performing the user identity authentication on the first identity information based on decryption data from the first data partition.

4. The method of claim 2, wherein before transmitting the user data, the method further comprises:
    displaying a second screen after the user identity authentication succeeds, wherein the second screen comprises a second data backup option;
    receiving a second operation from the user on the second data backup option; and
    transmitting the user data to the storage medium after receiving the second operation.

5. The method of claim 4, further comprising:
    displaying a third screen after receiving the second operation, wherein the third screen comprises at least one backup option, and wherein each of the at least one backup option corresponds to one storage medium;
    receiving a fourth operation from the user on a first backup option of the at least one backup option, wherein the first backup option corresponds to the storage medium; and
    transmitting the user data to the storage medium after receiving the fourth operation.

6. The method of claim 5, further comprising:
    displaying a fourth screen in response to the fourth operation, wherein the fourth screen comprises at least one data option, wherein each of the at least one data option corresponds to one group of data to back up, and wherein data corresponding to the at least one data option is the user data;
    receiving the fourth operation from the user on a first data option of the at least one data option; and transmitting data corresponding to the first data option to the storage medium in response to the fourth operation.

7. The method of claim 4, wherein the second screen further comprises a factory settings restoration option, and wherein after displaying the second screen, the method further comprises:
receiving the second operation on the factory settings restoration option;
displaying a third screen in response to the second operation on the factory settings restoration option, wherein the third screen indicates to the user whether to restore factory settings, and wherein the third screen comprises the data backup option; and
receiving the second operation on the data backup option on the third screen.

8. The method of claim 1, further comprising displaying a second screen while the terminal transmits the user data from the first data partition to the storage medium, wherein the second screen comprises first indication information, and wherein the first indication information indicates progress of transmitting the user data to the storage medium.

9. The method of claim 1, wherein after transmitting the user data, the method further comprises displaying a second screen in response to completely transmitting the user data, wherein the second screen comprises second indication information, and wherein the second indication information indicates that the user data is successfully backed up.

10. The method of claim 9, wherein the second screen further comprises a factory settings restoration option, and wherein the factory settings restoration option triggers the terminal to restore factory settings.

11. The method of claim 9, wherein after transmitting the user data, the method further comprises restoring factory settings in response to completely transmitting the user data.

12. An apparatus, comprising:
one or more processors; and
a memory coupled to the one or more processors and configured to store instructions that, when executed by the one or more processors, cause the apparatus to be configured to:
detect a power-on failure of the apparatus or a preset operation from a user;
display, in response to detecting the power-on failure or the preset operation, a first screen comprising a data backup option;
receive a first operation from the user on the data backup option;
create, in response to the first operation, a second data partition, wherein the second data partition is a virtual data partition, and wherein the second data partition comprises no historical data for running an operating system;
start, after detecting the power-on failure or the preset operation, the operating system of the apparatus using the second data partition;
connect to a storage medium located outside the apparatus; and
transmit, after starting the operating system, user data from a first data partition to the storage medium.

13. The apparatus of claim 12, wherein the instructions further cause the apparatus to be configured to perform user identity authentication after the operating system starts, and wherein the instructions that cause the apparatus to transmit the user data further cause the apparatus to be configured to transmit the user data to the storage medium after the user identity authentication succeeds.

14. The apparatus of claim 12, wherein the instructions further cause the apparatus to be configured to:
display a second screen, wherein the second screen performs user identity authentication;
receive first identity information from the user on the first screen; and
perform the user identity authentication on the first identity information based on decryption data from the first data partition.

15. The apparatus of claim 12, wherein the instructions further cause the apparatus to be configured to:
display a second screen after user identity authentication succeeds, wherein the second screen comprises a second data backup option;
receive a second operation from the user on the second data backup option; and
transmit the user data to the storage medium after receiving the second operation.

16. A non-transitory computer-readable storage medium comprising instructions that, when executed by one or more processors, cause an apparatus to:
detect a power-on failure of the apparatus or a preset operation from a user;
display, in response to detecting the power-on failure or the preset operation, a first screen comprising a data backup option;
receive a first operation from the user on the data backup option;
create, in response to the first operation, a second data partition, wherein the second data partition is a virtual data partition, and wherein the second data partition comprises no historical data for running an operating system;
start, after detecting the power-on failure or the preset operation, the operating system of the apparatus using the second data partition;
connect to a storage medium located outside the apparatus; and
transmit, after starting the operating system, user data from a first data partition to the storage medium.

17. The non-transitory computer-readable storage medium of claim 16, wherein before transmitting the user data, the one or more processors are further configured to execute the instructions to cause the apparatus to perform user identity authentication after the operating system successfully starts, and wherein transmitting the user data comprises transmitting the user data to the storage medium after the user identity authentication succeeds.

18. The non-transitory computer-readable storage medium of claim 17, wherein the one or more processors are further configured to execute the instructions to cause the apparatus to:
display a second screen, wherein the second screen performs the user identity authentication;
receive first identity information from the user on the second screen; and
perform the user identity authentication on the first identity information based on decryption data from the first data partition.

19. The non-transitory computer-readable storage medium of claim 17, wherein the one or more processors are further configured to execute the instructions to cause the apparatus to:
display a second screen after the user identity authentication succeeds, wherein the second screen comprises a second data backup option;

receive a second operation from the user on the second data backup option; and transmit the user data to the storage medium after receiving the second operation.

20. The non-transitory computer-readable storage medium of claim 19, wherein the one or more processors are further configured to execute the instructions to cause the apparatus to:

display a third screen after receiving the second operation, wherein the third screen comprises at least one backup option, and wherein each of the at least one backup option corresponds to one storage medium;

receive a fourth operation from the user on a first backup option of the at least one backup option, wherein the first backup option corresponds to the storage medium; and transmit the user data to the storage medium after receiving the fourth operation.

\* \* \* \* \*